US010010209B2

(12) United States Patent
Tuchrelo et al.

(10) Patent No.: US 10,010,209 B2
(45) Date of Patent: Jul. 3, 2018

(54) APPARATUS FOR PREPARING FOOD, PARTICULARLY FRUIT

(75) Inventors: Robert Richard Tuchrelo, Williamson, NY (US); Jeffrey Quint Cahoon, Williamson, NY (US)

(73) Assignee: Carrier Commerical Refrigeration, Inc., Jupiter, FL (US)

( * ) Notice: Subject to any disclaimer, the term of this patent is extended or adjusted under 35 U.S.C. 154(b) by 1436 days.

(21) Appl. No.: 13/345,293

(22) Filed: Jan. 6, 2012

(65) Prior Publication Data
US 2012/0177790 A1 Jul. 12, 2012

Related U.S. Application Data

(60) Provisional application No. 61/430,787, filed on Jan. 7, 2011.

(51) Int. Cl.
| | |
|---|---|
| A47J 25/00 | (2006.01) |
| A47J 17/14 | (2006.01) |
| B26D 3/26 | (2006.01) |
| B26D 3/28 | (2006.01) |
| B26D 5/00 | (2006.01) |
| B26D 5/32 | (2006.01) |

(52) U.S. Cl.
CPC ................ *A47J 17/14* (2013.01); *B26D 3/26* (2013.01); *B26D 3/282* (2013.01); *B26D 5/00* (2013.01); *B26D 5/32* (2013.01)

(58) Field of Classification Search
CPC .................................. A23N 3/00; A23L 1/212
USPC .................. 99/491, 503, 516, 542, 544, 545
See application file for complete search history.

(56) References Cited

U.S. PATENT DOCUMENTS

| | | | |
|---|---|---|---|
| 2,526,712 A | 10/1950 | Thomspon | |
| 2,979,093 A | 4/1961 | Creed et al. | |
| 4,892,213 A | 1/1990 | Mason, Jr. | |
| D312,968 S | 12/1990 | Wolff | |
| 5,275,071 A | 1/1994 | Plant et al. | |
| 5,421,248 A * | 6/1995 | Hsu ................................ | 99/512 |
| 5,431,095 A | 7/1995 | Paterson et al. | |
| 5,435,238 A | 7/1995 | Paterson et al. | |

(Continued)

FOREIGN PATENT DOCUMENTS

| | | |
|---|---|---|
| EP | 0683988 | 11/1995 |
| EP | 1469431 | 10/2004 |

OTHER PUBLICATIONS

Japanese office action for JP2016-080710 dated Jan. 24, 2017.

*Primary Examiner* — Phuong Nguyen
(74) *Attorney, Agent, or Firm* — O'Shea Getz P.C.

(57) ABSTRACT

An apparatus for preparing fruit includes a main housing with a cutting area containing a cutting assembly and a drive assembly, a removable cup assembly for inserting the fruit into the apparatus, and a removable drawer and tray for removing cut pieces of fruit from the apparatus after a cutting operation. The apparatus includes a rinsing assembly for cleaning the fruit and the cutting assembly, and a deflector configured to route cut pieces of fruit into the tray and waste material through a disposal outlet. The cutting assembly is configured to perform one or more cutting operations depending on the type of fruit detected in the cup assembly: wedging for apples, lemons, limes, and pears, and cutting/peeling for oranges and grapefruits. The apparatus quickly prepares various fruits for consumption without requiring an operator to touch the cut pieces of fruit.

32 Claims, 49 Drawing Sheets

(56) References Cited

U.S. PATENT DOCUMENTS

| | | |
|---|---|---|
| 5,590,591 A | 1/1997 | Kim |
| D383,671 S | 9/1997 | Phillips |
| D403,241 S | 12/1998 | Nask et al. |
| 6,035,536 A | 3/2000 | Dewberry |
| 6,170,696 B1 | 1/2001 | Tucker et al. |
| D467,800 S | 12/2002 | Chen et al. |
| D469,320 S | 1/2003 | Pettaweebuncha |
| 6,508,257 B1 * | 1/2003 | Rich .......................... 134/25.3 |
| D469,689 S | 2/2003 | Buchalski et al. |
| D486,358 S | 2/2004 | Dais et al. |
| D489,975 S | 5/2004 | Jackson et al. |
| D496,272 S | 9/2004 | Jackson et al. |
| 7,017,775 B2 | 3/2006 | Zettle et al. |
| 7,055,455 B2 * | 6/2006 | Burke et al. ..................... 118/13 |
| D541,648 S | 5/2007 | Bennett et al. |
| D544,790 S | 6/2007 | Bouveret et al. |
| D547,179 S | 7/2007 | Bouveret et al. |
| D548,588 S | 8/2007 | Bouveret et al. |
| D645,738 S | 9/2011 | Shiffer et al. |
| D646,160 S | 10/2011 | Shiffer et al. |
| D648,171 S | 11/2011 | Rusnak |
| D650,660 S | 12/2011 | Shiffer et al. |
| D650,662 S | 12/2011 | Shiffer et al. |
| D650,663 S | 12/2011 | Shiffer et al. |
| D653,105 S | 1/2012 | Degeyter et al. |
| D706,131 S | 6/2014 | Brooks et al. |
| D706,622 S | 6/2014 | Bischoff et al. |
| D719,399 S | 12/2014 | Thurin et al. |
| D720,613 S | 1/2015 | Dziaba et al. |
| D731,304 S | 6/2015 | Bischoff et al. |
| 2003/0047087 A1 * | 3/2003 | Phebus et al. ................... 99/516 |
| 2004/0025716 A1 * | 2/2004 | Ascari ............................ 99/542 |
| 2009/0301318 A1 * | 12/2009 | Torrisi et al. .................... 99/503 |
| 2012/0177790 A1 | 7/2012 | Tuchrelo et al. |

\* cited by examiner

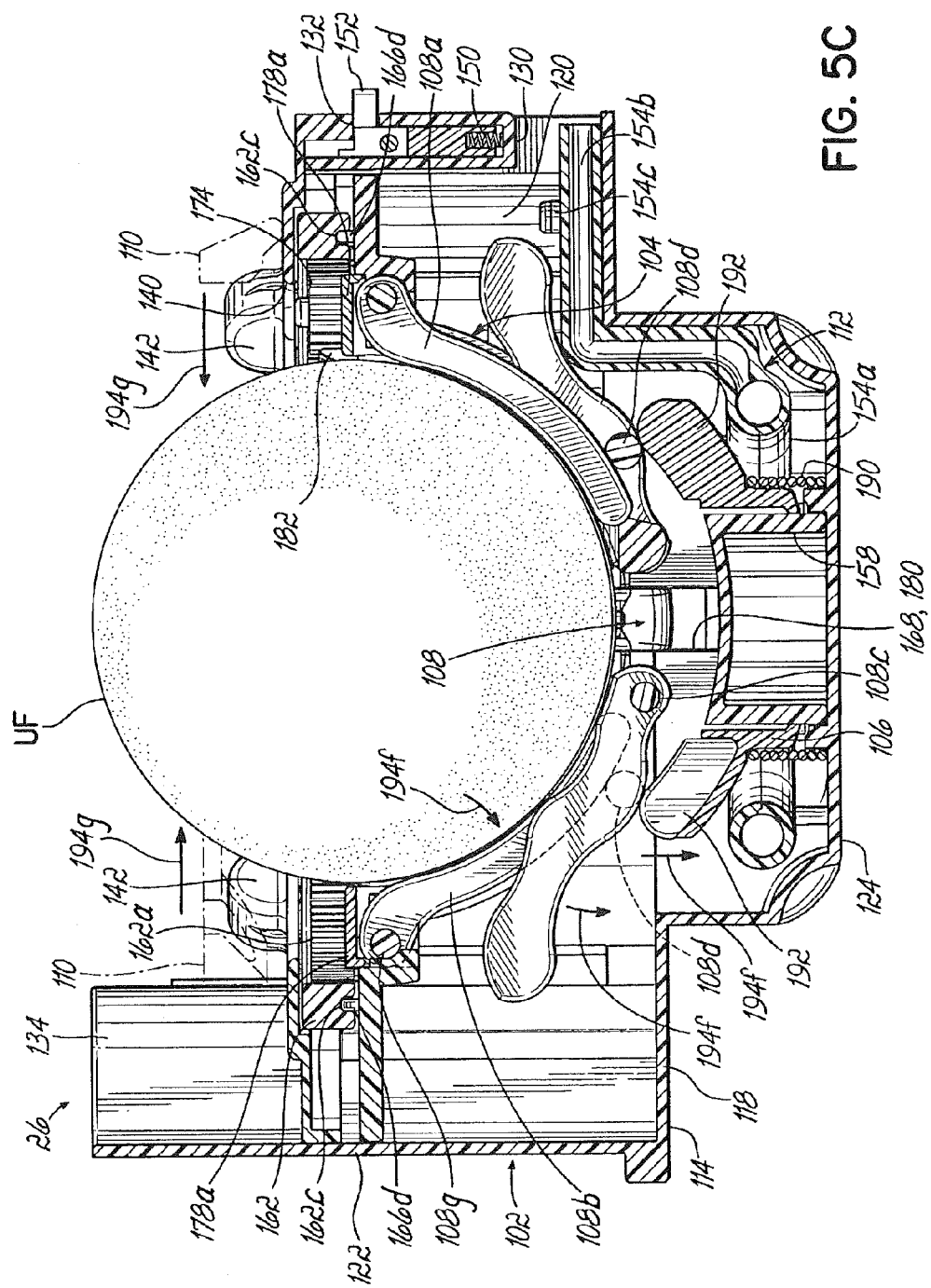

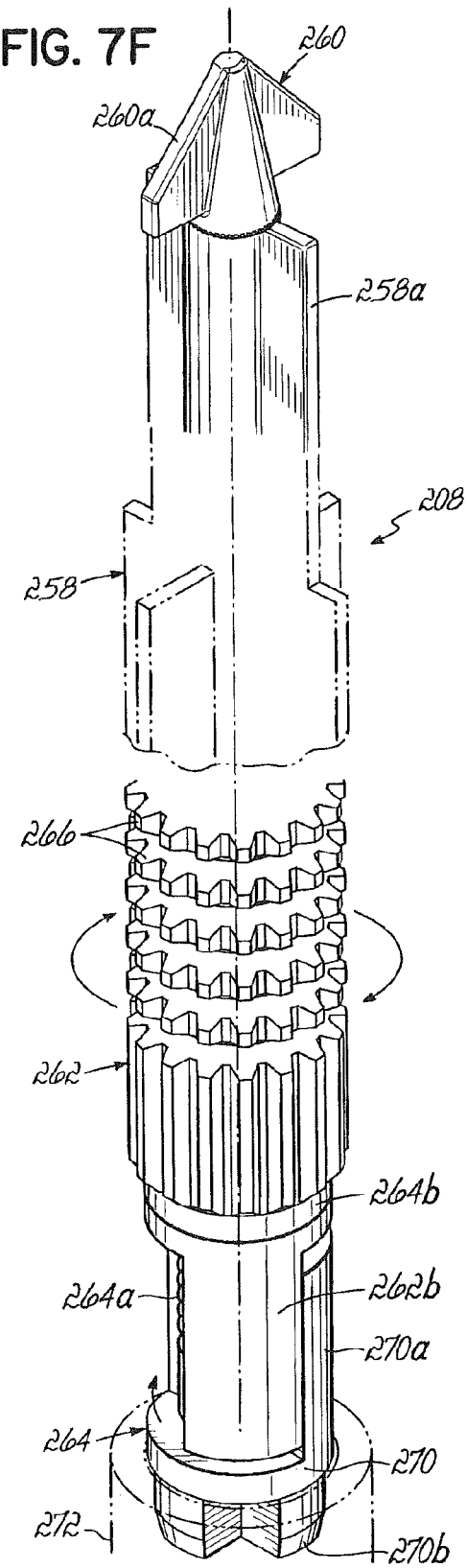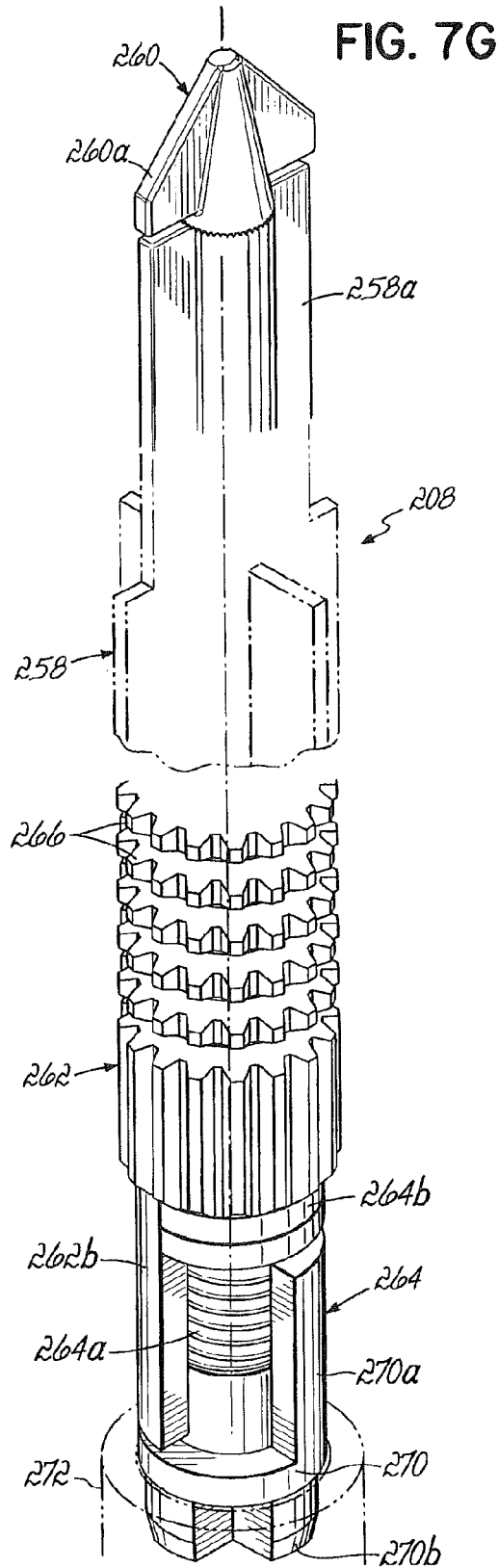

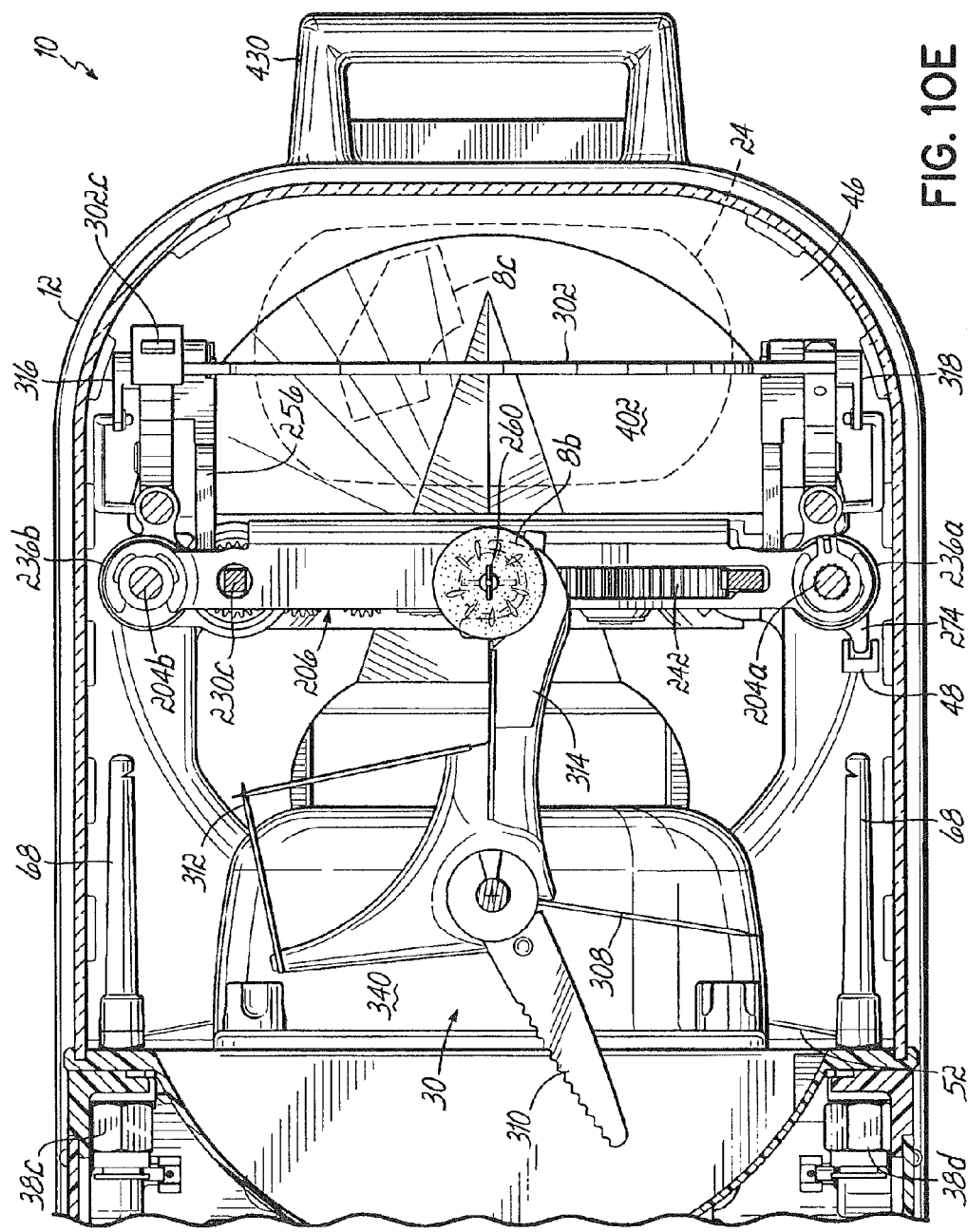

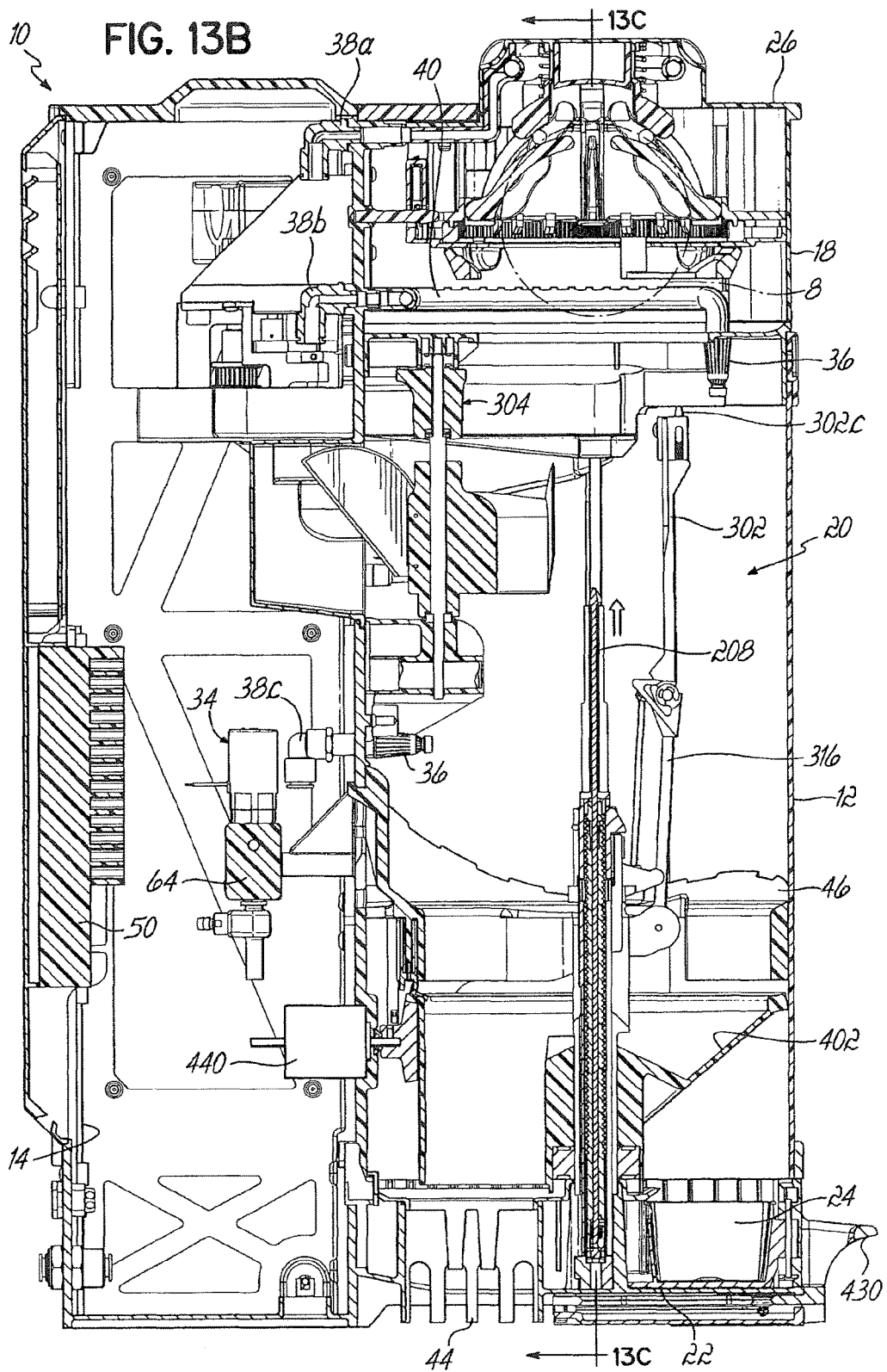

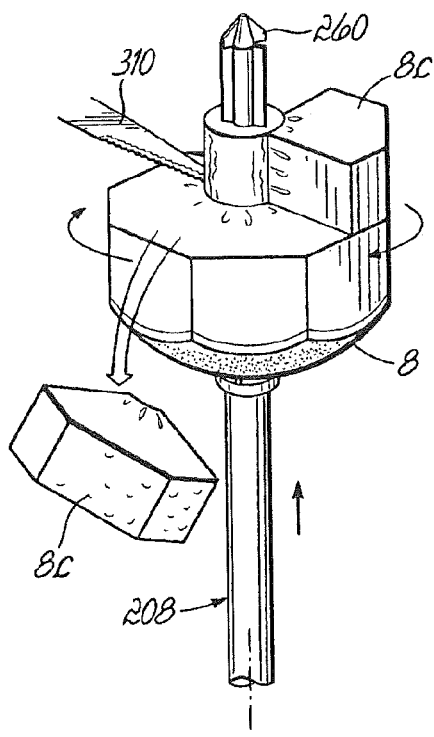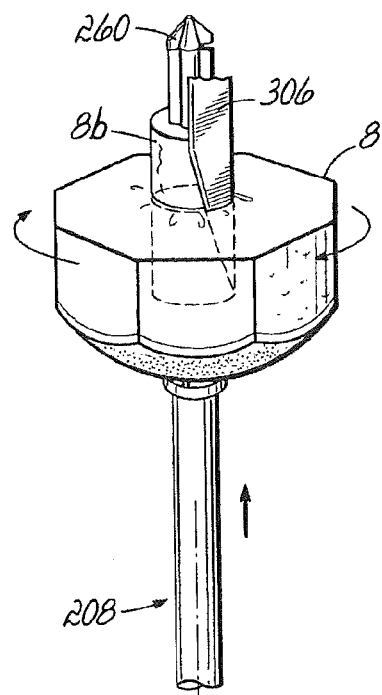
FIG. 15G  FIG. 15H
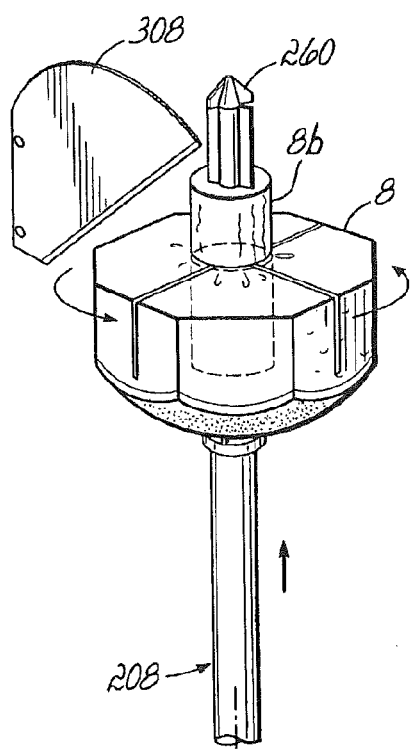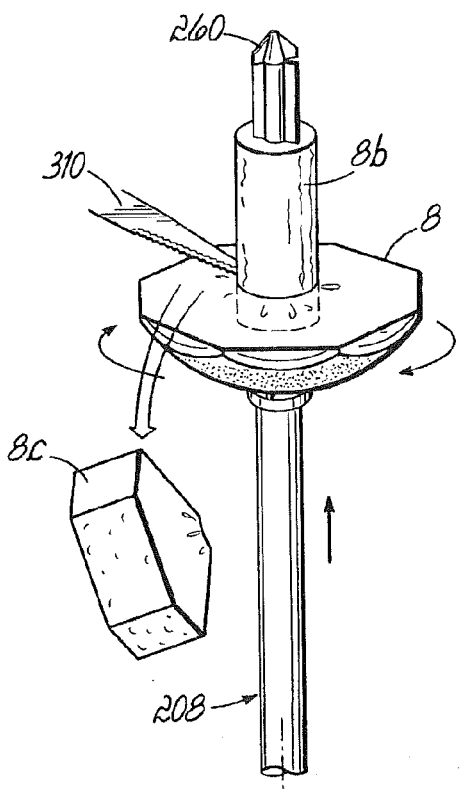
FIG. 15I  FIG. 15J

APPARATUS FOR PREPARING FOOD, PARTICULARLY FRUIT

This application claims priority to U.S. Patent Appln. No. 61/430,787 filed Jan. 7, 2011, which is hereby incorporated by reference.

FIELD OF THE INVENTION

The present invention relates to an apparatus and method for preparing food, and more particularly, to an apparatus and method for cutting a whole fruit into a plurality of readily consumable cut pieces.

BACKGROUND OF THE INVENTION

Many persons try to maintain a healthy life style by exercising regularly and/or following a regular diet that includes plenty of fruits and vegetables. Unfortunately, in our fast-paced culture there are often times when the availability of fruits and vegetables is relatively limited. This can be particularly true on occasions where meals are purchased at quick service restaurants.

Although such establishments have shown an increasing willingness to accommodate health conscious patrons, that willingness often seems limited to the supplying of salads, or low sodium products. For example, a patron of a quick service hamburger restaurant would not typically expect to order a whole fruit or vegetable to go with a sandwich, rather than the traditional French fries. The offering of whole fruits and vegetables is atypical because quick service restaurants have become immensely successful at preparing and presenting certain food items in a ready-to-eat condition. However, these restaurants have not yet been able to accomplish the same feat with respect to whole fruits or vegetables, such as apples or oranges.

A small percentage of quick service restaurants have begun offering pre-packaged go bags of fruit slices in children's meals. However, these fruit slices are typically cut and sealed in the bags days before consumption by the patron, at an off-site location, and then shipped to the quick service restaurant. This requires the use of an off-site food distribution center to prepare and package these fruit slices, and complex machinery to do the off-site preparing and packaging. Thereafter, the prepared fruit slices must be shipped in refrigerated trucks and then kept in storage coolers at the quick service restaurant, to stay preserved at all times leading up to sale and consumption. This requires additional storage space, refrigeration, and shipping, all of which increase the cost and decrease the convenience of serving consumable pieces of fruit to a patron.

In addition, with this off-site approach the fruit slices must be packaged with a significant amount of preservative to maintain their edible state during storage. The need to use a preservative adds to the overall cost. Moreover, depending on the quantity and condition of the preservative, the resulting fruit slices may not be particularly appealing to the consumer, as a healthy option.

A different approach may involve the quick service restaurants supplying whole fruits and/or vegetables on demand, by hand-cutting them at the point of sale. However, this approach would take more time, and would likely be too slow for the typical speeds associated with quick service restaurants. Also, the need to cut the fruit and/or vegetable by hand would introduce several other potential problems, in addition to excessive time. First, the quick service restaurant would need to provide and have ready at all times a suitable sharp knife for making the cuts. The sharp knife presents a potential hazard to the employees of the quick service restaurants.

Also, the person using the knife would need to wash his or her hands prior to cutting, to ensure cleanliness. Even then, the fruit pieces delivered to the customer would have been handled directly by the hands of the worker at the quick service restaurant, before delivery to the consumer. Some patrons may find such handling of the fruit pieces to be unappetizing.

Still further, depending on the person using the knife, the fruit pieces may be inconsistent in size and shape. Patrons of quick service restaurants have become accustomed to consistency. But achieving such consistency with cut pieces of fruit would be difficult. And this consideration becomes more acute with an increase in the number of types of fruit.

There is a need to increase the availability of fresh fruit at quick service restaurants.

SUMMARY OF THE INVENTION

A apparatus with a housing receives and holds a whole piece of fruit, within a cup assembly that removably connects to the housing. The apparatus then impales the fruit on a lance (also referred to as a holder), determines a particular type of cutting operation, performs the determined cutting operation, and delivers the cut piece of fruit to a tray that is retrievable from the housing. The remainder of the fruit is waste material and is directed to a disposal outlet. The apparatus may be a countertop apparatus.

This apparatus has a relatively small footprint and is fairly simple to use. To operate, the apparatus requires a conventional electrical outlet, a water supply line, and preferably a waste collector such as a garbage disposal or a garbage container. To prepare consumable fruit slices, the user simply removes the cup assembly from the housing, places the fruit within the cup assembly, and then eventually retrieves from the housing a tray that contains the cut piece of fruit.

According to one aspect of the invention, the fruit is washed while located in the cup assembly, to assure cleanliness at the beginning of the operation. The shape of the cup assembly and the orientation of the spray nozzles reduce the volume of fluid needed to clean the fruit. Preferably, a cleaning acid is included within the flow of cleaning liquid.

This apparatus may be used to prepare different types of fruit. The apparatus determines the type of cutting operation to perform depending on the size of the fruit, which is determined by sensing. In one aspect of the invention, a drive assembly holds the fruit at the end of a lance, and the drive assembly reciprocates up and down: 1) to sense the size of the held fruit; and 2) to accomplish the determined cutting operation, which is either a peeling and cutting operation or a wedging operation. The drive assembly is also rotatable about a longitudinal axis of the housing, which is preferably vertical, to facilitate the cutting operation.

According to another aspect of the invention, the housing includes a deflector located below the drive assembly. The deflector deflects cut pieces of fruit toward a tray located in a drawer formed in the housing. For the remainder of the fruit that is to be discarded, the deflector rotates to direct such waste material toward a disposal outlet, where the waste collector may be connected. Preferably, the apparatus includes a sensor located in the drawer, to sense the presence of the tray therein, and thereby to enable the initiation of the fruit preparing operation. This assures that the cut pieces of fruit are delivered to a tray, and do not have to be physically touched by an employee.

After the tray containing the cut pieces of fruit has been removed from the drawer, and as the remainder of the fruit is being directed toward the waste outlet, the apparatus directs fluid from spray nozzles toward the inside surfaces of the housing and the surfaces of the drive assembly and the cutting assembly. This assures that the apparatus is in a clean state prior to the next time it is used to prepare a piece of fruit.

Because this apparatus automatically determines the type of fruit (by sensing), the user does not have to make any decisions, other than to place the piece of fruit within the cup assembly and to place a tray within the drawer. The apparatus automatically detects the presence of the tray and the fruit before actuating a cutting process, such that a separate external start button is not necessary. Therefore, it is not necessary that the user do any type of pre-selection based on any particular type of fruit. However, a start button may be provided in the apparatus in alternative embodiments.

This apparatus supplies cut pieces of fruit in a just-in-time operation, in a manner that accommodates the customer needs of typical quick service restaurants. Moreover, this apparatus supplies the cut pieces of fruit in a manner that is clean, safe, prompt, and consistent. The housing is primarily of see-through glass. This enables the user to watch the operation of the apparatus, if desired. And in fact, applicants consider the apparatus fun to watch as it senses the fruit and then performs the determined cutting operation. Applicants have been able to successfully wedge a first type of fruit (such as apples, lemons, limes, and pears) within about 30 seconds, and may be able to further reduce this time span to an even shorter duration. Applicants have also been able to successfully section and cut pieces from a second type of fruit (such as oranges and grapefruits) within about 100 seconds.

It is believed that the availability of this apparatus at quick service restaurants will better enable such establishments to attract health conscious patrons. At the same time, this apparatus will allow this benefit to occur without an accompanying increase in cost or inconvenience. More particularly, this apparatus eliminates the need to use remote food distribution centers, complex machinery, refrigerated trucks, storage space, and a preservative.

It is contemplated that this apparatus would also be readily adaptable to various types of food other than fruit.

According to a first embodiment, an apparatus for preparing a whole piece of fruit includes a housing, a cup assembly at the top of the housing, a lance located within the housing, a fruit sensor located in the housing, a controller operatively connected to the fruit sensor, a cutting assembly located in the housing adjacent the lance, a deflector located below the holder and a drawer formed in the housing. The housing may elongated vertically. A front section may be made of transparent material, and contains the cup assembly, the lance, the fruit sensor, the cutting assembly and the deflector. A rear section thereof contains the controller and the electrical and water supply connections. The apparatus connects to a conventional electrical AC power supply (e.g., 120 volts AC). A water supply line connects the housing to a water source. A waste collector may be operatively connected to the disposal outlet.

The cup assembly holds the fruit near the top of the housing, after a user has removed the cup assembly, placed the fruit in the cup assembly, and then replaced the cup assembly back in the housing. The cup assembly includes nozzles for directing liquid including a cleaning agent at the fruit, while the fruit is held therein. The lance moves upwardly relative to the cup assembly, along a first axis, and impales the fruit along the axis. The lance includes a tip that positively retains the fruit on the lance. The lance moves the fruit along the first axis and past the fruit sensor to sense a dimension of the fruit. The controller, which is operatively connected to the sensor, the lance and the cutting assembly, determines a cutting operation based on the sensed dimension. At present, the cutting operation is either peeling/cutting or wedging, with the larger sized fruit (grapefruit, oranges) subjected to the first cutting operation, i.e., peeling/cutting, and the smaller size fruit (apples, lemons, limes, pears) subjected to the second cutting operation, i.e., wedging.

The cutting assembly performs the determined cutting operation. If the cutting operation is peeling/cutting, the cutting assembly initially peels a portion of the fruit with a peeling blade selectively located in the path of the fruit as the fruit moves upwardly on the lance. The lance then moves the fruit downward, rotates, or indexes, to place another part of the held fruit within the path of the peeling blade, and then moves upwardly to peel the newly positioned part of the fruit with the peeling blade. This process continues until each side or face of the fruit has been removed. The lance then moves the fruit past additional blades on the cutting assembly in series (each blade being selectively disposed in the path of the fruit) to core the fruit, vertically section the fruit, and horizontally section the fruit. As the fruit is horizontally sectioned, consumable cut pieces of fruit are removed from the fruit and are routed by the deflector into the tray. The core and other waste material are routed by the deflector to the disposal outlet. The tray may then be removed by opening the drawer and the fruit is ready for consumption by a consumer.

If the desired cutting operation is wedging, the lance moves the fruit past one or more vertically-oriented wedging blades selectively disposed in the path of the fruit, each pass removing one or more wedges from the fruit. The consumable wedges are routed by the deflector into the tray, while the core and other waste material are routed by the deflector to the disposal outlet. The tray may then be removed by opening the drawer and the fruit is ready for consumption by a consumer.

The deflector includes a funnel-shaped member, a motor for actuating rotation of the funnel-shaped member, and a deflector sensor for detecting a position of the deflector. The deflector sensor communicates with the controller, which operates the motor to actuate rotation of the deflector between a first position where pieces of fruit are routed into the tray and a second position where liquids and waste materials are routed into the disposal outlet. The tray may be received in a tray receptacle formed on a removable drawer adjacent the deflector. The deflector may also include a tray sensor which detects when a tray is positioned in the apparatus when the drawer is received in the apparatus. The tray sensor ensures that the apparatus does not dispenser cut pieces of fruit into the drawer without a tray present. Consequently, an operator of the apparatus does not touch the cut pieces of fruit before or during delivery to a consumer.

BRIEF DESCRIPTION OF THE DRAWINGS

FIG. 5C is a cross-sectional side view of the cup assembly of FIG. 3A, in a third position, with the unit of fruit located fully within the cup assembly.

FIG. 7F is a perspective view of the lance tip shown in FIG. 7D, with the tip unaligned with the holding spike.

FIG. 7G is a perspective view, similar to FIG. 7F, with the same lance tip aligned with the holding spike.

FIG. 10E is a top view of the apparatus similar to FIG. 10D, with the blade assembly rotated such that a de-coring member engages the unit of fruit to remove it from the lance.

FIG. 13B is a side cross-sectional view of the apparatus shown in FIG. 13A.

FIG. 15G is a perspective view of the unit of fruit of FIG. 15F undergoing subsequent horizontal cutting as part of the peeling and cutting operation shown in FIG. 14B.

FIG. 15H is a perspective view of the unit of fruit of FIG. 15G undergoing further coring as part of the peeling and cutting operation shown in FIG. 14B.

FIG. 15I is a perspective view of the unit of fruit of FIG. 15H undergoing further vertical cutting as part of the peeling and cutting operation shown in FIG. 14B.

FIG. 15J is a perspective view of the unit of fruit of FIG. 15I undergoing further horizontal cutting as part of the peeling and cutting operation shown in FIG. 14B.

DETAILED DESCRIPTION OF THE DRAWINGS

Figure 1:
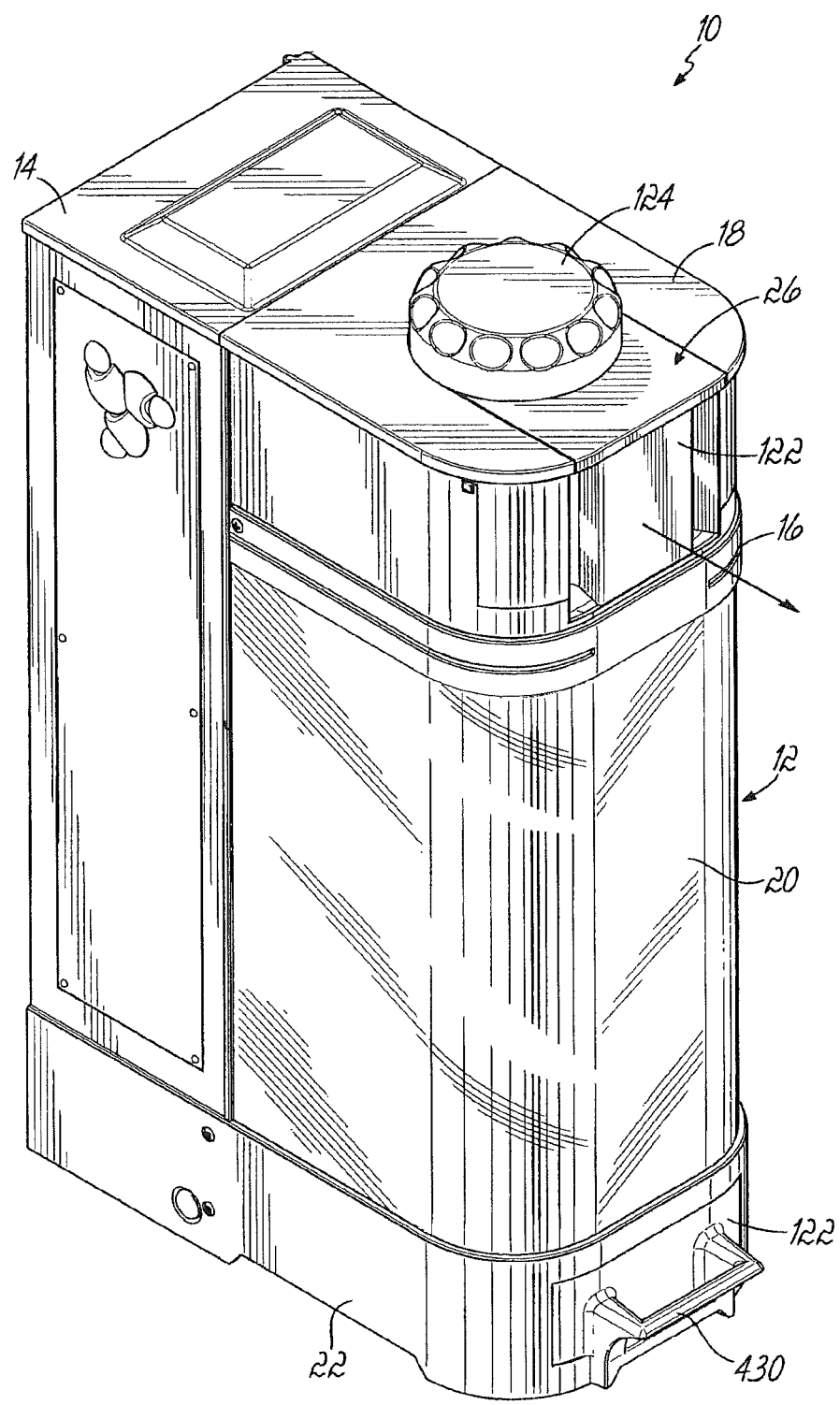
FIG. 1 is a perspective view of an apparatus for preparing a unit of fruit, i.e., a whole piece of fruit, for consumption, according to one embodiment of the invention.

FIG. 1 shows an embodiment of an apparatus 10 for preparing a unit of fruit 8 for consumption according to the invention. The apparatus 10 includes a main housing 12 containing each of the various sub-assemblies of the apparatus 10. The main housing 12 includes a rear housing portion 14 configured to receive the operating electronics and piping of a rinsing assembly, a front housing portion 16 including a cup receptacle 18 and a cutting area 20, and a lower housing portion 22 configured to hold a removable tray 24 and configured to dispense and dispose of various portions of the unit of fruit 8. The apparatus 10 is configured to receive a unit of fruit 8 at the cup receptacle 18, determine a desired cutting operation based on the size of the unit of fruit 8, cut a plurality of consumable fruit pieces from the unit of fruit 8, and dispense the consumable fruit pieces into the removable tray 24 for delivery and consumption by a consumer. To this end, the apparatus 10 enables fresh automatic preparation of fruit for quick service restaurants and similar establishments.

Figure 2:
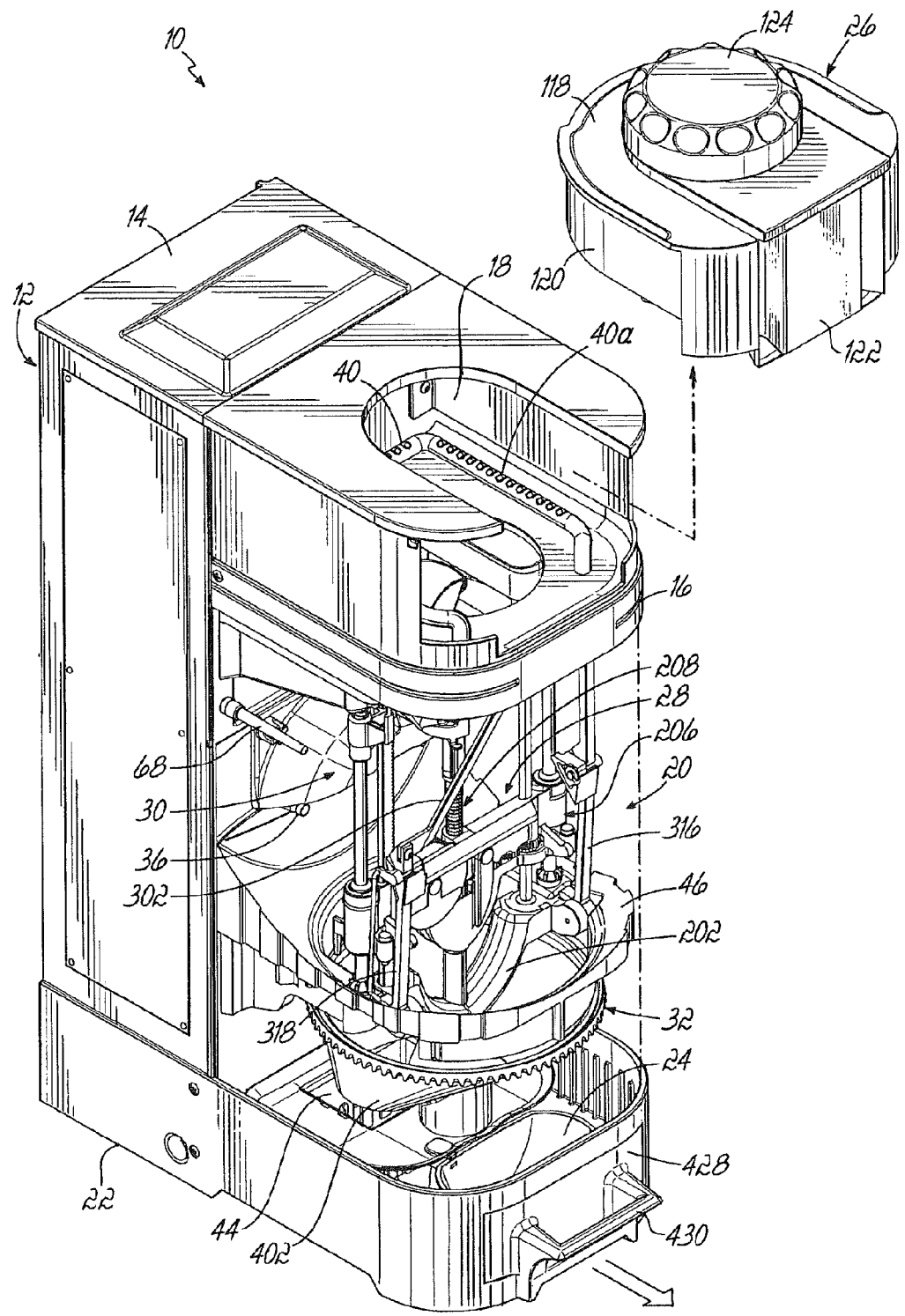
FIG. 2 is a perspective view of the apparatus of FIG. 1, with a cup assembly and a housing panel removed to show interior details.

The various sub-assemblies of the apparatus 10 are more clearly shown in FIG. 2. A removable cup assembly 26 configured to accurately locate and clean the unit of fruit 8 is insertable into the cup receptacle 18. The apparatus 10 also includes a drive assembly 28 located in the front housing portion 16 and configured to move and hold the unit of fruit 8 during cutting operations. A cutting assembly 30 is disposed in the cutting area 20 and is operable to perform the desired cutting operation on the unit of fruit 8. A deflector assembly 32 is located in the cutting area 20 adjacent to the lower housing portion 22 and is operable to route consumable cut pieces and waste material to respective outlets. More particularly, the deflector assembly 32 may be alternatively coupled with the tray 24 and a disposal outlet (not shown in FIG. 2) leading to a garbage disposal or trash receptacle. The apparatus 10 also includes a rinsing assembly 34 including a plurality of spray nozzles 36, 68 configured to spray fluid on consumable fruit pieces or the components within the cutting area 20 of the housing 12. The apparatus 10 also includes a main controller 50 in the rear housing portion 14 and configured to receive information from a plurality of sensors and send signals to actuate the drive assembly 28, the cutting assembly 30, the deflector assembly 32, and the rinsing assembly 34.

The removable cup assembly 26 is shown in FIGS. 3A-5D. The cup assembly 26 includes an outer housing 102 and an inner cup-shaped housing 104 rigidly mounted within the outer housing 102. The cup assembly 26 also includes a cup 106 generally disposed between the outer housing 102 and the inner housing 104 and configured to move with respect to the inner housing 104. A plurality of first gripping arms 108 are pivotally coupled to the inner housing 104 and are configured to engage one side of a unit of fruit 8 placed in the cup assembly 26. A plurality of second gripping aims 110 are also pivotally coupled to the inner housing 104 and are configured to engage the other side of a unit of fruit 8 placed in the cup assembly 26. The cup assembly 26 also includes a fluid delivery system 112 incorporated with the inner housing 104 and configured to deliver a cleaning and disinfecting solution to clean the unit of fruit 8 after the cup assembly 26 is positioned within the cup receptacle 18 of the main housing 12.

Figure 3A:
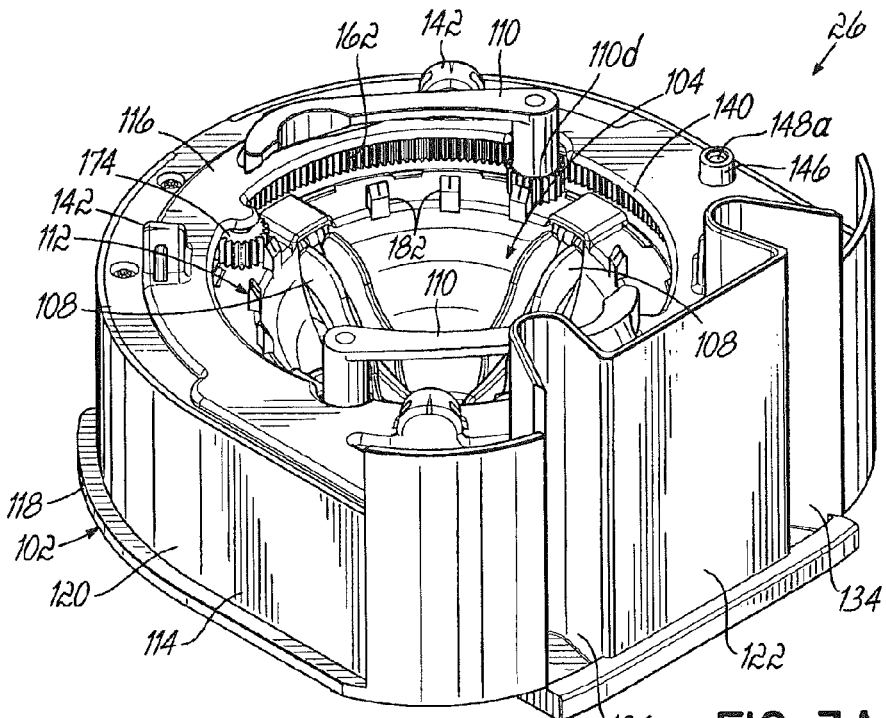
FIG. 3A is a front-side perspective view of the cup assembly shown in FIG. 1.
Figure 3B:
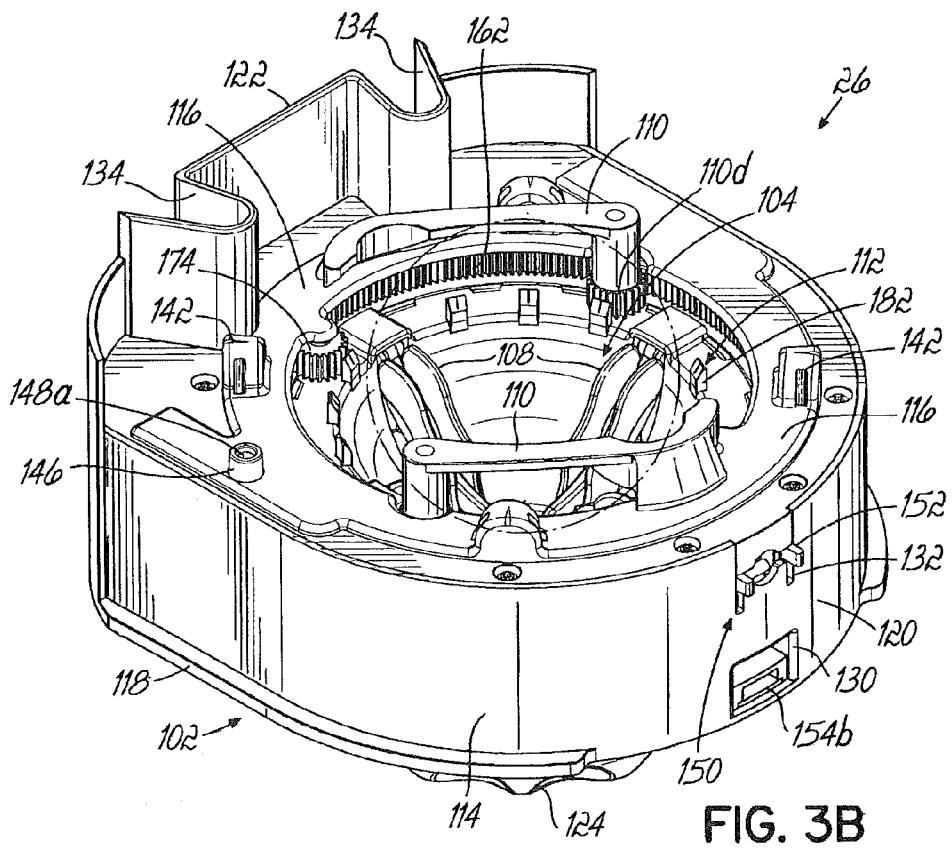
FIG. 3B is a rear-side perspective view of the cup assembly of FIG. 3A.
Figure 4A:
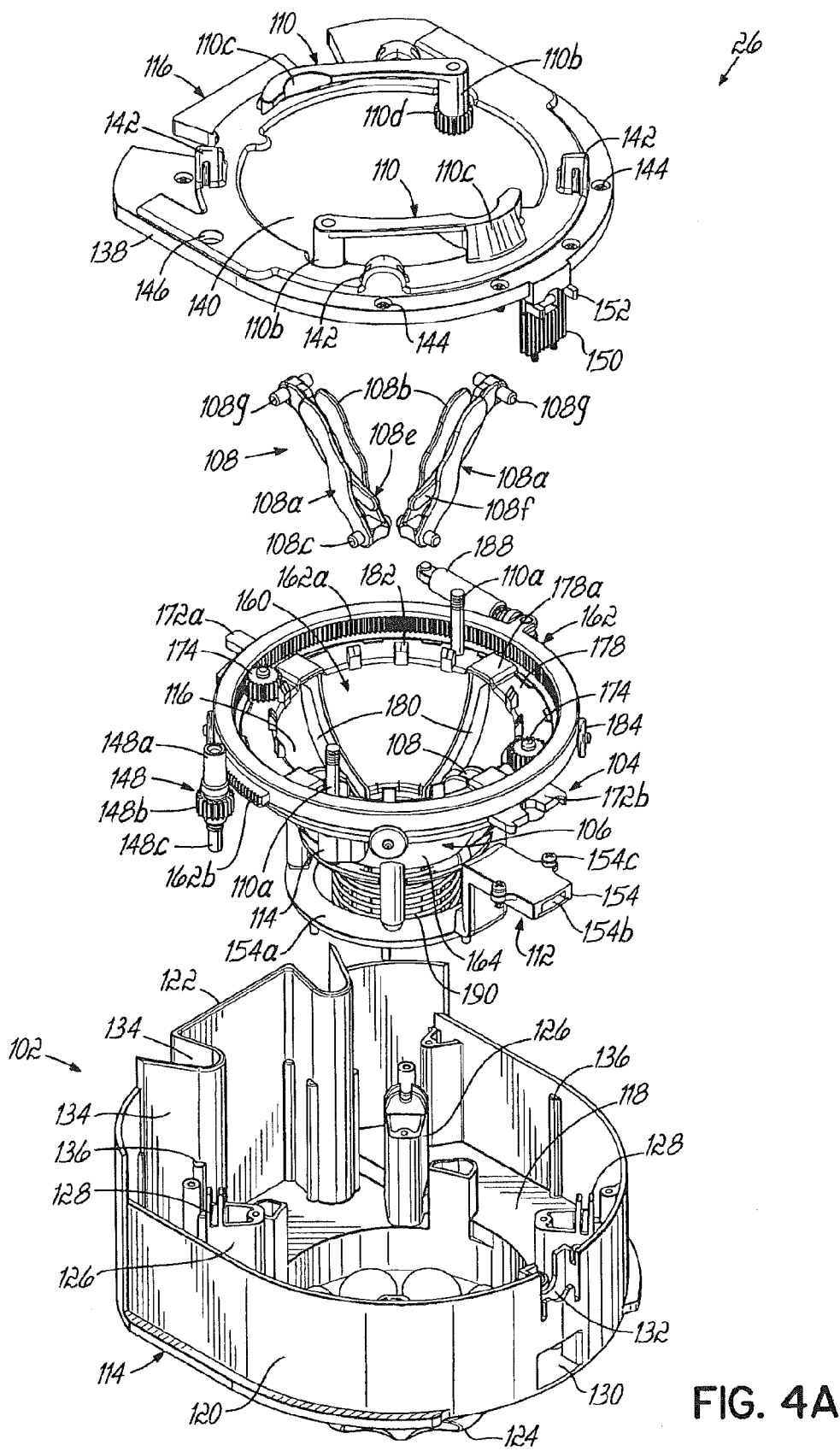
FIG. 4A is a partially exploded view of the cup assembly of FIG. 3A.

As shown most clearly in FIG. 4A, the outer housing 102 includes an upper housing member 114 and a lower housing member 116. It will be understood that the terms "upper" and "lower" as well as other directional terms are used for reference purposes only and generally conform to orientations of elements when positioned in the apparatus 10 (the cup assembly 26 is shown upside-down in FIGS. 3A-5C). The upper housing member 114 includes a top wall 118, a U-shaped sidewall 120 extending from the top wall 118, and a contoured front sidewall 122 extending from the top wall 118. The top wall 118 includes a central recessed portion 124 configured to receive a stem portion 158 of the inner housing 104 and the cup 106. Surrounding the central recessed portion 124 is a plurality of mounting studs 126 configured for receiving fasteners extending through the inner housing 104 to thereby couple the inner housing 104 with the outer housing 102. Each of the mounting studs 126 further includes a roller receptacle 128 configured to receive a roller 184 associated with the inner housing 104 as described in further detail below.

The U-shaped sidewall 120 of the upper housing member 114 includes a water inlet aperture 130 on an opposing side from the front sidewall 122 and a snap coupler receptacle 132 positioned directly below the water inlet aperture 130. The front sidewall 122 includes a pair of inwardly-directed ribs 134 projecting toward the central recessed portion 124 of the top wall 118. The U-shaped sidewall 120 and the front sidewall 122 may also include a plurality of structural ribs 136 along an inner periphery configured to support the lower housing member 116, and some of the structural ribs 136 may be configured to receive fasteners as well understood. The U-shaped sidewall 120 and the front sidewall 122 collectively provide a closed periphery configured to surround the inner housing 104 and the cup 106 when the cup assembly 26 is fully assembled.

The lower housing member 116 is generally plate-shaped in appearance and includes an outer peripheral edge 138 configured to engage the U-shaped sidewall 120 and the front sidewall 122. The lower housing member 116 also includes a central aperture 140 configured to provide access to the inner housing 104 and other components of the cup assembly 26 when fully assembled. Between the outer peripheral edge 138 and the central aperture 140, the lower housing member 116 includes a plurality of roller receptacles 142 configured to be adjacent to corresponding roller receptacles 128 in the upper housing member 114 and configured to receive a roller 184 associated with the inner housing 104 as described in further detail below. The lower housing member 116 also includes a plurality of apertures 144 spaced around and adjacent to the outer peripheral edge 138 for receiving fasteners to couple the lower housing member 116 to the upper housing member 114, as shown in FIGS. 3A and 3B. A clutch aperture 146 is also formed in the lower housing member 116 for receiving the bottom end 148a of a slip clutch 148 described in further detail below.

The lower housing member 116 includes a snap coupler 150 projecting upwardly from the outer peripheral edge 138 along the U-shaped sidewall 120 of the upper housing member 114. The snap coupler 150 is configured to seat in the snap coupler receptacle 132 in the fully assembled state of the cup assembly 26. The snap coupler 150 includes a pair of spring-loaded prongs 152 configured to releasably engage a corresponding latch (not shown) at the rear of the cup receptacle 18 to "lock" the cup assembly 26 in position during operation of the apparatus 10.

Figure 4B:
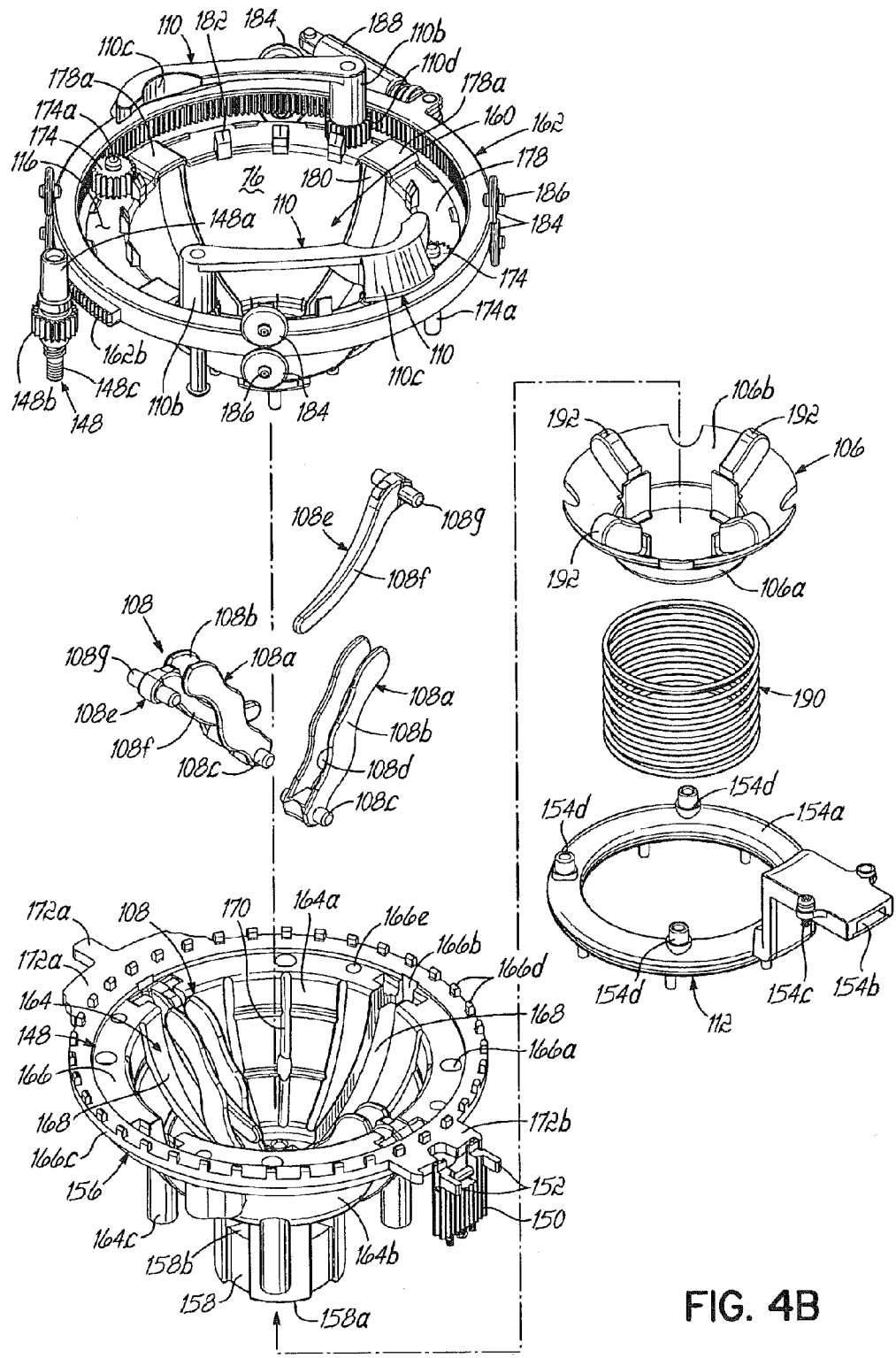
FIG. 4B is a partially exploded view of further details of the cup assembly of FIG. 3A.

With reference to FIG. 4B, the inner housing 104 and cup 106 are shown in further detail along with the slip clutch 148, the first gripping arms 108, and the second gripping arms 110. The inner housing 104 includes a water distribution donut 154, a first housing portion 156 including the stem portion 158, a second housing portion 160 configured to overlie the first housing portion 156, and a ring gear 162. As shown in FIG. 4B, the cup 106 is adapted to reside between the first housing portion 156 and the water distribution donut 154, while the first gripping arms 108 are configured to be held by the first housing portion 156 and the second housing portion 160.

The first housing portion 156 is defined by the stem portion 158, a first partially-spherical wall 164 extending downwardly from the stem portion 158, and a flange 166 disposed around the first partially-spherical wall 164 on the opposite end from the stem portion 158. The stem portion 158 includes a top end 158a configured to seat in engagement with the central recessed portion 124 of the outer housing 102, thereby rigidly positioning the inner housing 104 with respect to the outer housing 102. The stem portion 158 also includes four pivot receptacles 158b located adjacent to the first partially-spherical wall 164 and configured to engage the first gripping arms 108 as described in further detail below.

The first partially-spherical wall 164 includes four slots 168 spaced around the wall 164 and adapted to receive at least a portion of the first gripping arms 108. Between the slots 168, the first partially-spherical wall 164 includes an interior surface 164a with a network of grooves 170 machined or otherwise cut into the interior surface 164a. The network of grooves 170 extends all the way to the flange 166. The first partially spherical wall 164 also includes an exterior surface 164b having a plurality of donut couplings 164c extending upwardly toward the water distribution donut 154. The donut couplings 164c communicate with the water distribution donut 154 and the network of grooves 170.

The flange 166 includes a plurality of apertures 166a configured to receive fasteners coupling the inner housing 104 to the mounting studs 126 of the outer housing 102. Four pivot receptacles 166b are also located in the flange 166 adjacent to the corresponding slots 168 in the first partially-spherical wall 164. The pivot receptacles 166b are configured to engage the first gripping arms 108 as described in further detail below. The flange also defines an outer periphery 166c including a first detent 172a configured to be disposed between the inwardly-directed ribs 134 of the front sidewall 122 and a second detent 172b configured to be located adjacent to the snap coupler receptacle 132 in the U-shaped sidewall 120 (the snap coupler 150 is shown in FIG. 4B for illustration purposes only and is not incorporated with the second detent 172b). The flange 166 further includes a plurality of projecting tabs 166d extending downwardly from the outer periphery 166c and configured to accurately locate the ring gear 162 with respect to the first housing portion 156.

The flange 166 also includes a plurality of mounting apertures 166e configured to receive a pivot pin 110a of the second gripping arms 110 or a pivot pin 174a of an idler gear 174. In this regard, the second gripping arms 110 are pivotally coupled to the inner housing 104 at the flange 166. Each of the second gripping arms 110 includes a pivot portion 110b with the pivot pin 110a adjacent to the central aperture 140 of the lower housing member 116, and also includes a gripping portion 110c extending radially from the pivot portion 110b and generally below the plane of the lower housing member 116. The pivot portion 110b includes a gear wheel 110d located generally above the plane of the lower housing member 116 so as to be engaged with the ring gear 162. The gripping portion 110c of each second gripping arm 110 is configured to rotate from the position shown in FIGS. 4A and 4B inwardly towards the central aperture 140 to grab a unit of fruit 8 placed in the cup assembly 26.

The plurality of first gripping arms 108 includes four gripping arms 108 shown in partially-exploded and installed states in FIG. 4B. Each of the first gripping arms 108 includes a first limb 108a defined by a pair of parallel contoured plate-like members 108b connected by a pivot portion 108c at a top end. The pivot portion 108c is configured to engage with one of the pivot receptacles 158b in the stem portion 158. The first limb 108a also includes a cam pin 108d disposed between the plate-like members 108b and spaced from the pivot portion 108c. Each of the first gripping arms 108 further includes a second limb 108e defined by a curved member 108f extending between the plate-like members 108b of the first limb 108a and a pivot portion 108g at a bottom end. The pivot portion 108g is configured to engage with one of the pivot receptacles 166b in the flange 166. The curved member 108f freely rests on the cam pin 108d of the corresponding first limb 108a (shown most clearly in FIGS. 5A-5C). Consequently, pushing the cam pin 108d of the first gripping arm 108 actuates rotational movement of each of the first limb 108a and the second limb 108e, as will be described in further detail below.

The second housing portion 160 is defined by a second partially-spherical wall 176 and a flange 178. The second partially-spherical wall 176 includes four slots 180 configured to be placed in registration with the four slots 168 in the first partially-spherical wall 164. Between the four slots 180, the second partially-spherical wall 176 is solid and configured to sealingly engage with the interior surface 164a of the first partially-spherical wall 164 such that the network of grooves 170 is sealed between the first partially-spherical wall 164 and the second partially-spherical wall 176. The second partially-spherical wall 176 may also include receptacle caps (not shown) adjacent to the stem portion 158, each receptacle cap configured to close the pivot portion 108c of the corresponding first limb 108a in the respective pivot receptacle 158b of the stem portion 158.

The flange 178 of the second housing portion 160 includes four receptacle caps 178a, each configured to close the pivot portion 108g of the corresponding second limb 108e in the respective pivot receptacle 166b of the flange 166 of the first housing portion 156. The flange 178 may also include a plurality of mounting apertures (not shown) in registration with the mounting apertures 166e in the flange 166 of the first housing portion 156. The flange 178 further includes a plurality of nozzle heads 182 located in registration with the network of grooves 170 in the first housing portion 156 at the flange 166. The nozzle heads 182 operate as outlets for water flow through the cup assembly 26.

The water distribution donut 154 includes a ring portion 154a configured to surround the stem portion 158 of the first housing portion 156. An L-shaped inlet portion 154b extends from one side of the ring portion 154a. The inlet portion 154b is configured to project toward the water inlet aperture 130 in the U-shaped sidewall 120 of the outer housing 102. The inlet portion 154b may be coupled to the top wall 118 of the outer housing 102 with a pair of fasteners 154c as well understood in the art. The ring portion 154a further includes a plurality of outlet couplings 154d configured to sealingly engage the plurality of donut couplings 164c extending upwardly from the first partially-spherical wall 164. As shown most clearly in FIGS. 5A-5C, the ring portion 154a is configured to sit in the central recessed portion 124 of the outer housing 102 when the cup assembly 26 is fully assembled. Consequently, the water distribution donut 154, the first housing portion 156, and the second housing portion 160 collectively define the fluid delivery system 112. The fluid delivery system 112 defines a flow passageway from the inlet portion 154b through the ring portion 154a, the donut couplings 164c, and the network of grooves 170 to the plurality of nozzle heads 182.

The ring gear 162 is positioned directly adjacent and below the flange 178 of the second housing portion 160. The ring gear 162 includes a plurality of interior gear teeth 162a around the entire circumference and a plurality of exterior gear teeth 162b located along one portion of the circumference. The cup assembly 26 further includes the rollers 184, which are positioned in pairs about the circumference of the ring gear 162. As described above, each pair of rollers 184 is positioned for free rotation in the corresponding roller receptacles 128, 142 of the outer housing 102. The rollers 184 include pivot shafts 186 configured to engage the ring gear 162 to maintain the alignment of the ring gear 162 while permitting free rotation of the ring gear 162. The ring gear 162 also includes a groove 162c along a top surface configured to receive the projecting tabs 166d on the flange 166 of the first housing portion 156 (shown most clearly in FIGS. 5A-5C). On an opposing side of the ring gear 162 from the exterior gear teeth 162, a biasing element 188 is coupled to the ring gear 162. The biasing element 188 is also coupled to the outer housing 102 and may include a spring assembly, a hydraulic cylinder, or any other known biasing members. The biasing element 188 is configured to bias the ring gear 162 to rotate in a first direction, or clockwise as viewed from the "bottom side" in FIG. 4B (i.e., where the second gripping arms 110 are located).

The slip clutch 148 is shown in a disengaged position in FIG. 4B, but is configured to engage the exterior gear teeth 162b of the ring gear 162. The slip clutch 148 includes the bottom end 148a, a gear wheel 148b, and a top end 148c configured to be mounted in corresponding structure (not shown) of the outer housing 102. As well understood in the clutch art, the slip clutch 148 is mounted such that the gear wheel 148b is free to rotate in one direction but locked from rotating in the opposite direction. The slip clutch 148 is also mounted for lateral movement along its axis of rotation such that the gear wheel 148b can move between an engaged position meshing with the exterior gear teeth 162 of the ring gear 162 and the disengaged position shown in FIG. 4B. In this regard, when the slip clutch 148 is in the engaged position, the gear wheel 148b only permits free rotation of the ring gear 162 in a second direction, or counterclockwise as viewed from the "bottom side" in FIG. 4B.

As shown in FIGS. 4A and 4B, the gear wheels 110d of the second gripping arms 110 and the idler gears 174 are engaged with the interior gear teeth 162a of the ring gear 162. The slip clutch 148 is normally in the engaged position wherein the gear wheel 148b engages the exterior gear teeth 162b of the ring gear 162. Consequently, pivotal rotation of the second gripping arms 110 inwardly toward one another causes rotation of the ring gear 162 in the second direction (counterclockwise) by virtue of the engagement with the gear wheels 110d. Although the biasing element 188 operates against this rotation in the second direction (counterclockwise), the gear wheel 148b of the slip clutch 148 locks the ring gear 162 from rotating in the first direction (clockwise). The slip clutch 148 therefore locks the ring gear 162 in position when the second gripping arms 110 rotate inwardly to grab a unit of fruit 8.

When the unit of fruit 8 is ready to be released from the second gripping arms 110, the bottom end 148*a* of the slip clutch 148 may be pressed to move the slip clutch 148 to the disengaged position, which then permits the biasing element 188 to force the ring gear 162 to rotate in the first direction (clockwise), thereby also rotating the second gripping arms 110 back to the position shown in FIGS. 4A and 4B. It will be appreciated from FIG. 3B that the bottom end 148*a* of the slip clutch 148 projects through the clutch aperture 146 in the outer housing 102 so that the slip clutch 148 may be moved to the disengaged position manually when the cup assembly 26 is removed from the apparatus 10, or by a pushing member (not shown in FIG. 3B) on the drive assembly 28 during operation of the apparatus 10.

The cup 106 is configured to be disposed around the stem portion 158 of the inner housing 104 between the water distribution donut 154 and the first housing portion 156. The cup 106 defines a funnel shape and includes an upper surface 106*a* and a lower surface 106*b*. The upper surface 106*a* is configured to engage a coil spring 190 disposed between the cup 106 and the central recessed portion 124 of the outer housing 102. The coil spring 190 biases the cup 106 downwardly (upwardly in the orientation of FIG. 4B) towards the inner housing 104. The lower surface 106*b* of the cup 106 includes four cam fingers 192 projecting toward the inner housing 104. The cam fingers 192 are configured to project through the slots 168, 180 in the inner housing 104 and engage the cam pins 108*d* of the first gripping arms 108. In this regard, the coil spring 190 biases the cam pins 108*d* to slide along the cam fingers 192 and thereby rotate the first limbs 108*a* and the second limbs 108*e* of the first gripping arms 108. This operation is more clearly shown in FIGS. 5A-5C.

Figure 5A:
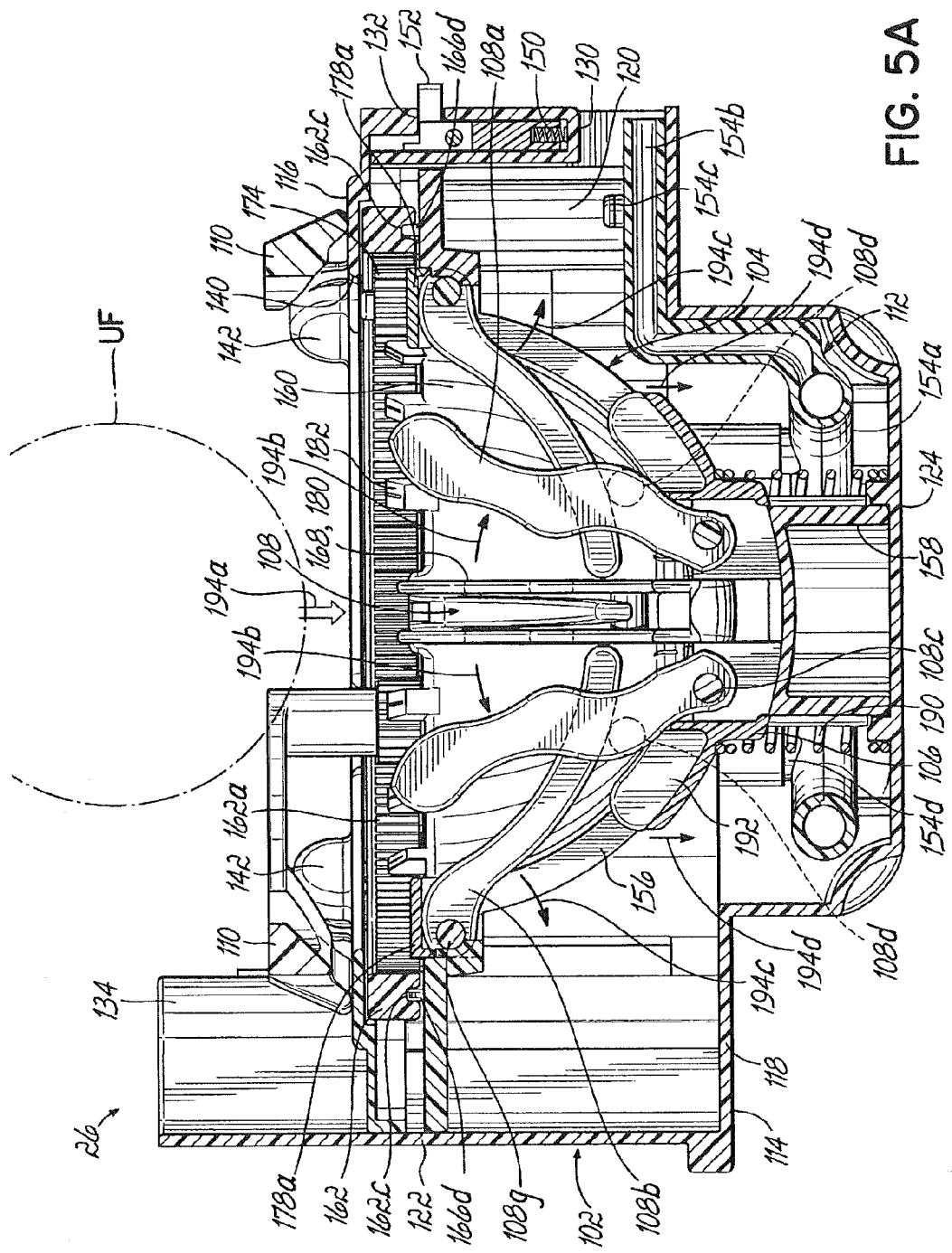
FIG. 5A is a cross-sectional side view of the cup assembly of FIG. 3A, in a first position, with the unit of fruit shown moving toward the cup assembly.

FIG. 5A shows the cup assembly 26 in a first position prior to insertion and gripping of a unit of fruit 8 (shown in phantom). In this first position, the second gripping arms 110 are rotated away from the unit of fruit 8 to allow movement of the unit of fruit 8 past the second gripping arms 110 into engagement with the first gripping arms 108. The cup 106 is biased by the coil spring 190 completely into engagement with the first housing portion 156 of the inner housing 104 such that the cam fingers 192 force the cam pins 108*d* of the first gripping arms 108 upwardly. The cam pins 108*d* force the free ends of the first limbs 108*a* and the second limbs 108*e* inwardly away from the inner housing 104. The unit of fruit 8 may then be pushed into the cup assembly 26 in the direction of arrow 194*a*. The unit of fruit 8 engages the first limbs 108*a* of the first gripping arms 108 and forces them outwardly as shown by arrows 194*b*. This, in turn, forces the cam pins 108*d* to move the second limbs 108*e* outwardly as shown by arrows 194*c* and forces the cup 106 away from the inner housing 104 against the bias of the coil spring 190 as shown by arrows 194*d*.

Figure 5B:
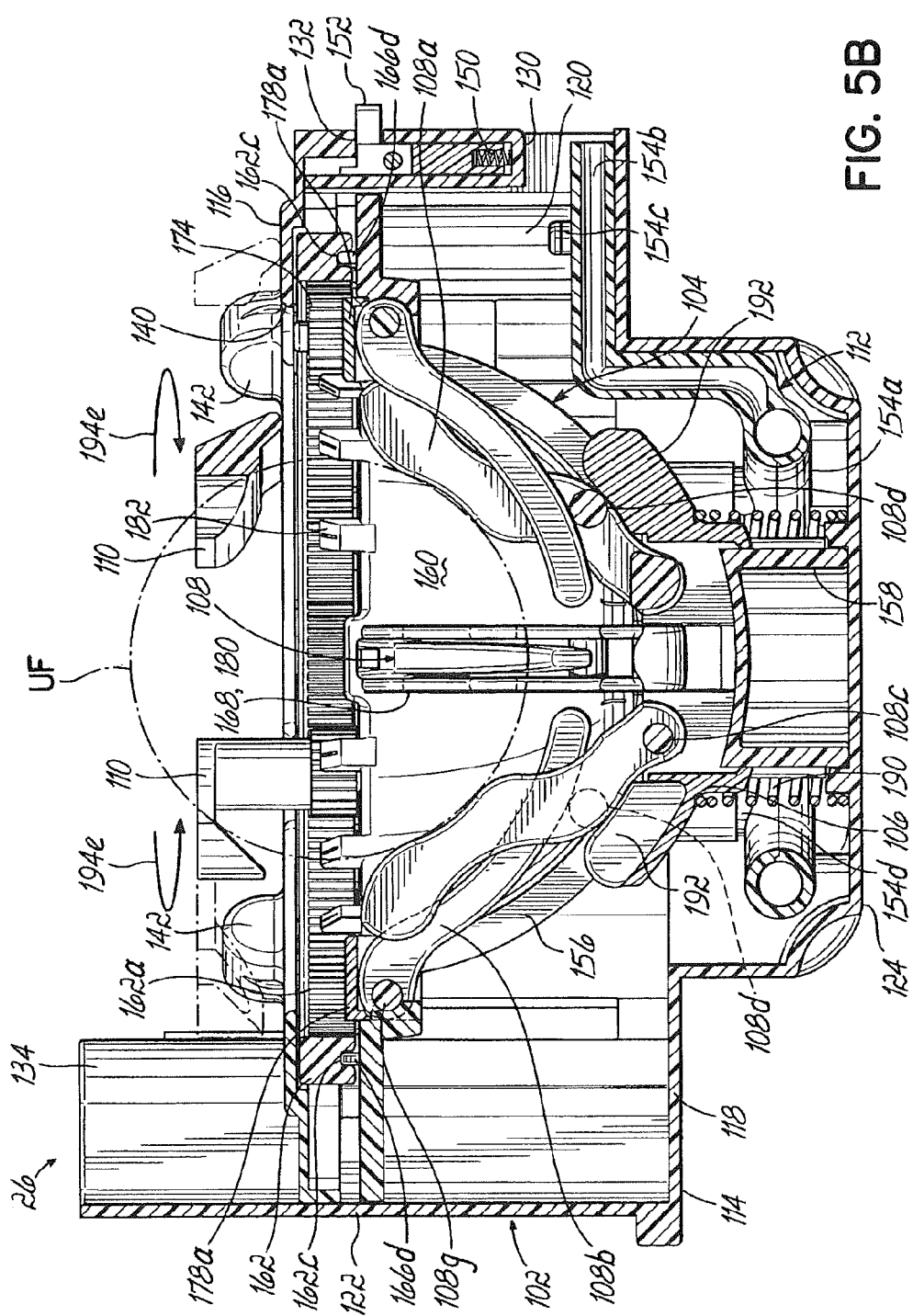
FIG. 5B is a cross-sectional side view of the cup assembly of FIG. 3A, in a second position, with the unit of fruit located partially within the cup assembly.

If the unit of fruit 8 is relatively small such as an apple, the first gripping arms 108 will be forced into the second position shown in FIG. 5B. In this second position, the cup 106 is partially compressing the coil spring 190. The first limbs 108*a* of the first gripping arms 108 actively support the unit of fruit 8 along one side. The second gripping arms 110 may then be rotated inwardly as shown by arrows 194*e* to grip the other side of the unit of fruit 8. As described previously, the interaction of the slip clutch 148 with the ring gear 162 prevents the second gripping arms 110 from releasing until the slip clutch 148 is pushed to the disengaged position. To this end, the unit of fruit 8 is reliably secured within the cup assembly 26 for further operations including cleaning and impaling, as described in further detail below.

Alternatively, if the unit of fruit 8 is relatively large such as a grapefruit, the first gripping arms 108 will be further forced into the third position shown in FIG. 5C. In this third position, the cup 106 is almost or entirely compressing the coil spring 190. Additionally, the second limbs 108*e* of the first gripping arms 108 actively support the unit of fruit 8 along one side. The additional movement of the first limbs 108*a*, the second limbs 108*e*, and the cup 106 are shown by arrows 194*f*. Similar to the previous operation, the second gripping arms 110 may then be rotated inwardly as shown by arrows 194*g* to grip the other side of the unit of fruit 8. Thus, the unit of fruit 8 is reliably secured within the cup assembly 26 for further operations.

Figure 5D:
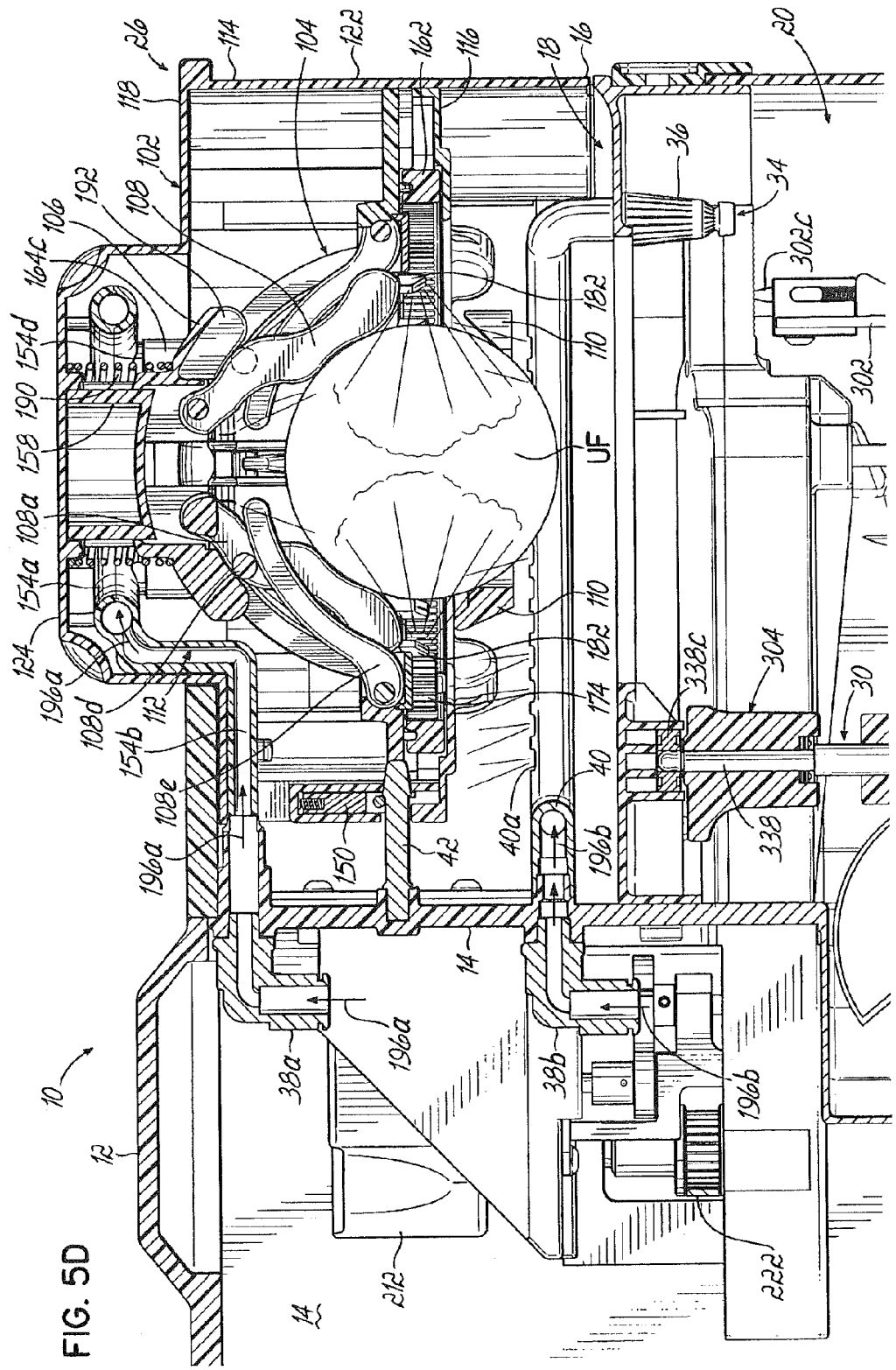
FIG. 5D is a cross-sectional side view of the cup assembly of FIG. 3A, positioned within the apparatus of FIG. 1 and in a spraying state.

Once the unit of fruit 8 is reliably secured within the cup assembly 26, the cup assembly 26 may be inserted into the cup receptacle 18 as shown in FIG. 5D. In this position, the bottom of the unit of fruit 8 is exposed between the second gripping arms 110 for impaling by the drive assembly 28. Prior to this impaling operation, the unit of fruit 8 is sprayed with a mixture of water and about 150 parts per million peracetic acid (also known as peroxyacetic acid, or PAA). The peracetic acid kills 99.9% of all surface microorganisms residing on the surface of the unit of fruit 8. The water/PAA mixture is delivered to the unit of fruit 8 by the fluid delivery system 112. The inlet portion 154*b* of the water distribution donut 154 is coupled with a first supply port 38*a* extending forwardly from the rear housing portion 14 and through the water inlet aperture 130. The water/PAA mixture follows the flow passageway of the fluid delivery system 112 as shown by arrows 196*a* from the first supply port 38*a* to the nozzle heads 182 in the inner housing 104 that surround the unit of fruit 8. In some embodiments the second partially-spherical wall 176 includes flow apertures at an opposing end of the network of grooves 170 from the nozzle heads 182, which permits further spray of the water/PAA mixture onto the top of the unit of fruit 8 as shown in FIG. 5D.

Additionally, a U-shaped spray pipe 40 may be disposed along the bottom of the cup receptacle 18 as shown in FIGS. 2 and 5D. The U-shaped spray pipe 40 is coupled to a second supply port 38*b* extending forwardly from the rear housing portion 14 into the cup receptacle 18. The free ends of the U-shaped spray pipe 40 communicate with spray nozzles 36 directed downwardly into the cutting area 20 of the apparatus 10. However, the U-shaped spray pipe 40 includes a plurality of flow apertures 40*a* along an upper side that face the cup assembly 26 and the unit of fruit 8. Thus, the water/PAA mixture can be delivered to a bottom side of the unit of fruit 8 via the U-shaped spray pipe 40 as shown by arrows 196*b*, simultaneously with the spray operation of the fluid delivery system 112 in the cup assembly 26. The unit of fruit 8 is therefore ready for impaling by the drive assembly 28 and cutting by the cutting assembly 30.

Also shown in FIG. 5D, the main housing 12 includes a coupling member 42 or rod extending forwardly into the cup receptacle 18 from the rear housing portion 14. The coupling member 42 is configured to engage the spring-loaded prongs 152 of the snap coupler 150 when the cup assembly 26 is fully inserted into the cup receptacle 18. As readily understood in the coupler art, the spring-loaded prongs 152 apply a coupling force to the coupling member 42 that may be overcome readily by a user when the cup assembly 26 is to be removed from the main housing 12. However, the cup assembly 26 is reliably held by this coupling within the main housing 12 during the preparation of the unit of fruit 8 placed in the cup assembly 26.

Figure 6A:
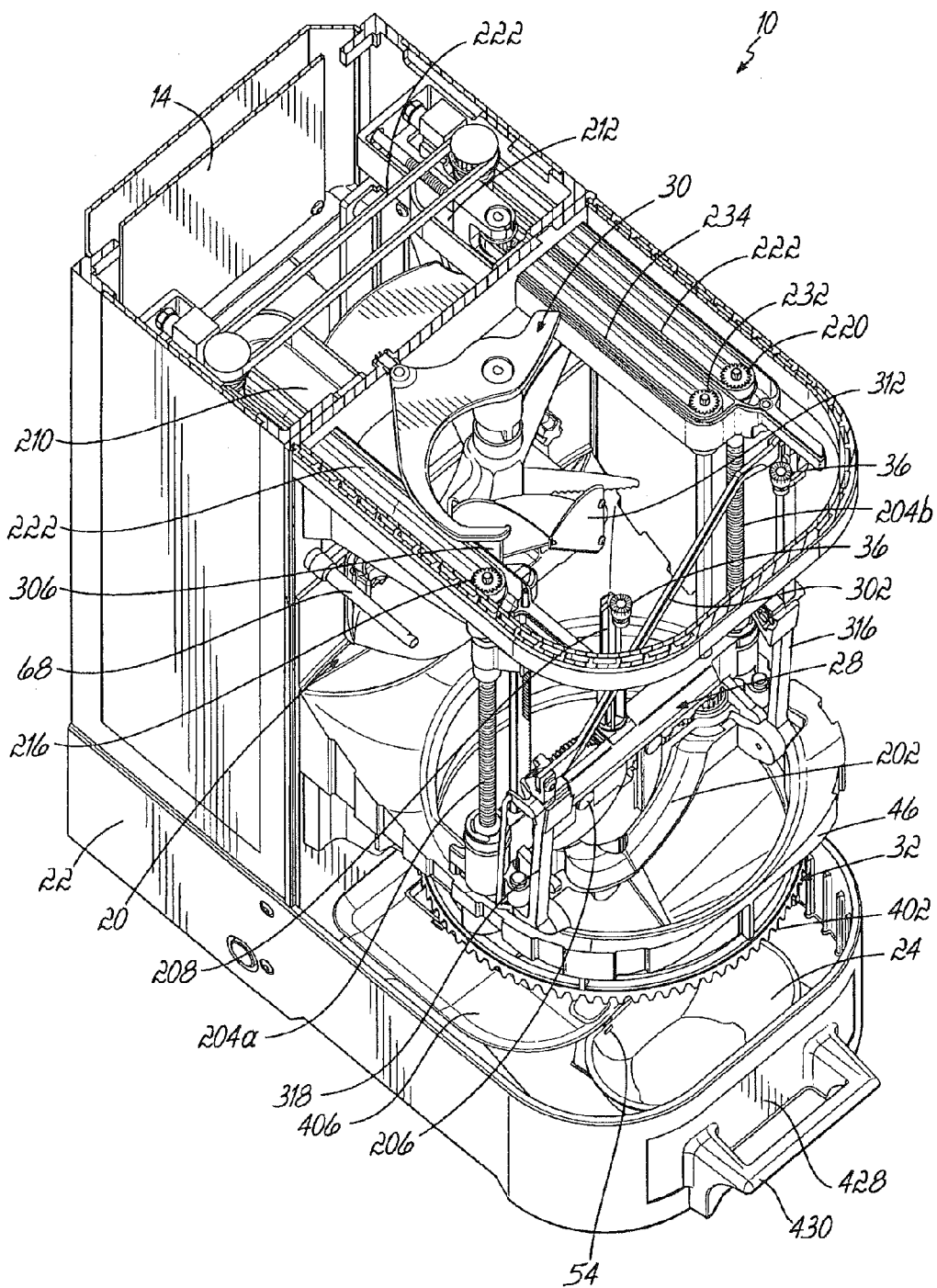
FIG. 6A is a perspective view of the apparatus shown in FIG. 1, with the cup assembly and cup receptacle removed to show interior details.
Figure 6B:
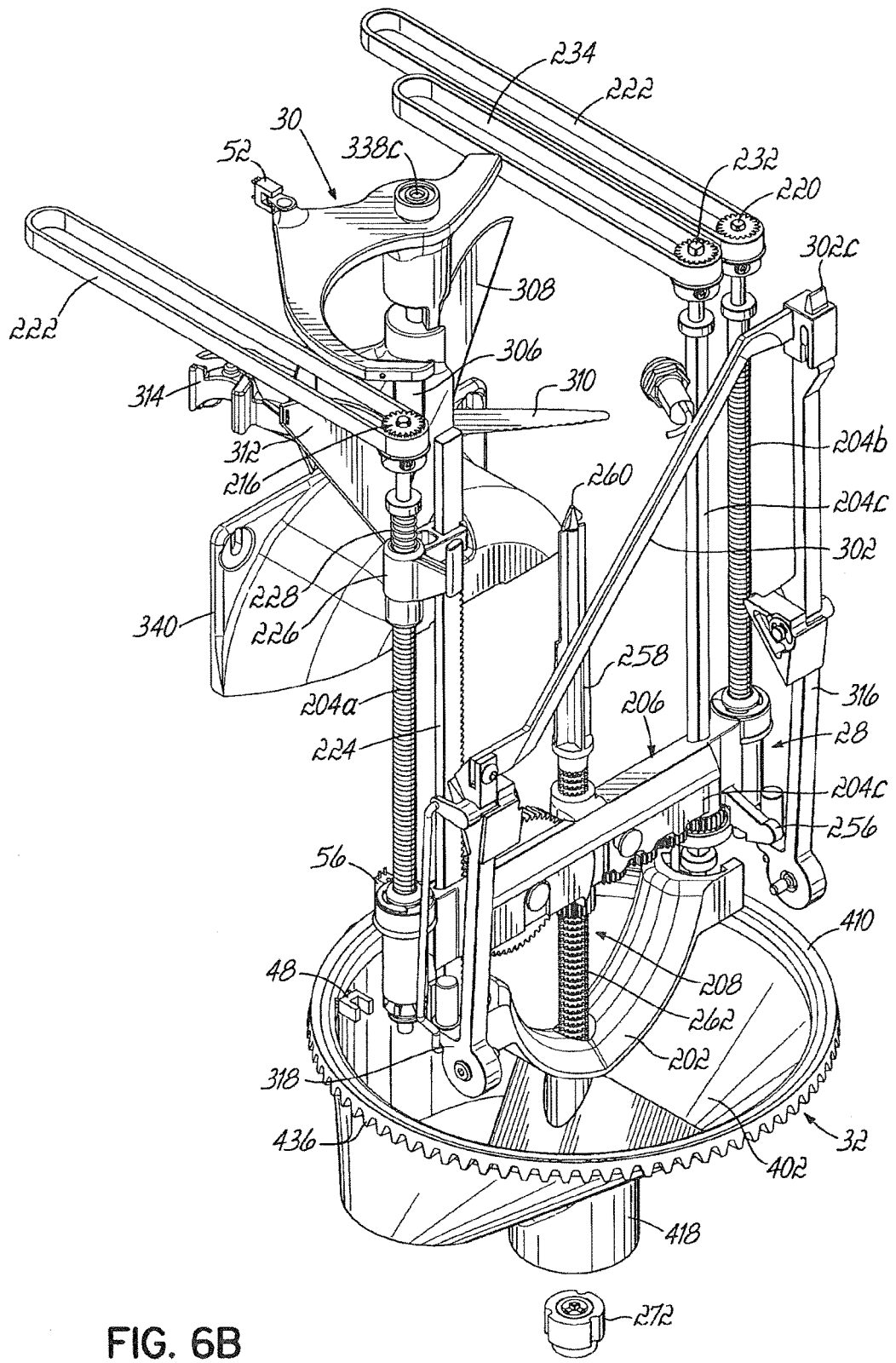
FIG. 6B is a perspective view of the drive assembly, i.e. the holder or lance, the cutting assembly, and the deflector assembly of the apparatus shown in FIG. 6A.

FIGS. 6A and 6B show perspective views of the apparatus 10 with the cup assembly 26 and the cup receptacle 18 removed to more clearly show the interaction of the subassemblies within the cutting area 20. More particularly, FIG. 6A illustrates that the drive assembly 28 includes a yoke 202 coupled to the main housing 12, three drive shafts 204a, 204b, 204c extending upwardly from the yoke 202, a bridge member 206 moveable on the first and second drive shafts 204a, 204b, a lance 208 moveable with respect to the bridge member 206, and a drive system including a first motor 210 operatively coupled to the first and second drive shafts 204a, 204b and a second motor 212 operatively coupled to the third drive shaft 204c. The first and second motors 210, 212 (shown most clearly in FIG. 12) are configured to drive the bridge member 206 and the lance 208 with respect to the cutting assembly 30, which includes a peeling blade 302 disposed in front of the bridge member 206 and a rotatable blade assembly 304 disposed behind the bridge member 206. The blade assembly 304 includes a coring blade 306, a vertical sectioning blade 308, a horizontal sectioning blade 310, a pair of wedging blades 312, and a de-coring member 314, each configured to perform a cutting operation on the unit of fruit 8 impaled on the lance 208. The specific operation and interaction of these components of the drive assembly 28 and the cutting assembly 30 are described in further detail below.

FIGS. 6A and 6B also illustrate the deflector assembly 32, which includes the funnel-shaped deflector 402. The funnel-shape deflector 402 is configured to route waste material from the cutting area 20 to a disposal outlet 44 and route consumable cut pieces of fruit to the tray 24. The main housing 12 further includes a structural member 46 that extends into the cutting area 20 and surrounds the top periphery of the deflector 402. The yoke 202 and drive shafts 204a, 204b, 204c of the drive assembly 28 may be mounted on the structural member 46 to accurately locate these components within the main housing 12. As shown most clearly in FIG. 6A, the structural member 46 is also partially funnel-shaped to encourage waste material and consumable cut pieces of fruit to enter the deflector 32 for routing to the appropriate destination. Further details of the deflector assembly 32 and its operation are provided below.

The drive assembly 28 is further illustrated in FIGS. 7A-7H. The yoke 202 and first and second motors 210, 212 are removed from the views in FIGS. 7A and 7B for clarity. The first drive shaft 204a includes a top end 214a engaged with a first drive gear 216, a bottom end 214b rotatably engaged with and supported by the structural member 46 or the yoke 202, and a helical augur 214c disposed along a substantial portion of the first drive shaft 204a between the top end 214a and the bottom end 214b. In a similar manner, the second drive shaft 204b includes a top end 218a engaged with a second drive gear 220, a bottom end 218b rotatably engaged with and supported by the structural member 46 or the yoke 202, and a helical augur 218c disposed along a substantial portion of the second drive shaft 204b between the top end 218a and the bottom end 218b. The first motor 210 is operatively coupled to each of the first and second drive gears 216, 220 by a plurality of drive belts 222 shown most clearly in FIGS. 6A and 6B. The drive belts 222 ensure that the first and second drive gears 216, 220 rotate the first and second drive shafts 204a, 204b simultaneously and at the same rotational speed. The first and second drive shafts 204a, 204b are configured to actuate translational movement of the bridge member 206 and the lance 208.

Figure 7A:
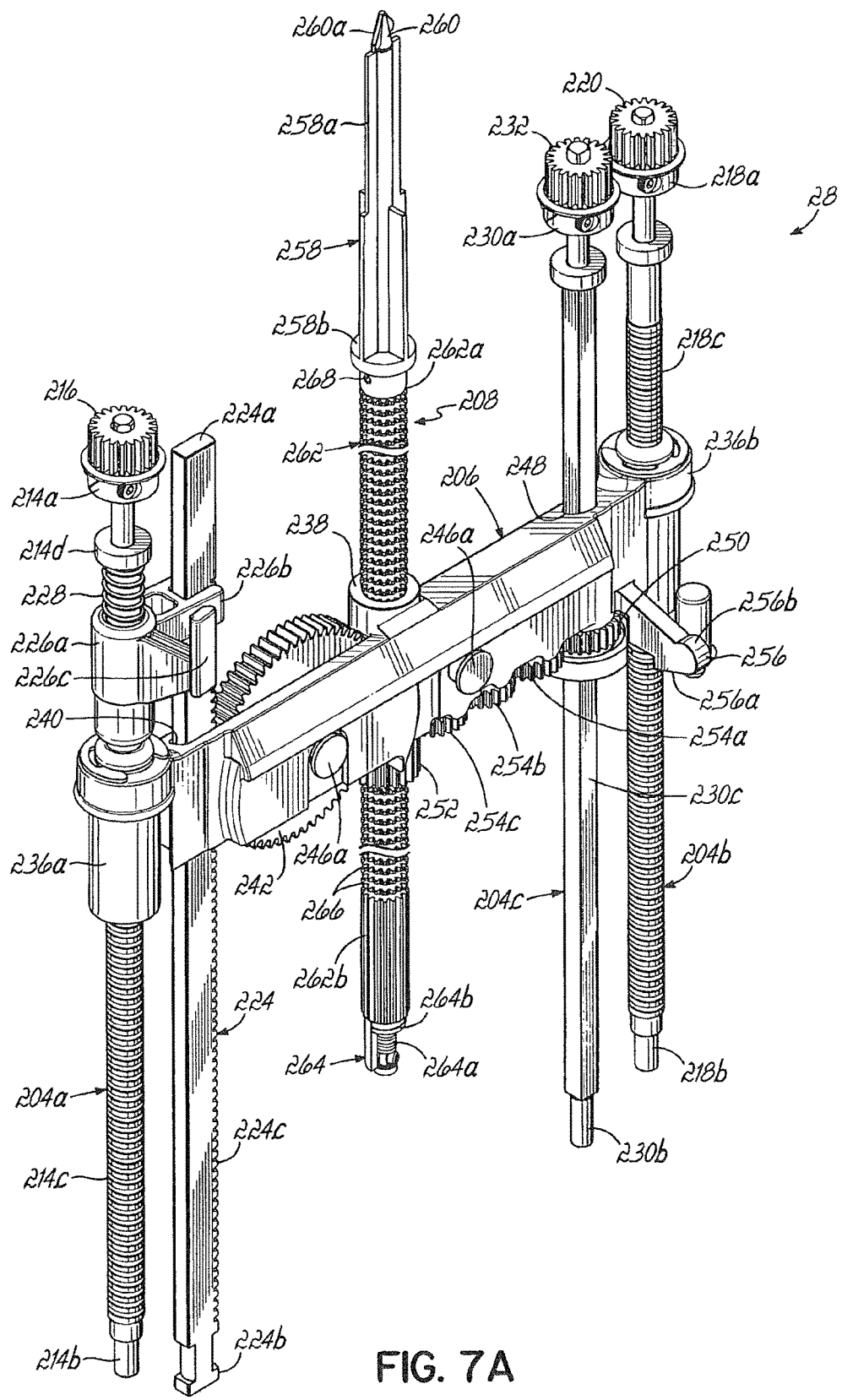
FIG. 7A is a perspective view of the drive assembly of the apparatus of FIG. 1, showing details of at least a portion of the bridge.

The drive assembly 28 further includes a rack gear 224 positioned adjacent to the first drive shaft 204a. The rack gear 224 includes a top end 224a coupled to the main housing 12, a bottom end 224b coupled to the structural member 46 or the yoke 202, and a toothed side surface 224c facing the lance 208 and extending between the top end 224a and the bottom end 224b. The rack gear 224 and the first drive shaft 204a are engaged by a spacer member 226 as shown in FIG. 7A. The spacer member 226 includes a cylindrical portion 226a disposed around the first drive shaft 204a, an H-shaped arm 226b extending outwardly from the cylindrical portion 226a and partially surrounding the rack gear 224, and a slip clutch actuator 226c extending outwardly from the cylindrical portion 226a. The spacer member 226 is free to slide along the first drive shaft 204a and the rack gear 224, but is biased away from an intermediate platform 214d of the first drive shaft 204a by a compression spring 228. Consequently, the default position of the spacer member 226 is shown in FIG. 7A. The operation of the slip clutch actuator 226c is described in further detail with reference to FIGS. 8A-8F, below.

The third drive shaft 204c includes a top end 230a engaged with a third drive gear 232, a bottom end 230b rotatably engaged with and supported by the structural member 46 or the yoke 202, and an intermediate portion 230c disposed between the top end 230a and the bottom end 230b. The second motor 212 is operatively coupled to the third drive gears 232 by a belt 234 shown most clearly in FIGS. 6A and 6B. The third drive shaft 204c is configured to actuate rotation of the lance 208, as explained in further detail below.

Figure 7B:
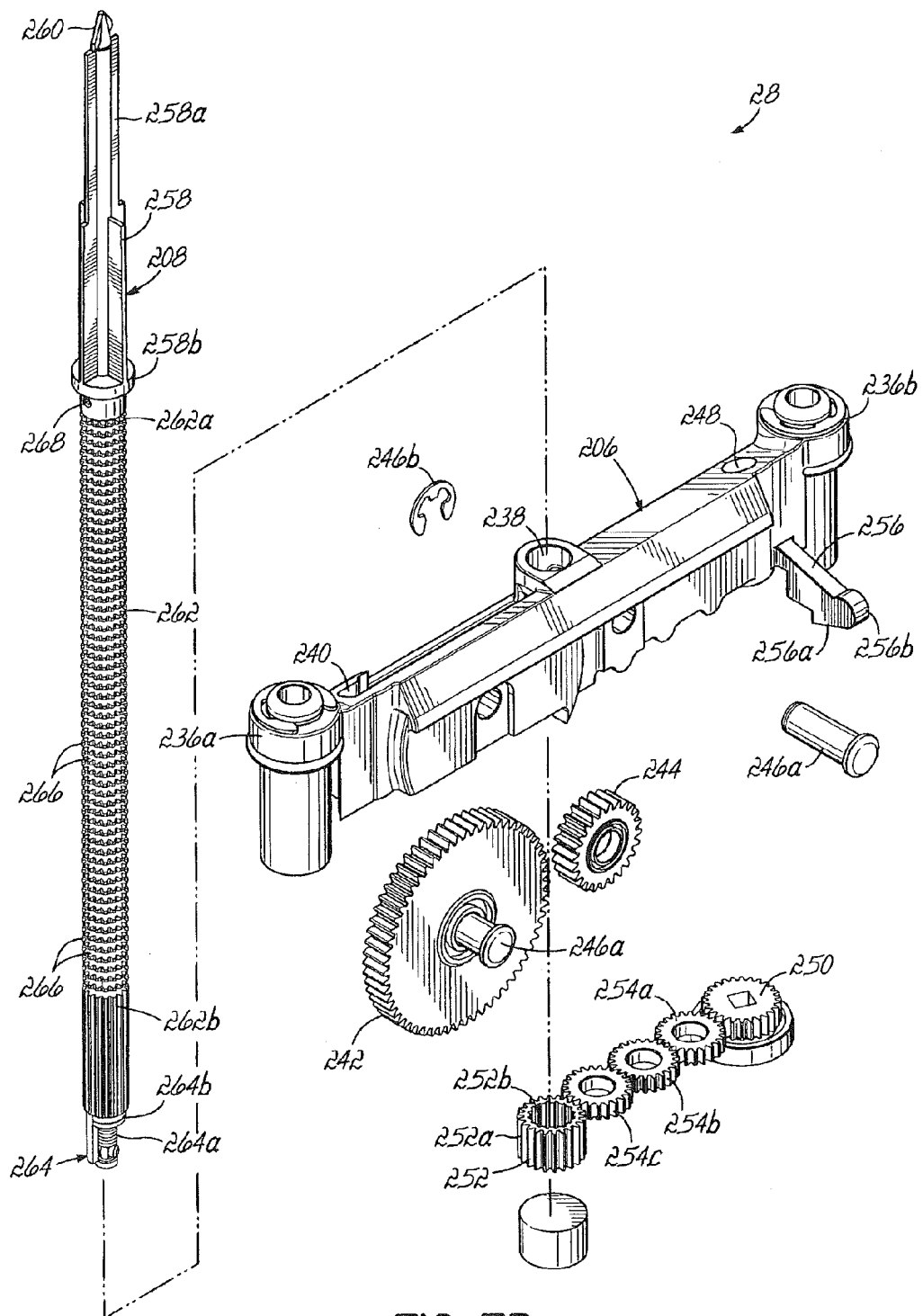
FIG. 7B is a partially exploded view of the drive assembly and bridge shown in FIG. 7A.
Figure 7C:
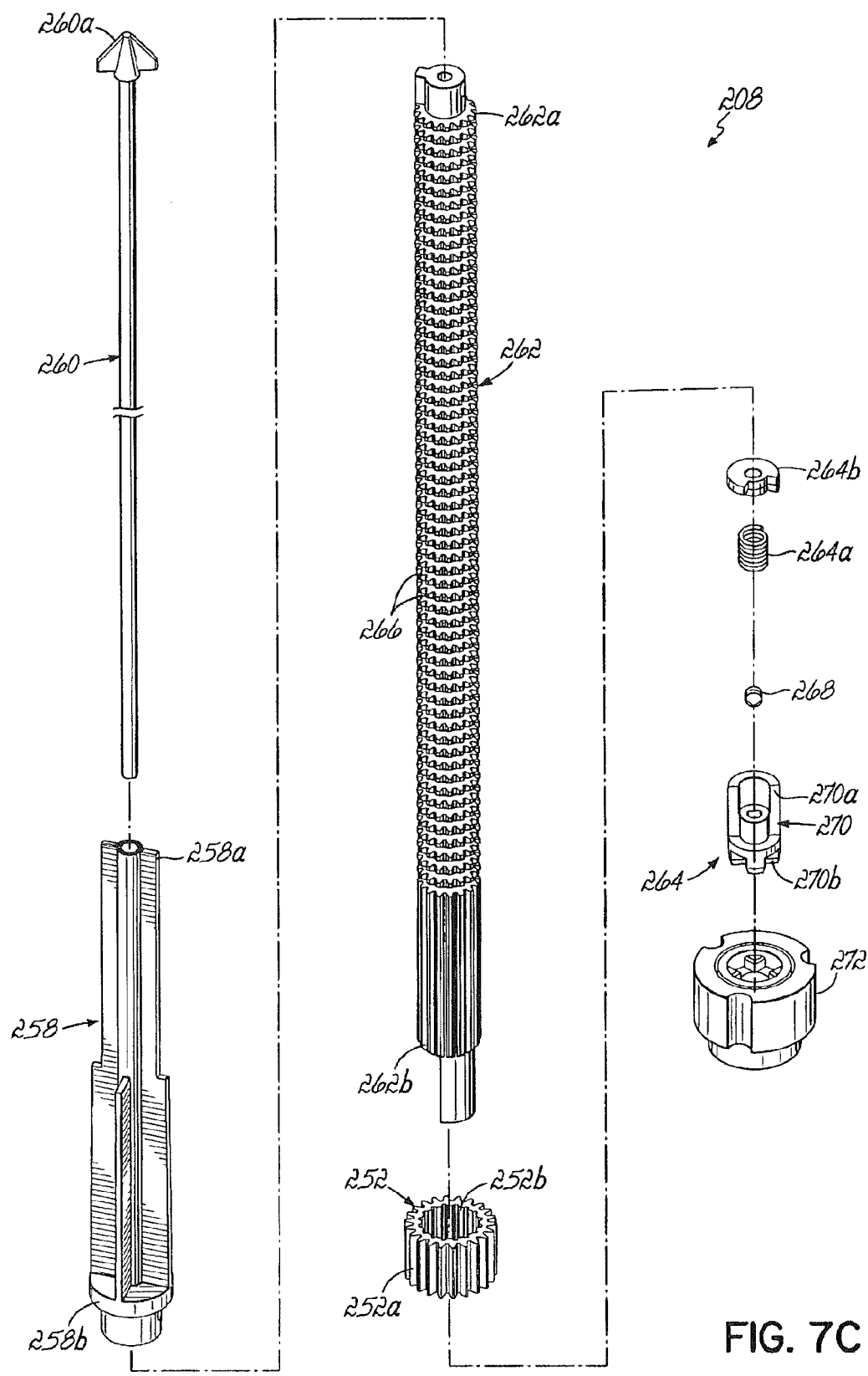
FIG. 7C is a partially exploded view of the lance of the drive assembly that is shown in FIG. 7A, showing details of the tip of the lance.
Figure 7D:
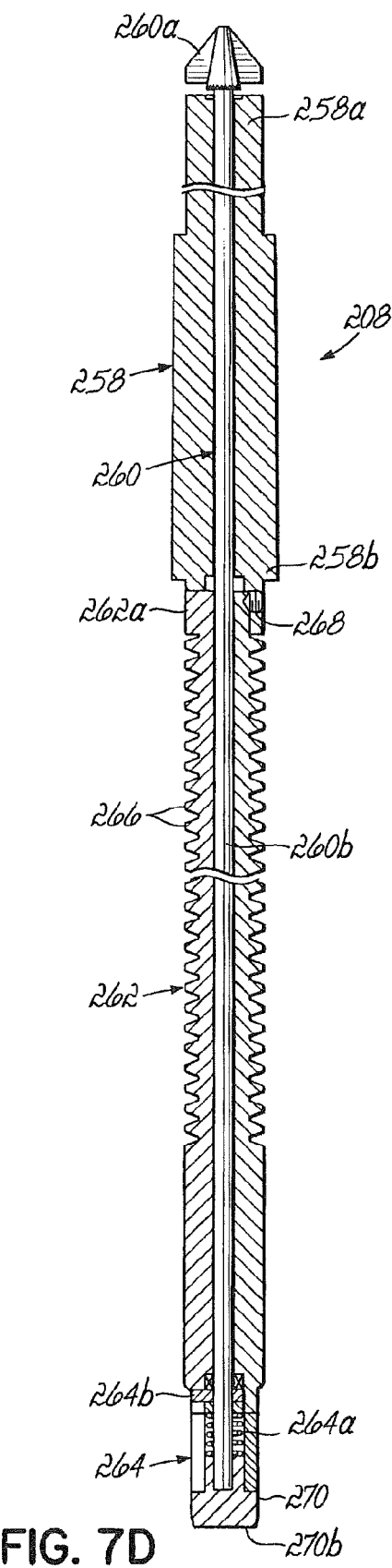
FIG. 7D is a cross-sectional side view of the lance shown in FIG. 7C, showing the tip aligned with a holding spike.
Figure 7E:
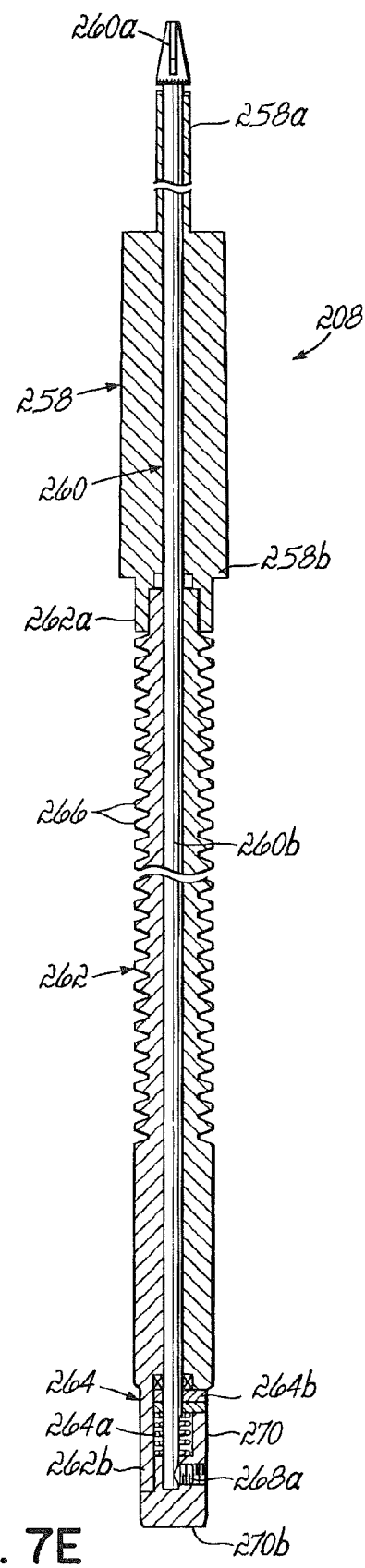
FIG. 7E is a cross-sectional front view, similar to FIG. 7D, and again showing the lance tip aligned with the holding spike, but from a view that is 90° displaced from the view of FIG. 7D.
Figure 7H:
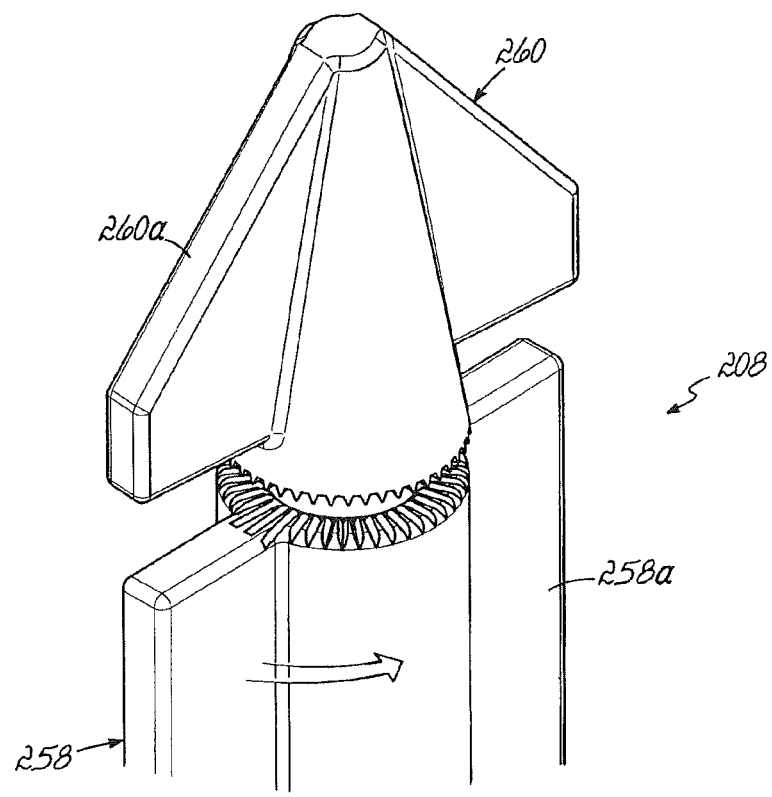
FIG. 7H is an enlarged perspective view of the lance tip shown in FIG. 7G, with the tip aligned with the holding spike.

As shown most clearly in FIG. 7B, the bridge member 206 includes a first drive collar 236a and a second drive collar 236b on opposing ends of the bridge member 206. The first drive collar 236a engages the helical augur 214c of the first drive shaft 204a, while the second drive collar 236b engages the helical augur 218c of the second drive shaft 204b. The first and second drive collars 236a, 236b may be threaded internally as well understood such that the bridge member 206 is actuated to move up and down the first and second drive shafts 204a, 204b as the respective helical augurs 214c, 218c rotate. To this end, the first motor 210 is operable to move the bridge member 206 upwardly and downwardly within the main housing 12 of the apparatus 10.

The bridge member 206 further includes a central aperture 238 configured to receive the lance 208. Between the central aperture 238 and the first drive collar 236a is a rack slot 240 configured to slidingly receive the rack gear 224. A first lance drive gear 242 is coupled to the bridge member 206 so as to extend between the rack gear 224 in the rack slot 240 and the central aperture 238. An idler gear 244 is also coupled to the bridge member 206 on the opposing side of the central aperture 238. The teeth of the first lance drive gear 242 and the idler gear 244 extend generally horizontally so as to engage spaces between toothed pinions 266 on the lance 208. The first lance drive gear 242 and the idler gear 244 are coupled to the bridge member 206 with standard gear shafts 246a and locking collars 246b, as well understood in the art and shown in FIG. 7B.

Between the central aperture 238 and the second drive collar 236b, a through-hole 248 is provided and configured to receive the third drive shaft 204c. A second lance drive gear 250 is coupled to the bridge member 206 adjacent to the through-hole 248 and receives the third drive shaft 204c. The second lance drive gear 250 is configured to rotate with the third drive shaft 204c. The second lance drive gear 250 is engaged with a third lance drive gear 252 by a plurality of intervening gears 254a, 254b, 254c, each of which is attached to the bottom side of the bridge member 206. The third lance drive gear 252 includes vertically-extending external teeth 252a and internal teeth 252b. The external teeth 252a mesh with one of the intervening gears 254c, while the internal teeth 252b surround and mesh with teeth of the toothed pinions 266 on the lance 208. Therefore, the second motor 212 actuates the lance 208 to rotate via the third drive shaft 204c, the second lance drive gear 250, and the third lance drive gear 252. The bridge member 206 further includes a peeling actuator 256 projecting forwardly from the bridge member 206 adjacent to the through-hole 248 and second drive collar 236b, for reasons set forth in further detail with reference to FIGS. 8A-8F below.

Also shown in FIG. 7B, the lance 208 includes a holding spike 258 with a tip 260, a drive portion 262 extending below the holding spike 258, and a tip rotation mechanism 264 disposed at the bottom of the drive portion 262. The holding spike 258 and the tip 260 are configured to impale the unit of fruit 8 in the cup assembly 26 and then reliably hold the unit of fruit 8 during subsequent movement and cutting operations. The drive portion 262 includes a plurality of toothed pinions 266 spaced from one another in the vertical direction such that the drive portion 262 effectively presents gear teeth both horizontally and vertically along its length. In this regard, the teeth of the toothed pinions 266 engage the internal teeth 252b of the third lance drive gear 252 adjacent the bottom of the bridge member 206, and the vertical spaces between the toothed pinions 266 engage the first lance drive gear 242 and the idler gear 244.

In operation, the first motor 210 is actuated to rotate the first and second drive shafts 204a, 204b, which translate the bridge member 206 along the helical drive augurs 214c, 218c. As the bridge member 206 translates, the toothed pinions 266 are supported by the horizontally-extending teeth of the first lance drive gear 242 and the idler gear 244. Additionally, the bridge member 206 also translates with respect to the rack gear 224, which forces the first lance drive gear 242 to rotate as the bridge member 206 moves. Consequently, the first lance drive gear 242 also actuates the lance 208 to translate with respect to the bridge member 206 as the bridge member 206 translates. Therefore, the lance 208 translates approximately twice as fast as the bridge member 206. This arrangement allows the apparatus 10 to be more compact in height because the lance 208 can translate all the way into the cup assembly 26 without the bridge member 206 moving out of the cutting area 20. It will be understood that the toothed pinions 266 freely slide through the third lance drive gear 252 as the bridge member 206 translates.

Also in operation, the second motor 212 is actuated to rotate the third drive shaft 204c, which rotates the second lance drive gear 250 and the third lance drive gear 252. As the third lance drive gear 252 rotates, the toothed pinions 266 engage the internal teeth 252b of the third lance drive gear 252 and the lance 208 rotates. It will be understood that the toothed pinions 266 rotate freely through the first lance drive gear 242 and the idler gear 244 supporting the lance 208. Consequently, the drive assembly 28 enables translational and rotational movement of the lance 208, which enables each of the cutting steps described in further detail below.

The rotatable tip 260 of the lance 208 and the tip rotation mechanism 264 are shown in further detail in FIGS. 7C-7H. With specific reference to FIGS. 7C-7E, the tip 260 includes a two-pronged head 260a and an elongate rod 260b that extends all the way through the holding spike 258 and the drive portion 262. A top portion 258a of the holding spike 258 also includes two prongs configured to rotate into and out of alignment with the two prongs of the head 260a. The holding spike 258 also includes a bottom end 258b coupled to a top keyed end 262a of the drive portion 262 with a set screw 268. A bottom end 262b of the drive portion 262 defines a partial arc surrounding approximately 90 degrees of the circumference of the elongate rod 260b. The tip rotation mechanism 264 includes a locking base 270 coupled to the elongate rod 260b with a set screw 268, a spring 264a disposed between the locking base 270 and the drive portion 262, and a double washer 264b disposed between the locking base 270 and the drive portion 262. The double washer 264b includes a notch configured to receive the arcuate bottom end 262b of the drive portion 262. The locking base 270 includes a semi-circular upper portion 270a partially surrounding the elongate rod 260b and the spring 264a. The locking base 270 also includes a bottom pronged surface 270b. The lower housing portion 22 contains a locking receptacle 272 configured to receive the bottom pronged surface 270b of the locking base 270 when the bridge member 206 and the lance 208 are translated to a home position.

In operation, the tip 260 may be rotated approximately 90 degrees between the first position in FIG. 7F unaligned with the prongs of the top portion 258a of the holding spike 258, to the second position in FIG. 7G aligned with the prongs of the top portion 258a. The abutting surfaces of the tip 260 and the holding spike 258 include locking teeth 276 configured to hold the tip 260 in position with respect to the holding spike 258. Whenever the tip 260 is to be rotated, the bridge member 206 moves the lance 208 to the home position such that the bottom pronged portion 270b of the locking base 270 engages the locking receptacle 272 on the lower housing portion 22. This prevents the tip 260 from rotating, and also forces the tip 260 upwardly against the spring 264a so that the locking teeth 276 between the tip 260 and the holding spike 258 disengage from each other (see FIG. 7H). Then the second motor 212 is engaged to rotate the drive portion 262 of the lance 208 as shown by arrows 278. The arcuate bottom end 262b of the drive portion 262 rotates from abutting one side of the semicircular upper portion 270a of the locking base 270 to abutting the other side of the semicircular upper portion 270a of the locking base 270. This relative rotation is about 90 degrees, as shown most clearly by the tip 260 rotating from completely out of alignment with the prongs on the top portion 258a of the holding spike 258 (FIG. 7F) to completely in alignment with the top portion 258a (FIG. 7G). Then the bridge member 206 moves the lance 208 upwardly, locking the tip 260 with respect to the holding spike 258 in the new position.

The tip 260 is rotated into the position shown in FIG. 7G to enable easy insertion of the lance 208 through the unit of fruit 8. Then once the tip 260 re-emerges from the opposite side of the unit of fruit 8 in the cup assembly 26, the bridge member 206 moves the lance 208 back to the home position such that the tip 260 may be rotated back to the position shown in FIG. 7F. As a result, the prongs of the tip 260 grab the top of the unit of fruit 8 and lock the unit of fruit 8 in position in both translational directions on the lance 208. Consequently, the cutting assembly 30 may cut into the unit of fruit 8 both while the unit of fruit 8 is translating upwardly and when the unit of fruit 8 is translating downwardly. This configuration permits the cutting operations to be performed more quickly on the unit of fruit 8.

FIGS. 8A-8F further show the operation of the peeling blade 302 of the cutting assembly 30. The peeling actuator 256 is adapted to pivot the peeling blade 302 from an active position along the translational path of the unit of fruit 8, to a passive position (also referred to as a "pass-through position") away from the translational path of the unit of fruit 8. Various aspects of the drive assembly 28 are also shown in FIGS. 8A-8F. The peeling blade 302 is angled as shown most clearly in FIG. 6B and includes a first end 302a coupled to a first support linkage 316 and a second end 302b coupled to a second support linkage 318. The first support linkage 316 includes a first link 320 having an upper end 320a and a lower end 320b pivotally coupled to the structural member 46 adjacent the yoke 202. The lower end 320b of the first link 320 includes a projection defining a first cam surface 320c. The upper end 320a of the first link 320 includes an angled portion defining a second cam surface 320d. The first support linkage 316 also includes a second link 322 having a front end 322a pivotally coupled to the upper end 320a of the first link 320 and a rear end 322b. The first support linkage 316 further includes a third link 324 having an upper end 324a pivotally coupled to the rear end 322b of the second link 322 and a lower end 324b pivotally coupled to the structural member 46. Each end 302a, 302b of the peeling blade 302 is specifically rigidly coupled to the second link 322 such that the peeling blade 302 tracks the movement of the second link 322. In a similar manner, the second support linkage 318 also includes identical first, second, and third links 320, 322, 324.

Figure 8A:
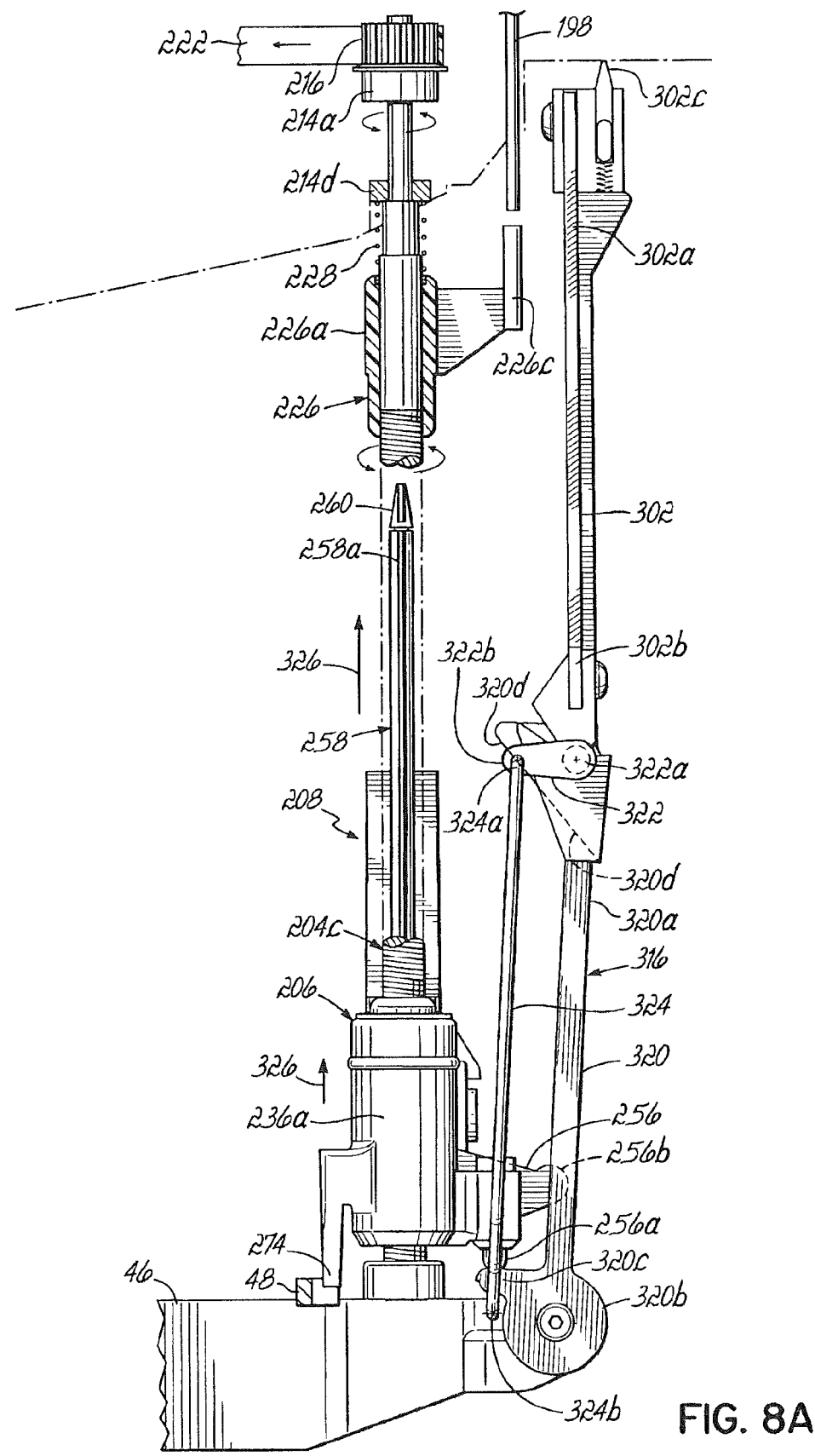
FIG. 8A is a side view of the peeling blade and the drive assembly of the apparatus of FIG. 1, with the drive assembly in a home position and the peeling blade pivoted to an active position.
Figure 8B:
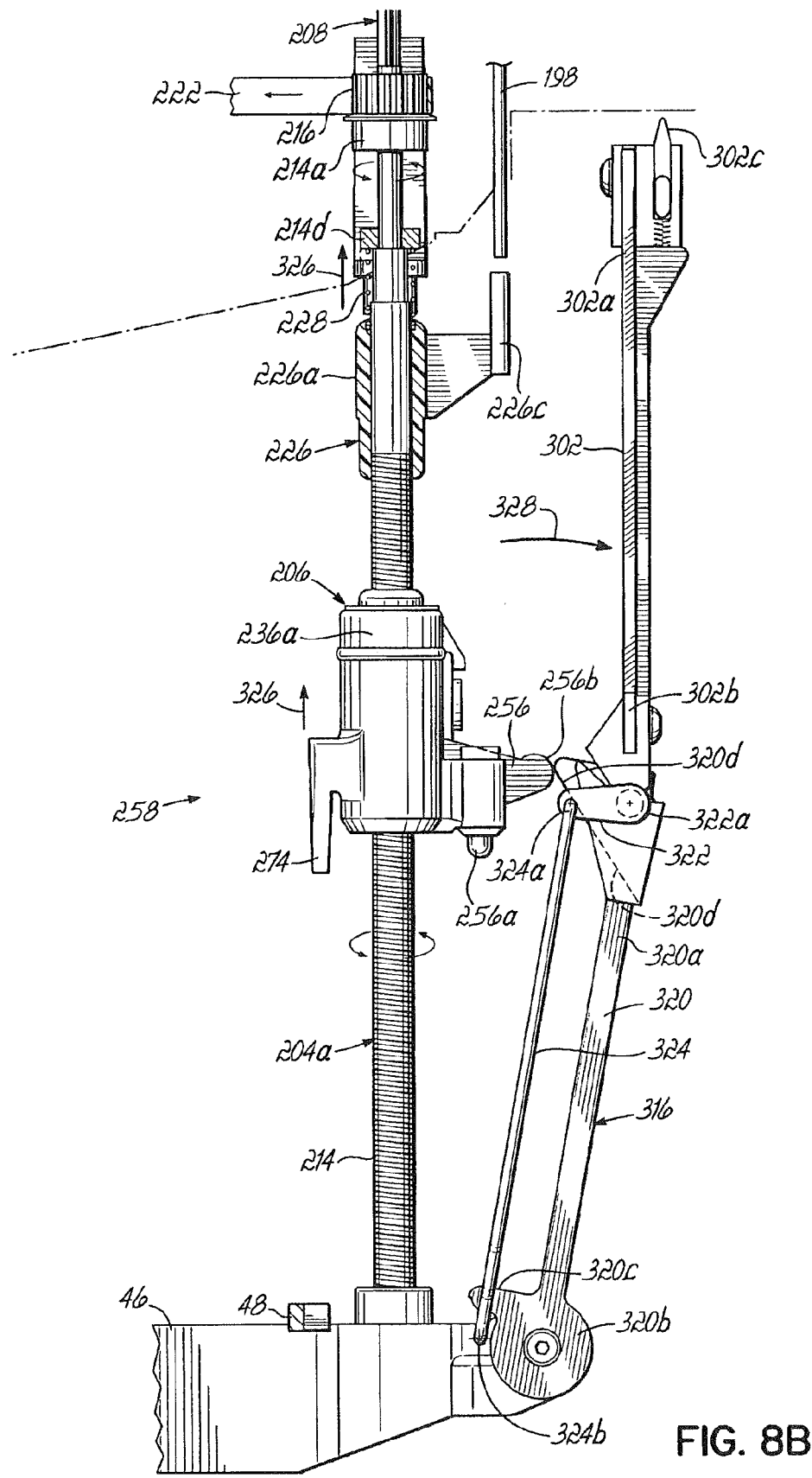
FIG. 8B is a side view of the peeling blade and the drive assembly, similar to FIG. 8A, with the drive assembly in an upper intermediate position and the peeling blade pivoted to a passive position, further displaced from the drive assembly.

The peeling actuator 256 on the bridge member 206 further includes a bottom end 256a and a top end 256b. When the bridge member 206 is translated to a home position shown in FIG. 8A such as at the beginning of a fruit preparation cycle, the bottom end 256a of the peeling actuator 256 engages the first cam surface 320c on the first link 320 of the first support linkage 316. To this end, the first link 320 is forced to rotate in a counterclockwise direction as seen in FIG. 8A. As a result of the four-bar linkage like relationship of the first, second, and third links 320, 322, 324, the first support linkage 316 tilts rearwardly to an active position. It will be understood that second link 322 remains substantially horizontal in orientation during this shift and so the peeling blade 302 remains substantially transverse to the translational path of the bridge member 206 rather than angled from the translational path (in the plane shown in FIG. 8A). It will also be understood that the second support linkage 318 always follows the movement of the first support linkage 316 in FIG. 8A and the following figures. The peeling blade 302 may also include a rigid plastic tip 302c at the first end 302a that projects upwardly into sliding engagement with the bottom boundary of the cup receptacle 18, shown in phantom in FIGS. 8A-8C.

FIG. 8A also illustrates that the tip 260 of the lance 208 is aligned with the prongs at the top portion 258a of the holding spike 258. From this home position, the first motor 210 is actuated to move the bridge member 206 in an upward direction as shown by arrows 326 in FIGS. 8A and 8B. As the bridge member 206 reaches an upper intermediate position shown in FIG. 8B, the top end 256b of the peeling actuator 256 engages the second cam surface 320d at the upper end 320a of the first link 320 at the first support linkage 316. This engagement forces the first link 320 to pivot outwardly or forwardly to a passive position as indicated by arrow 328. Again, the second link 322 remains generally horizontal such that the peeling blade 302 stays generally transverse to the translational path of the lance 208 and the unit of fruit 8. However, the peeling blade 302 is disposed out of the translational path of the unit of fruit 8 in the passive position.

Figure 8C:
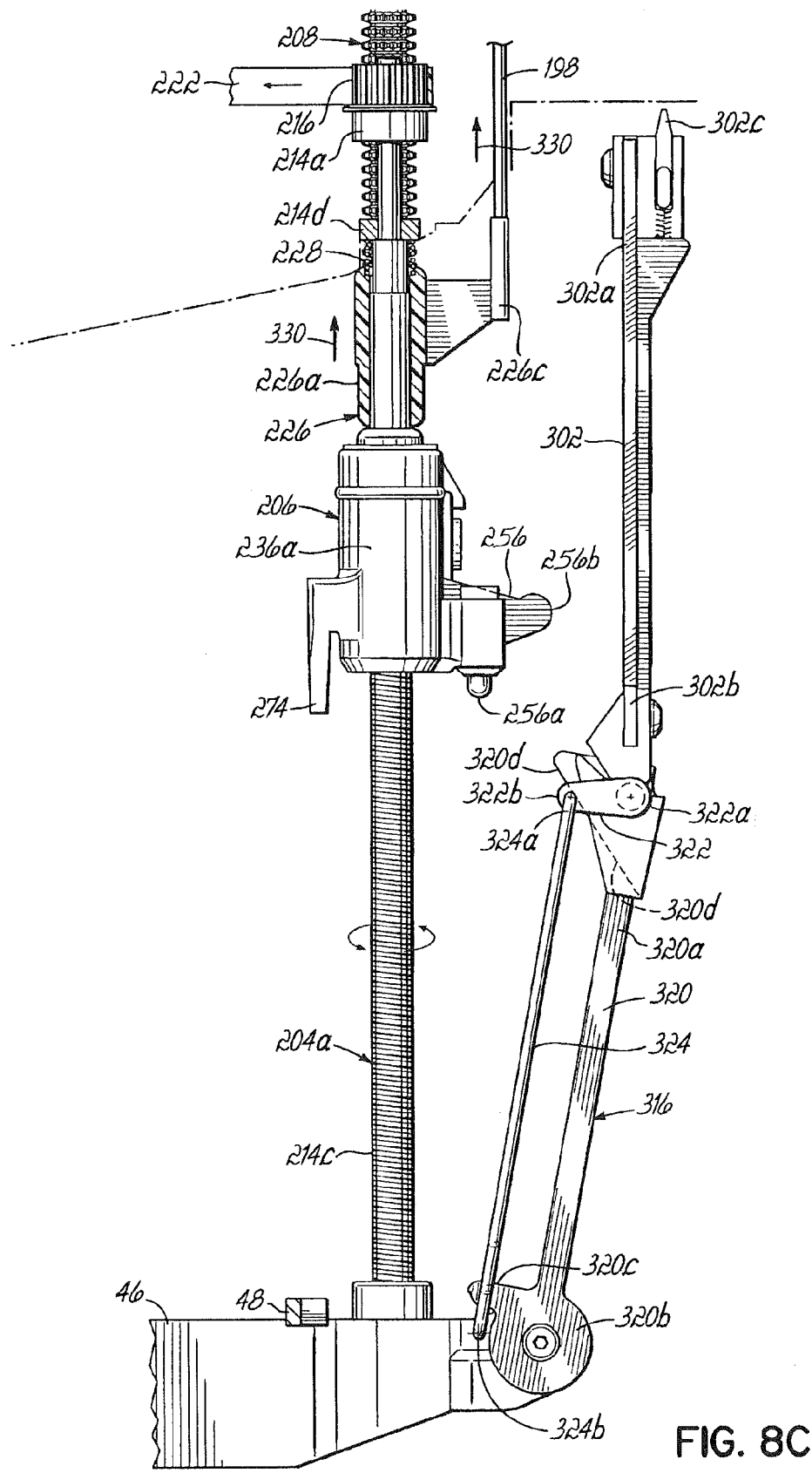
FIG. 8C is a side view of the peeling blade and the drive assembly, similar to FIGS. 8A and 8B, with the drive assembly in a top position to impale the unit of fruit in the cup assembly.

The first motor 210 then continues to drive the bridge member 206 and the lance 208 upwardly to the top position shown in FIG. 8C. In this top position, the lance 208 impales the unit of fruit 8 held inside the cup assembly 26. Simultaneously, the bridge member 206 engages the cylindrical portion 226a of the spacer member 226 on the first drive shaft 204a and forces the spacer member 226 upwardly against the bias of the compression spring 228. The slip clutch actuator 226c also moves upwardly and forces an actuation rod 198 upwardly to push on the bottom end 148a of the slip clutch 148, which disengages the slip clutch 148 and forces the cup assembly 26 to release the unit of fruit 8 as described above. It will be understood that the actuation rod 198 may be coupled to the cup receptacle 18 in such a manner to enable disengagement of the slip clutch 148 when the bridge member 206 pushes the slip clutch actuator 226 upwardly as shown in FIG. 8C by arrows 330.

Figure 8D:
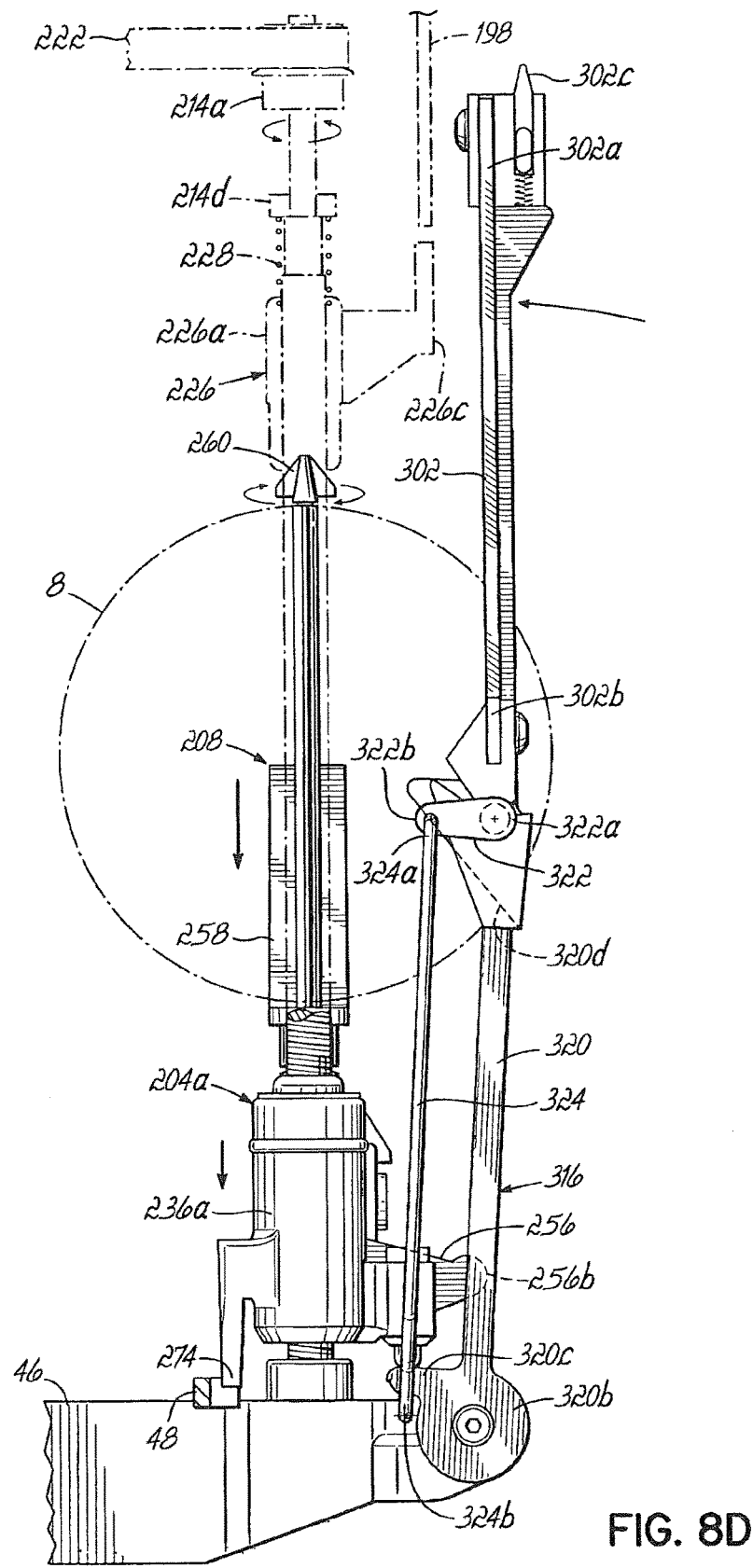
FIG. 8D is a side view of the peeling blade and the drive assembly, similar to FIG. 8B, with the drive assembly in a home position and the peeling blade pivoted to the active position and a unit of fruit held by the drive assembly.

If the apparatus 10 determines while moving the fruit 8 that the unit of fruit 8 is a citrus fruit configured to undergo a peeling and cutting operation, the first motor 210 then actuates downward movement of the bridge member 206 and the lance 208 back to the home position as shown in FIG. 8D. In this home position, the tip rotation mechanism 264 is engaged to rotate the tip 260 with respect to the holding spike 258 as described in further detail with reference to FIGS. 7C-7H above. Also, the bottom end 256a of the peeling actuator 256 engages the first cam surface 320c of the first link 320 and thereby pivots the peeling blade 302 back to the active position in the translational path of the unit of fruit 8, which is now below the peeling blade 302 as shown in FIG. 8D.

Figure 8E:
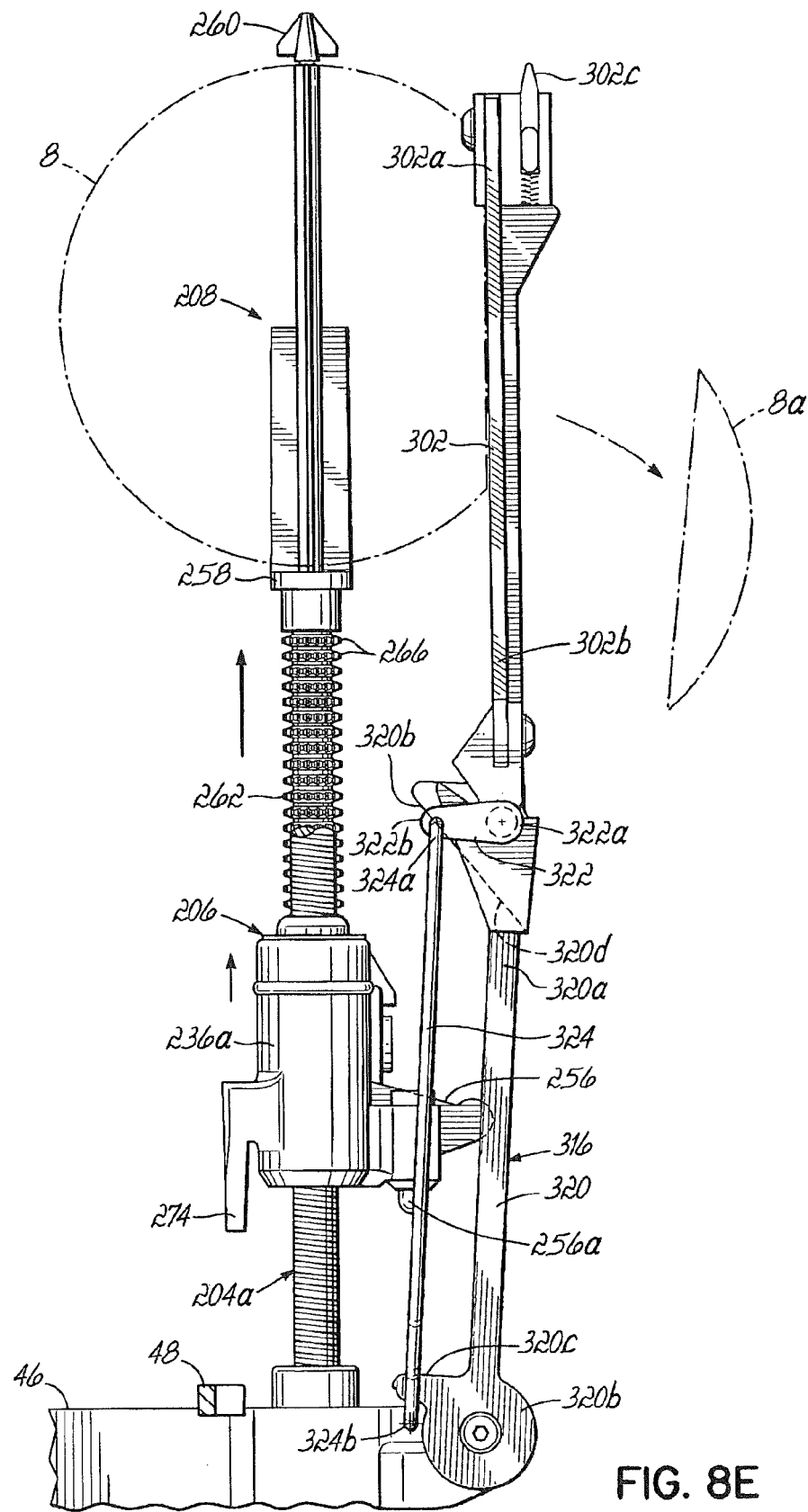
FIG. 8E is a side view of the peeling blade and the drive assembly shown in FIG. 8D, with the drive assembly moved upwardly to force the peeling blade to cut a face from the unit of fruit.
Figure 8F:
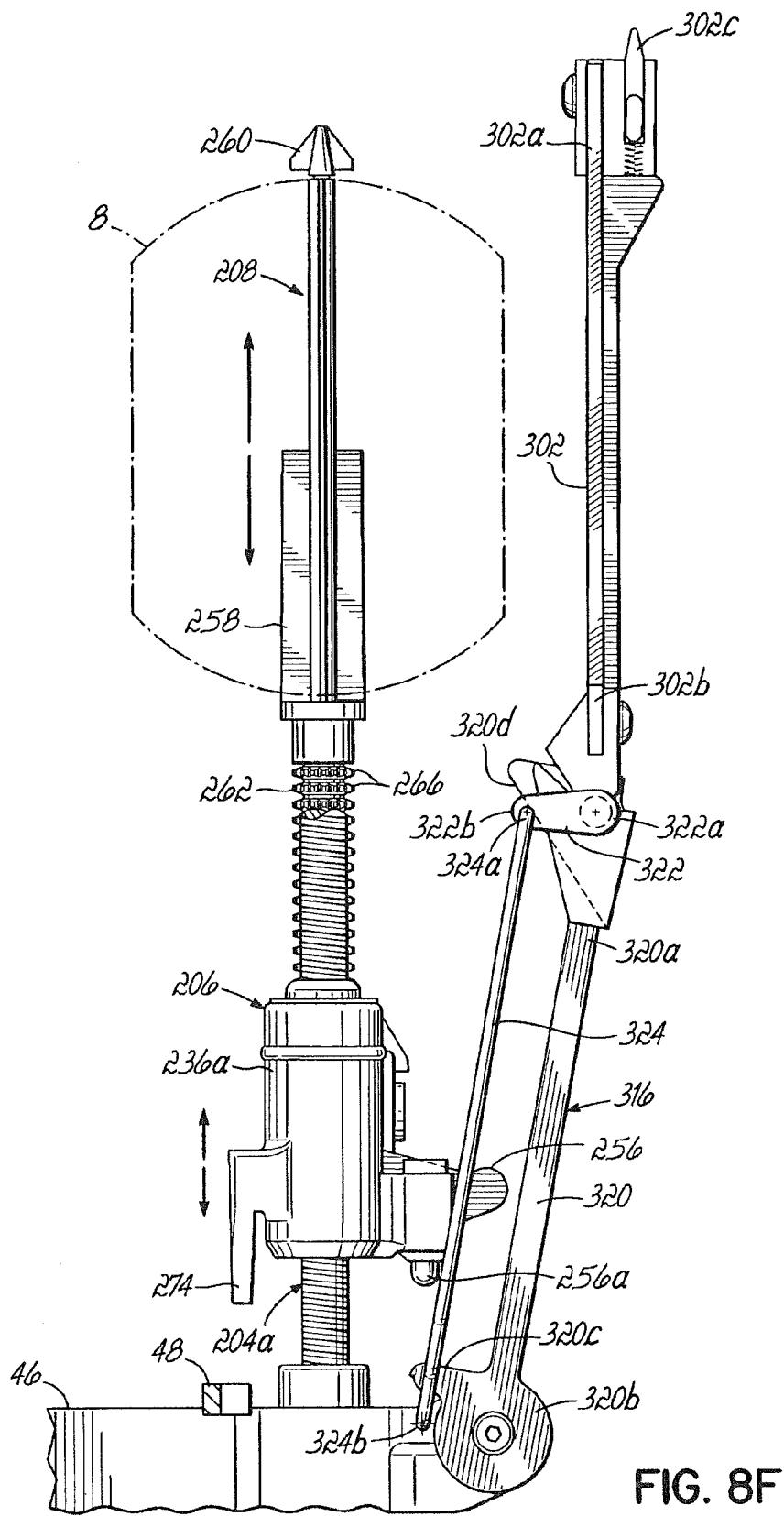
FIG. 8F is a side view of the peeling blade and the drive assembly shown in FIG. 8E, with the drive assembly in a home position, and the peeling blade in the passive position after the peeling of the unit of fruit has been completed.

To peel the unit of fruit 8, the first motor 210 then actuates upward movement of the bridge member 206 and the lance 208 as shown in FIG. 8E, which forces the unit of fruit 8 through the peeling blade 302 such that a face 8a is cut from the unit of fruit 8. The bridge member 206 then reaches the upper intermediate position previously shown in FIG. 8B to pivot the peeling blade 302 back out of the translational path so that the bridge member 206 and the unit of fruit 8 may be moved downwardly once again. After the second motor 212 actuates a partial revolution of the unit of fruit 8, the process of pivoting the peeling blade 302 into the translational path and cutting a face 8a from the unit of fruit 8 repeats until all faces have been removed from the unit of fruit 8. This state is shown in FIG. 8F, wherein the bridge member 206 is located at a lower position adjacent the home position to keep the peeling blade 302 in the passive position but permit full rotation of the rotatable blade assembly 304 as described in further detail below.

Also shown in FIGS. 8A-8F, the apparatus 10 may include a bottom bridge sensor 48 located at the structural member 46 or the yoke 202. A corresponding downward projection 274 on the rear side of the bridge member 206 blocks the bottom bridge sensor 48 only when the bridge member 206 is in the home position. This feedback permits the controller 50 of the apparatus 10 to adjust for any inconsistencies in motor output during movement and operation of the lance 208 and the bridge member 206.

Figure 9A:
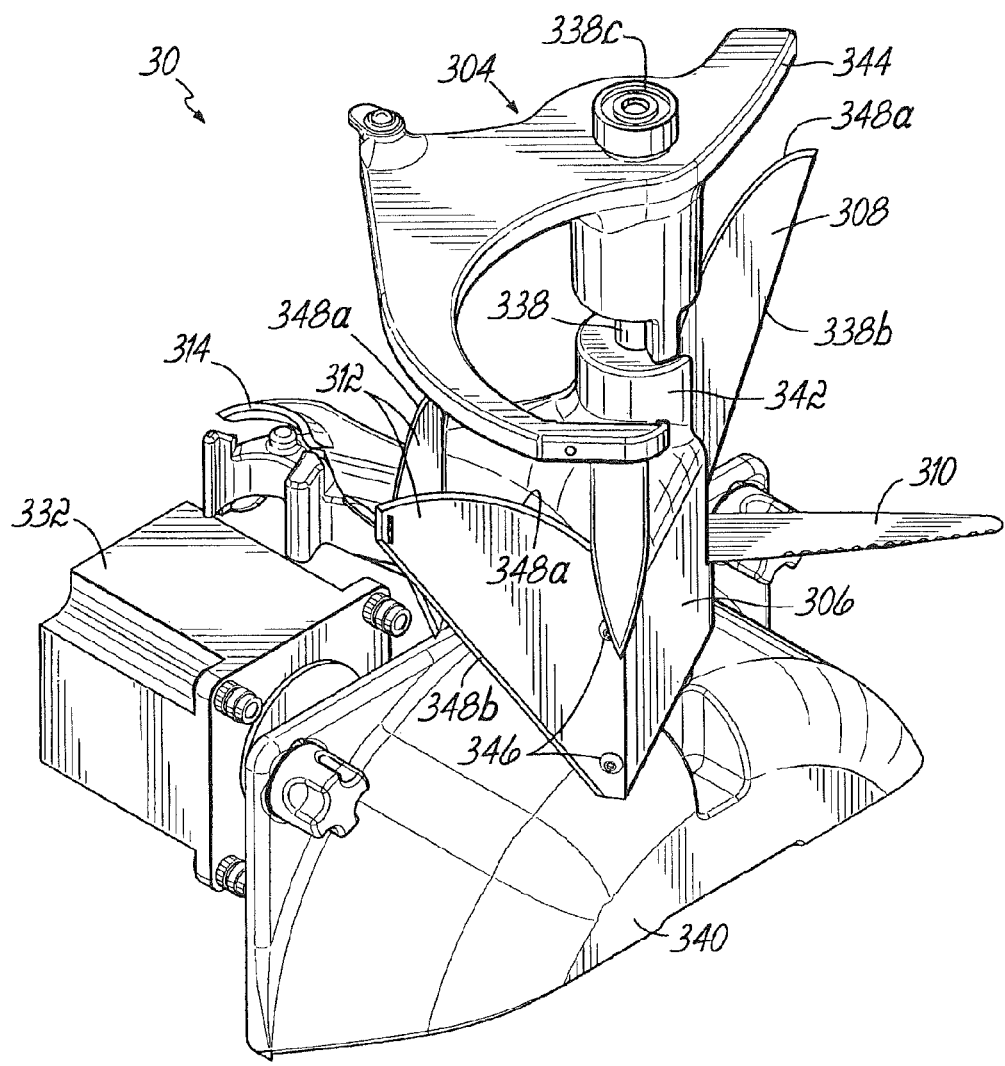
FIG. 9A is a perspective view of the cutting assembly of the apparatus shown in FIG. 1.
Figure 9B:
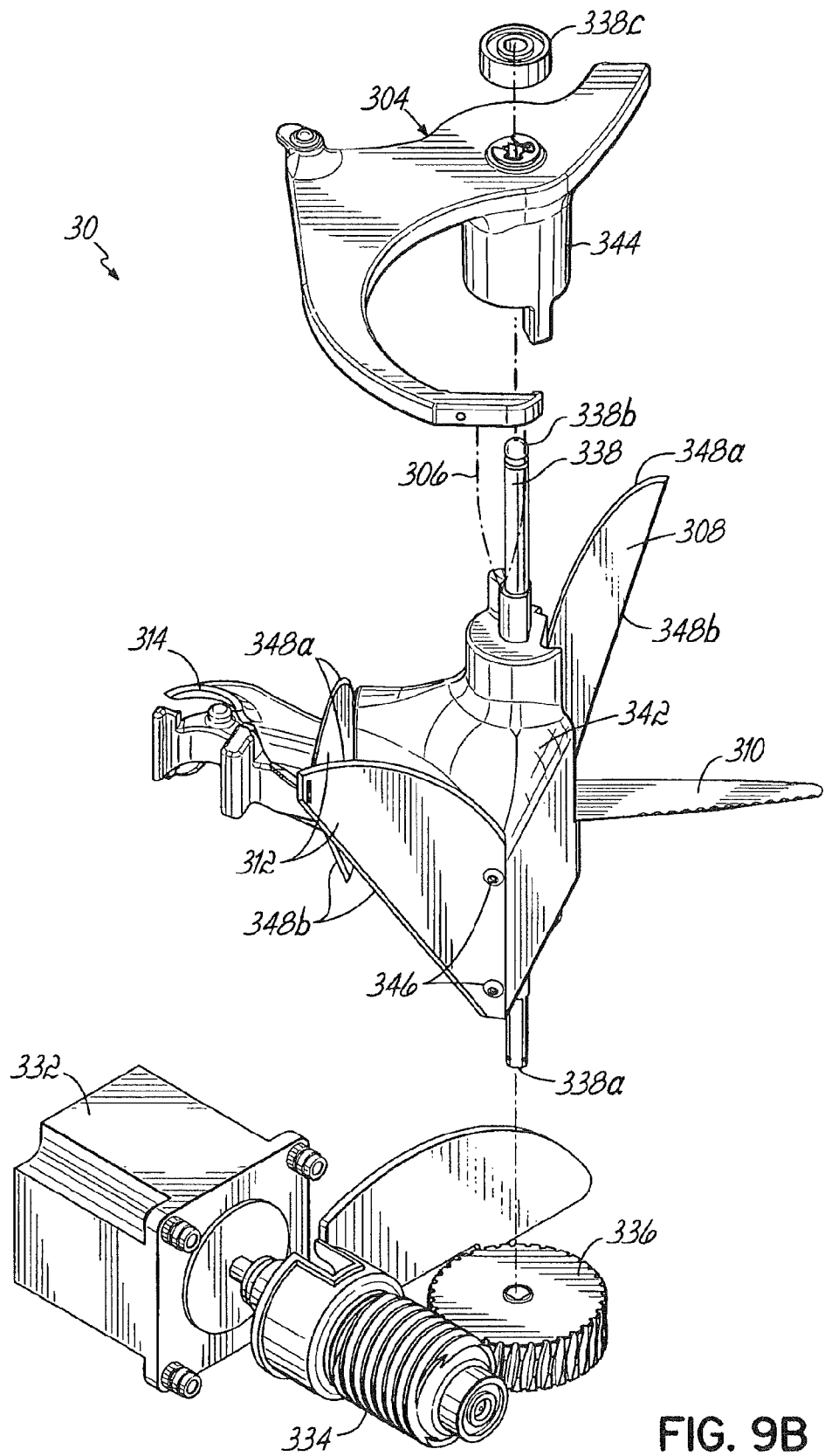
FIG. 9B is a partially exploded view of the cutting assembly shown in FIG. 9A.

The cutting assembly 30 further includes the rotatable blade assembly 304 as shown in FIGS. 9A and 9B. The rotatable blade assembly 304 includes a third motor 332 disposed in the rear housing portion 14 and a worm drive gear 334 extending from the third motor 332 into the cutting area 20. The worm drive gear 334 meshes with a blade drive gear 336 disposed on the bottom end 338a of a blade drive shaft 338. The worm drive gear 334 and the blade drive gear 336 are each disposed underneath a protective cover 340 projecting inwardly into the cutting area 20 as shown in FIG. 9A. The protective cover 340 effectively prevents pieces of fruit, waste material, and/or liquids from falling onto the covered components and affecting their performance. The blade drive shaft 338 extends upwardly through the protective cover 340 to a top end 338b. Mounted on the blade drive shaft 338 between the protective cover 340 and the top end 338b are a lower blade holder 342 and an upper blade holder 344. The lower blade holder 342 and the upper blade holder 344 engage each other in a keyed fashion as shown in FIG. 9B and are held in place on the blade drive shaft 338 by a drive shaft bearing 338c abutting the top end 338b of the blade drive shaft 338. The third motor 332 is adapted to rotate any of the blades into the translational path of the unit of fruit 8, as described in further detail below with reference to FIGS. 10A-10E.

The lower blade holder 342 is configured to be coupled to each of the vertical sectioning blade 308, the horizontal sectioning blade 310, the wedging blades 312, and the de-coring member 314 around the circumference or periphery of the lower blade holder 342. The de-coring member 314 is generally formed integrally with the lower blade holder 342, while the other blades 308, 310, 312 are each removably coupled to the lower blade holder 342 with known fasteners 346. To this end, each of the vertical sectioning blade 308, the horizontal sectioning blade 310, and the wedging blades 312 may be removed and replaced if any blade becomes dull. Each of the vertical sectioning blade 308 and the wedging blades 312 includes an upper cutting edge 348a and a lower cutting edge 348b such that these blades 308, 312 can vertically section or cut a wedge from the unit of fruit 8 as the unit of fruit 8 moves upwardly or downwardly past the blade assembly 304. In conjunction with the rotatable tip 260, the double-edged blades reduce the amount of time necessary to prepare the unit of fruit 8.

The de-coring member 314 is generally C-shaped so that the de-coring member 314 fits snugly around the lance 208 when a core of the unit of fruit 8 is to be removed from the lance 208. The de-coring member 314 also carries a projection 314a at the free end configured to block a blade assembly sensor 52 disposed at the rear of the cutting area 20 as shown in FIGS. 10A-10E. When the projection 314a blocks an optical beam or other signal of the blade assembly sensor 52, the controller 50 knows that the blade assembly 304 is in the "home" or "pass-through" position out of the translational path. At the end of a cutting cycle, the controller 50 ensures that the blade assembly 304 is in the home position and the cup assembly 26 is inserted before actuating the rinsing assembly 34 to spray the cutting area 20 and cup assembly 26 to clean the apparatus 10.

The upper blade holder 344 is configured to support the coring blade 306, which is removably coupled to the upper blade holder 344 with a known fastener 346. Thus, the coring blade 306 is also removable and replaceable if dulling of the coring blade 306 occurs. The coring blade 306 is effectively positioned between the wedging blades 312 and the de-coring member 314 such that the coring blade 306 may be rotated into the translational path of the unit of fruit 8 without any other blades in the translational path. It will be understood that the blade assembly 304 may include torque sensors (not shown) operatively coupled to the controller 50 and operable to detect if a cutting torque being used to cut through the unit of fruit 8 exceeds a threshold amount, which indicates blade dulling and the need for replacement.

Figure 10A:
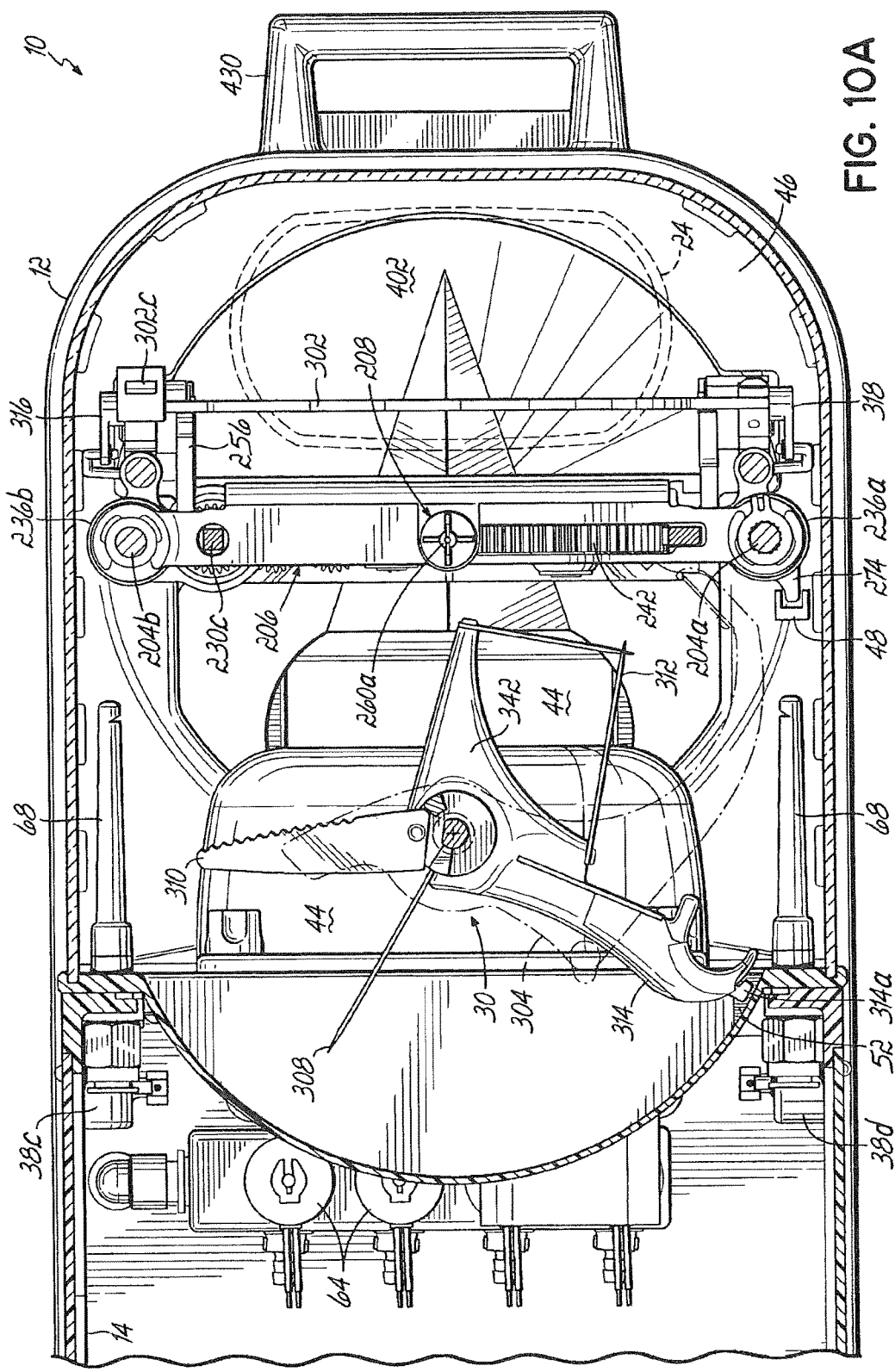
FIG. 10A is a top view of the cutting assembly of FIGS. 9A and 9B, showing the blade assembly in a first position for actuating cleaning of the housing.
Figure 10B:
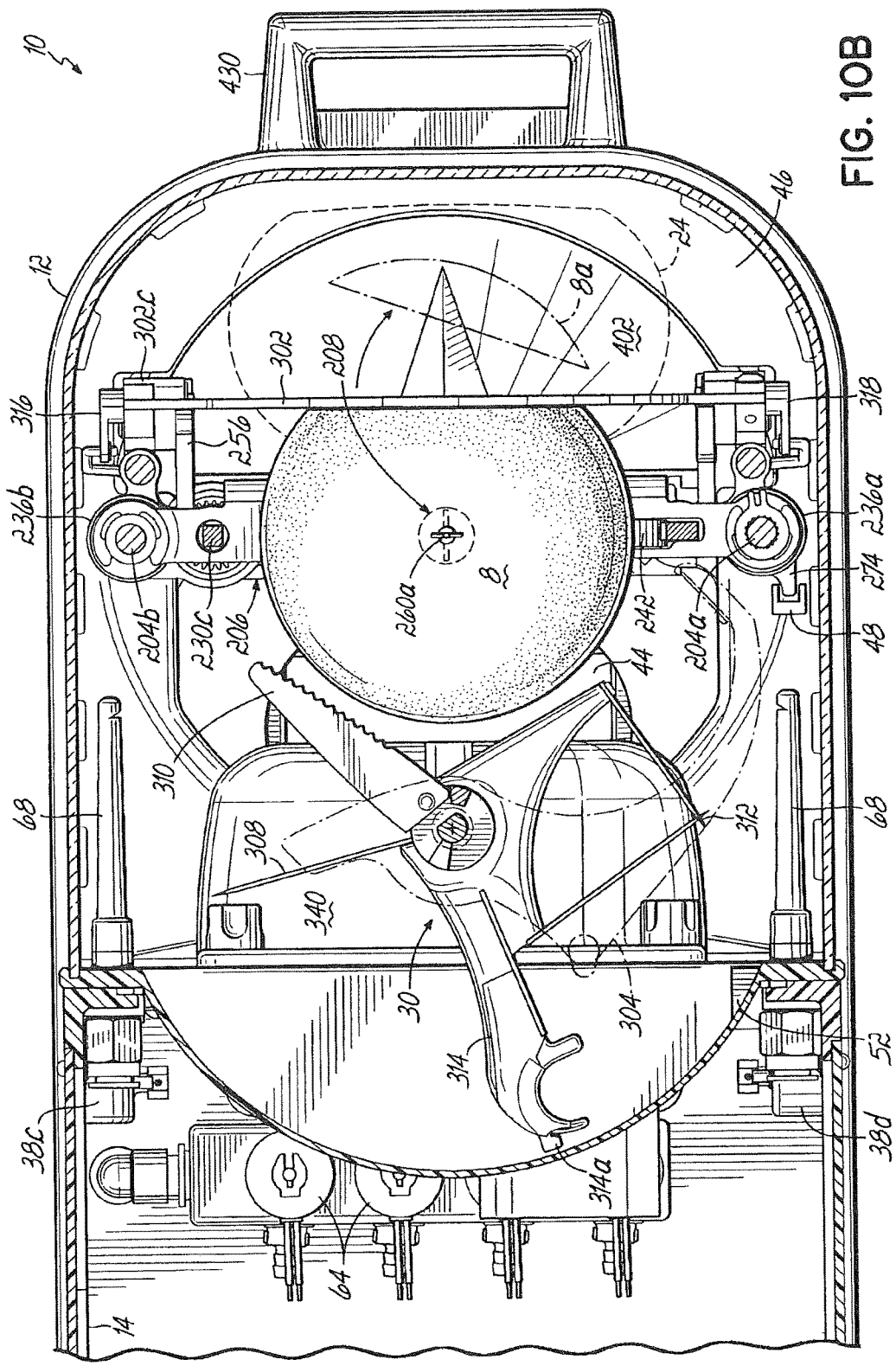
FIG. 10B is a top view of the apparatus shown in FIG. 10A, with the blade assembly rotated to an inactive position and the peeling blade located in the active position and cutting through the unit of fruit.

The operation of the cutting assembly 30 and more particularly the blade assembly 304 during a peeling and cutting operation is shown in further detail in FIGS. 10A-10E. An initial position of the blade assembly 304 is shown in FIG. 10A, which corresponds to the bridge member 206 at the home position as shown in FIG. 8A. In this initial position, the projection 314a of the de-coring member 314 actuates or has actuated the rinsing sensor 52 by blocking an optical path of the rinsing sensor 52. Meanwhile, the bridge member 206 has actuated the peeling blade 302 to pivot into the active position in the translational path of the unit of fruit. After the rinsing cycle is complete, the third motor 332 actuates rotation of the blade assembly 304 to a home position shown in FIG. 10B. The home position of the blade assembly 304 is defined by the one position where none of the blades 306, 308, 310, 312 or the de-coring member 314 are disposed in the translational path of the unit of fruit 8. In other words, the unit of fruit 8 may pass by the blade assembly 304 without being cut. FIG. 10B also illustrates the first removal of a face 8a from the unit of fruit 8 by the peeling blade 302 in the active position, which corresponds to the state previously described with reference to FIG. 8E. It will be understood that the deflector 402 is routing the cut faces 8a of fruit to the disposal outlet 44 visible in FIG. 10B.

Figure 10C:
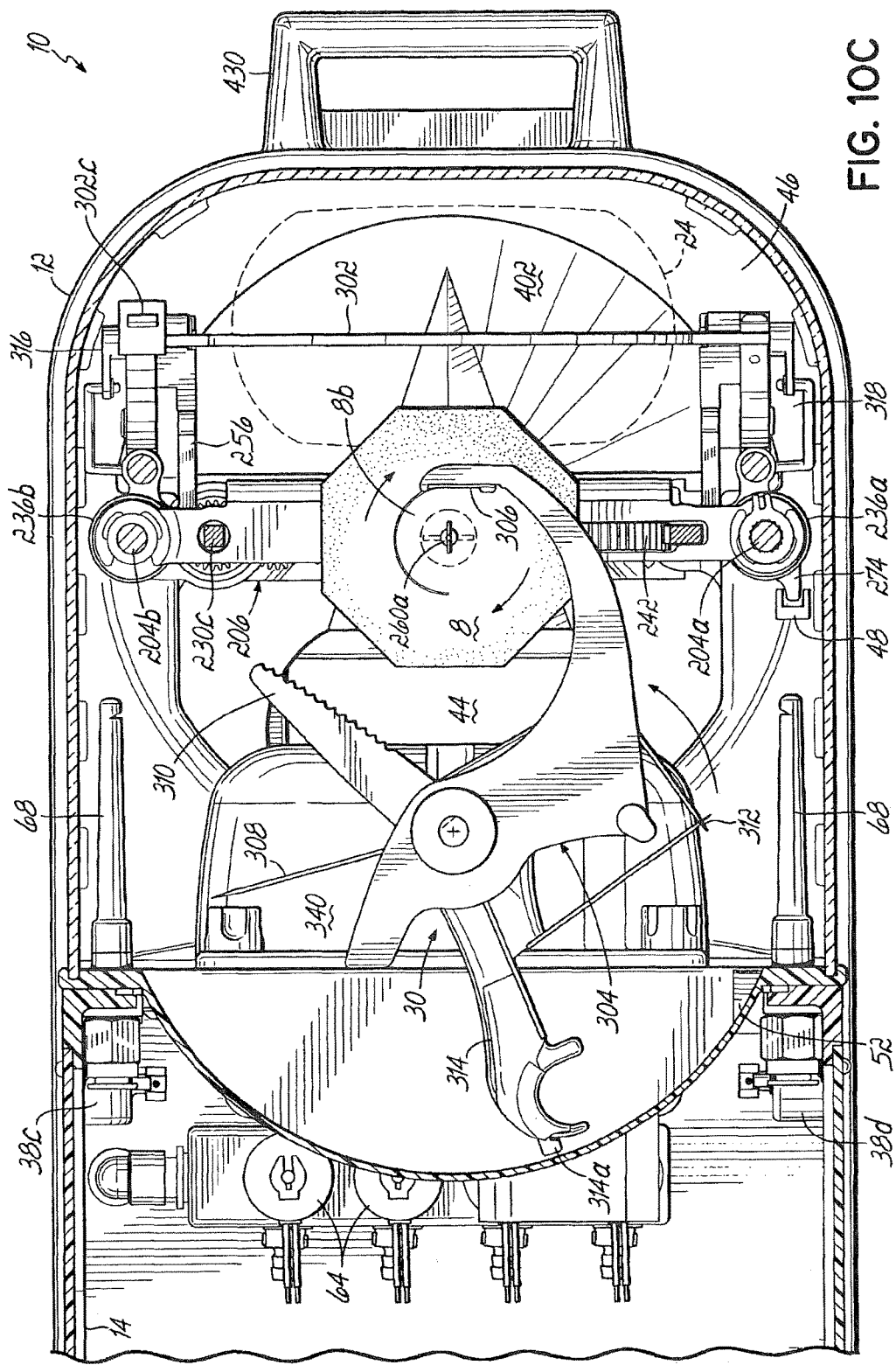
FIG. 10C is a top view of the apparatus shown in FIG. 10B, with the peeling blade moved back to the passive position and the blade assembly rotated such that a coring blade cuts through the unit of fruit.

The peeling process then continues until all faces 8a have been removed from the unit of fruit 8, as shown in FIG. 10C. The third motor 332 then rotates the coring blade 306 into the translational path of the unit of fruit 8. The second motor 212 is actuated to rotate the unit of fruit 8 as the first motor 210 actuates slow upward translational movement of the unit of fruit 8, which collectively causes the coring blade 306 to slowly cut around the core 8b of the unit of fruit 8. Although the core 8b is still connected to the unit of fruit 8 at the bottom end thereof, the edible portion of the unit of fruit 8 is now free to be removed from the core 8b. In one example, the coring blade 306 is offset from the lance 208 by about 0.375 inches such that the diameter of the core 8b cut from the fruit 8 is about 0.75 inches.

Figure 10D:
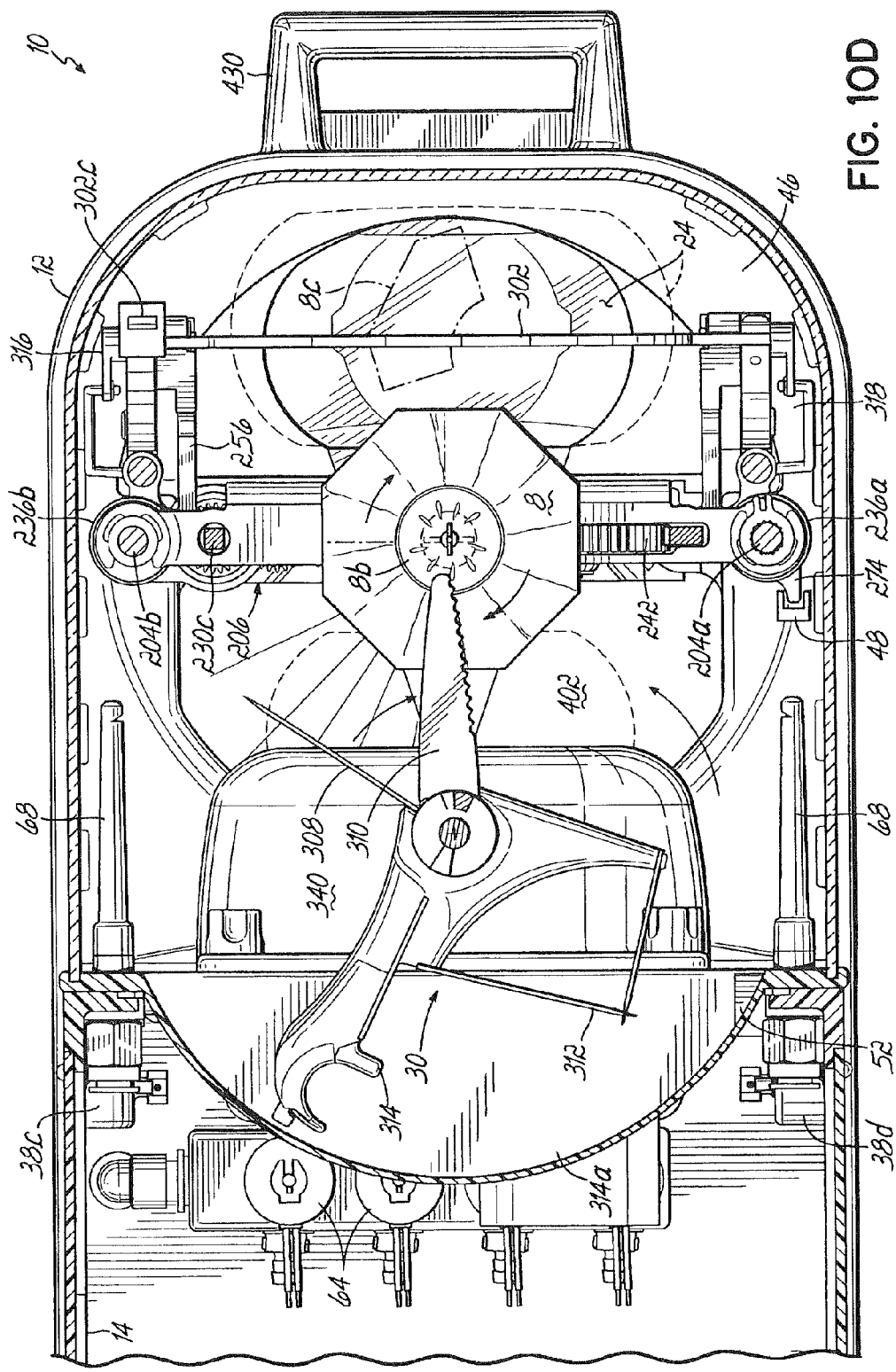
FIG. 10D is a top view of the apparatus shown in FIG. 10C, with the blade assembly rotated such that a horizontal sectioning blade cuts through the unit of fruit.

The vertical sectioning blade 308 may then be rotated into the translational path to vertically section the top scrap and the edible portion of the unit of fruit 8. The third motor 332 then actuates rotation of the horizontal sectioning blade 310 into a rotating unit of fruit 8, with the rotation of the unit of fruit 8 being actuated by the second motor 212 and the lance 208. This horizontal sectioning and the corresponding positioning of the blade assembly 304 are shown in FIG. 10D, and consumable cut pieces of fruit 8c or cubes of fruit are progressively removed from the unit of fruit 8 as the horizontal sectioning blade 310 cuts towards the core 8b. It will be seen in FIG. 10D that the deflector 402 has rotated to route the consumable cut pieces 8c into the tray 24. The horizontal sectioning blade 310 is configured to stop about 0.3 inches from the center of the lance 208 such that the horizontal sectioning blade 310 cuts all the way through the fruit 8 to the approximately 0.75 inch diameter core 8b.

After all of the edible portion of the unit of fruit 8 has been removed by the horizontal sectioning blade 310, the lance 208 moves upwardly and the third motor 332 actuates rotation of the de-coring member 314 into position around the lance 208 as shown in FIG. 10E. The lance 208 may then be driven downwardly so that the de-coring member 314 forcefully ejects the core 8b off of the lance 208. It will be appreciates that the tip 260 has been rotated back to the original orientation in alignment with the holding spike 258 prior to de-coring. It will also be understood that the deflector 402 has again rotated to route the core 8b and other waste material to the disposal outlet 44 instead of the tray 24. The blade assembly 304 may then be rotated back to the position shown in FIG. 10A to actuate another cleaning or rinsing cycle of the rinsing assembly 34.

It will be understood that the wedging blades 312 would be rotated into the translational path of the unit of fruit 8 during a wedging operation described in further detail below. However, the operation of the third motor 332 and the blade assembly 304 in a wedging operation is substantially similar to the multi-step peeling and cutting process described briefly above.

Furthermore, it will be understood that the blade assembly 304 may only be provided with one or more of the wedging blades 312 and the de-coring member 314 in a base model of the apparatus 10. In this regard, a "peeling/cutting pack" may be provided separately by adding the coring blade 306, the vertical sectioning blade 308, and the horizontal sectioning blade 310 to the blade assembly 304, thereby enabling two different cutting operations, as described in further detail below.

Figure 11A:
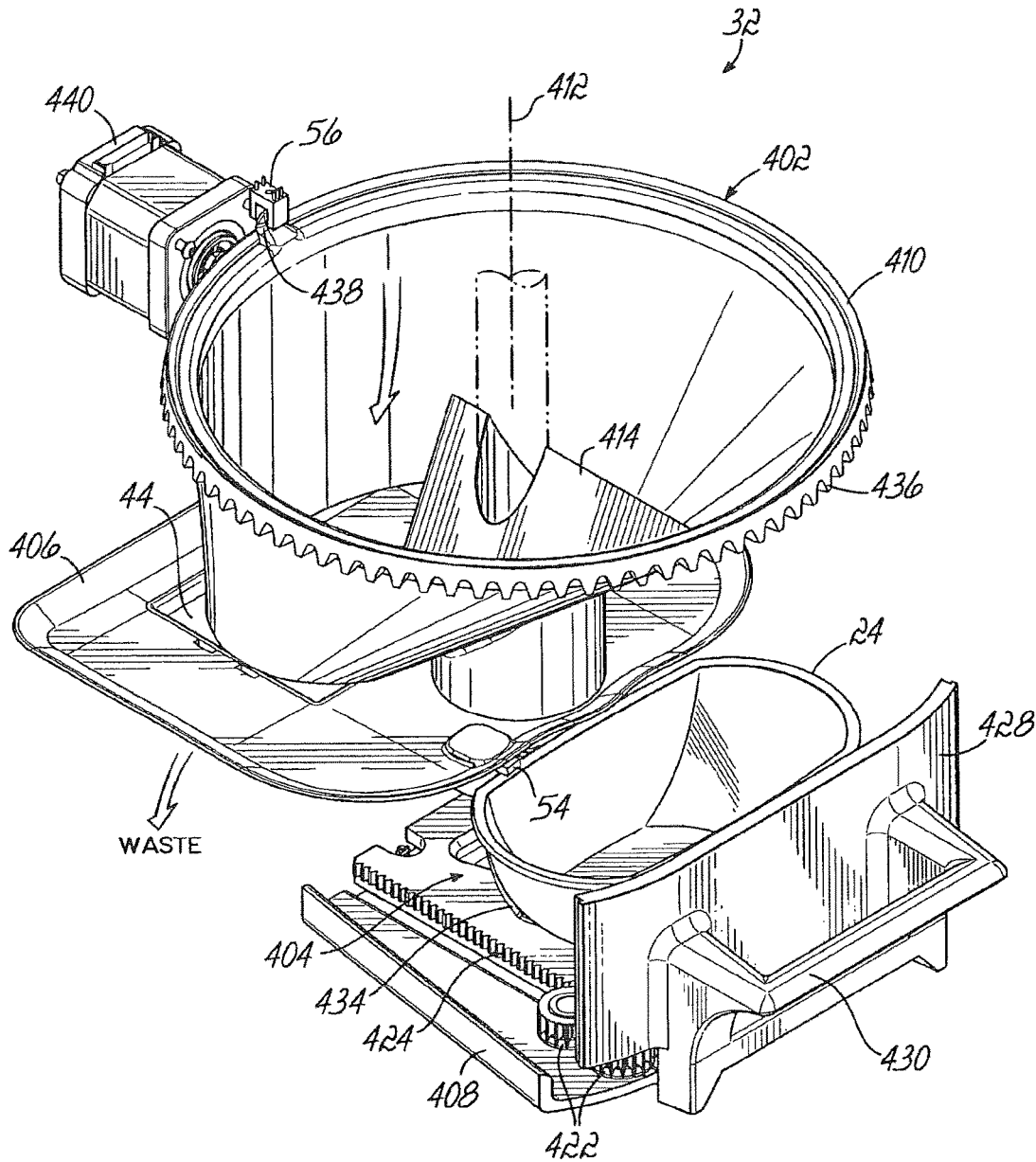
FIG. 11A is a perspective view of the deflector assembly of the apparatus shown in FIG. 1, with the deflector rotated to a first position to route waste material to a disposal outlet.
Figure 11B:
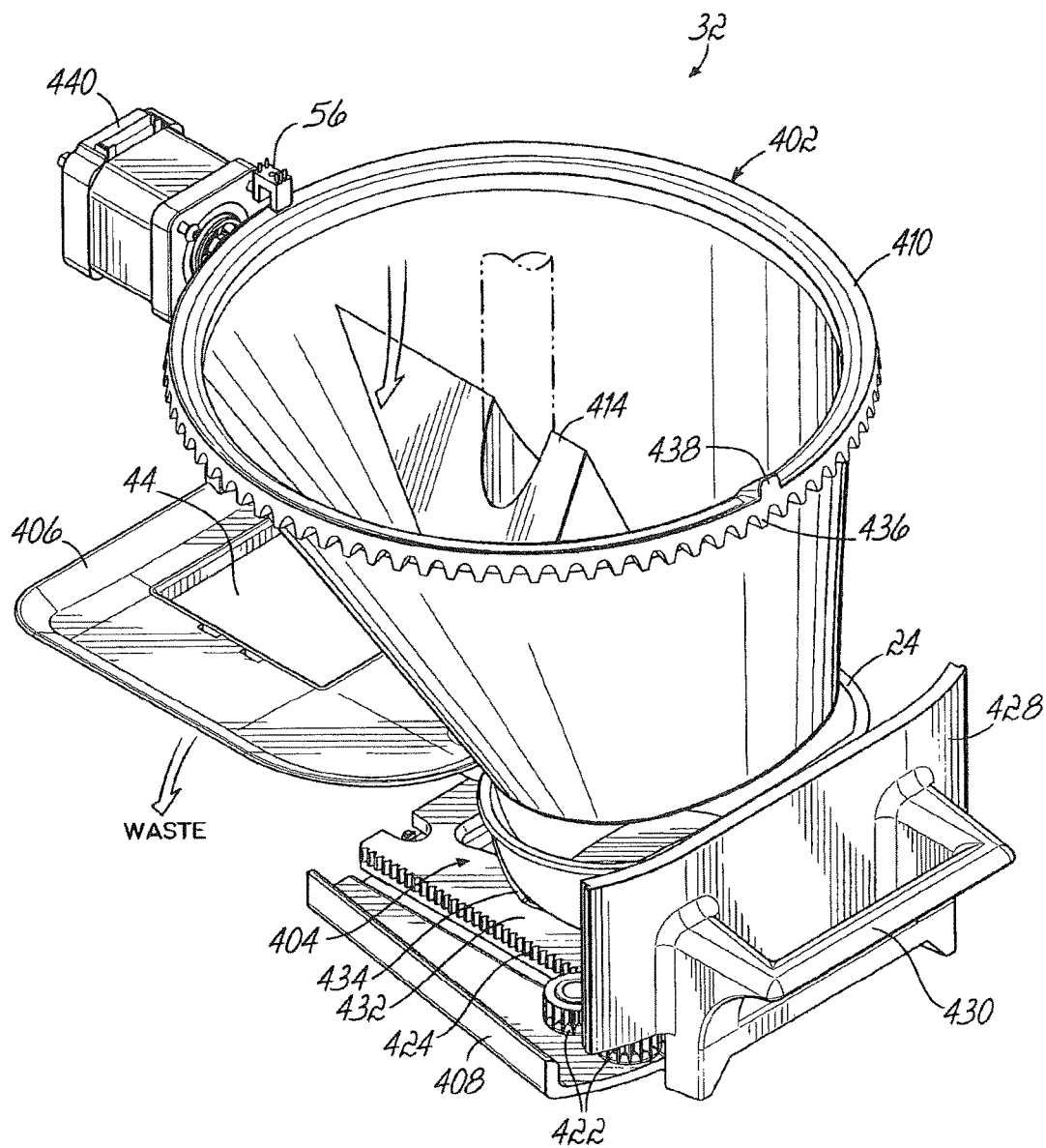
FIG. 11B is a perspective view of the deflector assembly shown in FIG. 11A, with the deflector rotated to a second position to route cut pieces of fruit to a tray.
Figure 11C:
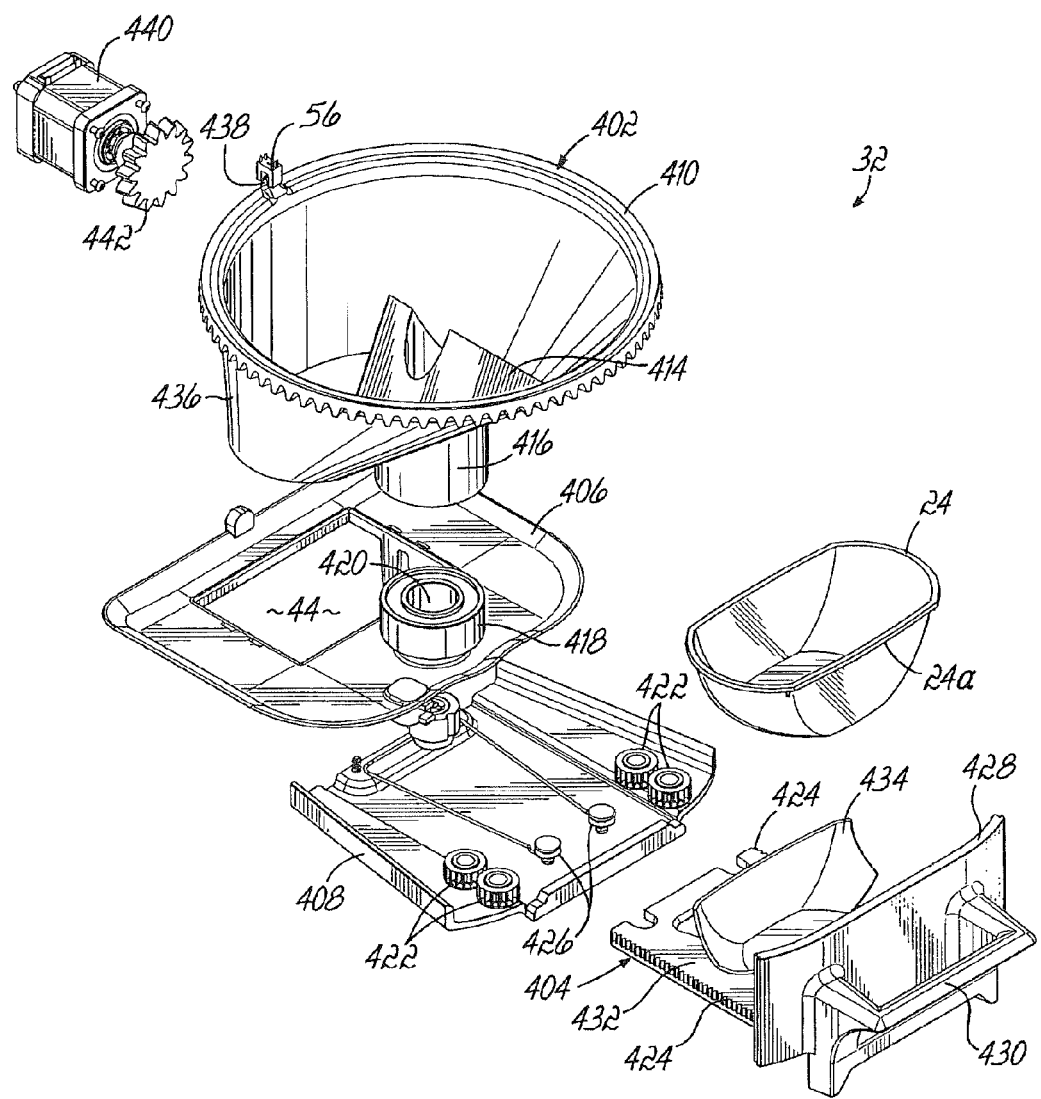
FIG. 11C is a partially exploded view of the deflector assembly shown in FIG. 11A.

The deflector assembly 32 is further illustrated in FIGS. 11A-11C. The deflector assembly 32 includes the deflector 402, which routes all material and liquids from the cup assembly 26 and the cutting area 20. The deflector assembly 32 is positioned substantially in the lower housing portion 22, which includes the disposal outlet 44 and a movable shelf 404 for holding the tray 24. The deflector assembly 32 further includes an upper platform 406 surrounding the disposal outlet 44, and the lower housing portion 22 includes a lower platform 408 located partially below the upper platform 406 and configured to receive the shelf 404. The deflector 402 is a funnel-shaped member having a circular upper periphery 410 defining an axis of rotation 412, an angled body 414 extending downwardly and inwardly from the upper periphery 410, a stem member 416 extending downwardly from the angled body 414 adjacent the axis of rotation 412, and a bearing member 418 configured for supporting the stem member 416 of the deflector 402. The upper platform 406 includes an aperture 420 in communication with the stem member 416. The yoke 202 supports the bearing member 418, which in turn, supports the stem member 416 and the deflector 402. The locking receptacle 272 configured to engage the locking base 270 of the lance 208 is mounted on the lower housing portion 22 directly underneath the stem member 416 and the bearing member 418. Consequently, when the bridge member 206 and lance 208 are in the home position, the lance 208 extends through the stem member 416 and the aperture 420 to the locking receptacle 272.

The lower housing portion 22 includes two pairs of toothed rollers 422 configured to engage corresponding toothed tracks 424 on opposing sides of the shelf 404. The lower housing portion 22 also includes a pair of inner detent members 426 configured to slide in corresponding detent slots (not shown) formed in the bottom of the shelf 404 to thereby retain the shelf 404 from being fully removed from the lower housing portion 22. The shelf 404 includes a front closure panel 428 with a handle 430 used to move the shelf 404 in and out of the lower housing portion 22. The shelf 404 further includes a platform 432 having the toothed tracks 424 and detent slots previously described as well as a tray receptacle 434 configured to accurately position the tray 24 within the deflector assembly 32. The lower housing portion 22 includes a tray sensor 54 attached to the upper platform 406 and positioned such that when the tray 24 is in the tray receptacle 434 and the shelf 404 is inserted in the lower housing portion 22, a side edge 24a of the tray 24 blocks an optical signal of the tray sensor 54 such that the controller 50 can verify the presence of the tray 24 prior to actuating a fruit preparation cycle.

The upper periphery 410 of the deflector 402 includes downwardly-facing gear teeth 436 about the entire upper periphery 410 and an upwardly-extending projection 438. The upwardly-extending projection 438 is configured to interrupt or actuate a deflector sensor 56 mounted in the structural member 46. The deflector sensor 56 provides feedback to the controller 50 to determine when the deflector 402 is located in the position of FIG. 11A for routing waste material and liquids to the disposal outlet 44. The deflector assembly 32 includes a fourth motor 440 with a toothed drive gear 442 configured to mesh with the gear teeth 436 along the upper periphery 410 of the deflector 402. The fourth motor 440 actuates rotation of the deflector 402 between the position shown in FIG. 11A and the position shown in FIG. 11B, which routes consumable cut pieces of fruit into the tray 24. Therefore, the deflector assembly 32 is configured to remove all waste products and edible portions of the unit of fruit 8 that are prepared in the cutting area 20.

Figure 12:
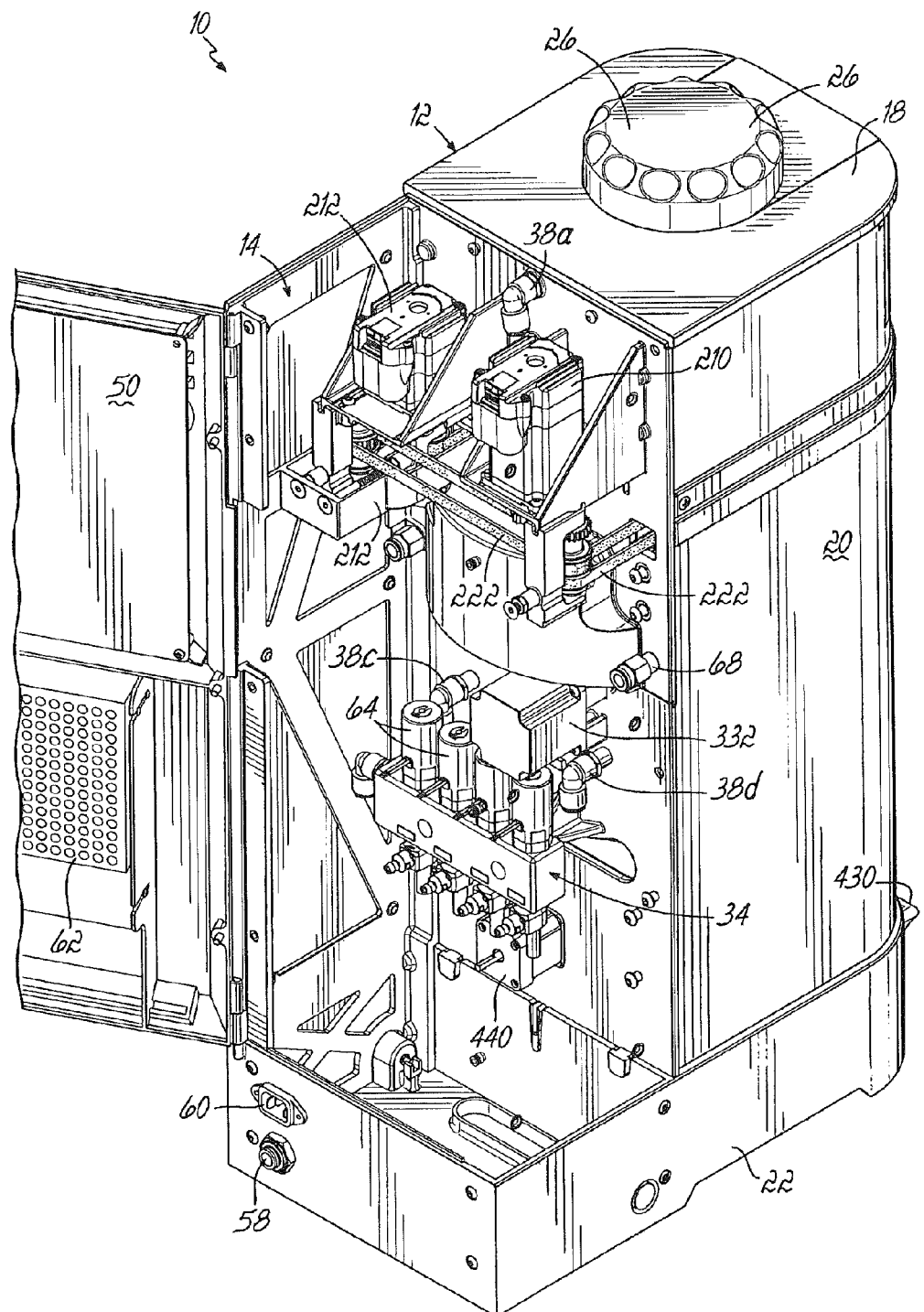
FIG. 12 is a perspective view of the rear portion of the housing of the apparatus shown in FIG. 1, with the rear portion of the housing opened to show interior details.

The internal components contained in the rear housing portion 14 are shown in FIG. 12. The rinsing assembly 34 includes a main water inlet 58 configured to receive a filtered water supply under 40-60 PSI, which is typical house hold or business water pressure. The main water inlet 58 may include a valve (not shown) as well understood in the art. Disposed above the main water inlet 58 is a power supply plug 60 configured to receive power from an electrical wall outlet and supply it to the power supply 62 providing power to the controller 50 and to all electrical components of the apparatus 10. The controller 50 may be configured as a printed circuit board and processor as well known in the art. For example, the controller 50 directs the power supply 62 to supply power to each of the first motor 210, the second motor 212, the third motor 332, and the fourth motor 440, each of which is shown in the rear housing portion 14. The electrical connections leading to and from the controller 50 to the motors and the various sensors are not shown in FIG. 12 for simplicity. The operational control enabled by the controller 50 is further explained with reference to FIGS. 14A-16J below.

The rinsing assembly 34 includes a manifold with a plurality of valves 64 configured to control distribution of water from the main water inlet 58 to various spray outlets in the apparatus 10 via supply ports 38a, 38b, 38c, and 38d, each of which is shown in FIGS. 5D and/or 12. As discussed previously, the first supply port 38a supplies water/PAA mixture to nozzle heads 182 in the cup assembly 26 and the second supply port 38b supplies water/PAA mixture to the U-shaped supply pipe 40 and spray nozzles 36 at the top of the cuffing area 20. The third supply port 38c and the fourth supply port 38d supply a water/Ascorbic Acid mixture to Ascorbic Acid spray nozzles 68 shown in FIG. 6A adjacent the cutting assembly 30 and the drive assembly 28. Further spray nozzles 36, 68 and supply ports 38 may be provided in alternative embodiments of the apparatus 10. The peracetic acid or PAA is mixed in the incoming water supply with an inline venturi (not shown) as well understood in the fluid delivery arts. It will be understood that the four valves 64 shown in FIG. 12 may include a water-rinse supply valve and three other valves associated with separate inline venturi for mixing the various chemicals with the water. The PAA oxidizes all surfaces within the cup assembly 26 and the cutting area 20 to clean the apparatus 10 adequately for a new preparation of fruit cycle. The Ascorbic Acid spray nozzles 68 adjacent the cutting assembly 30 may also be used to spray ascorbic acid (Vitamin C) during a wedging operation to delay browning of the dispensed wedges of fruit. Therefore, the rinsing assembly 34 (like the electrical assembly, no connecting pipes or tubes are shown) is configured to adequately clean the apparatus 10 after every preparation of fruit cycle. It will also be understood that the rinsing assembly 34 may be configured to spray a Chlorine caustic based soap such as U-Bright a few times a day at regular intervals to reinforce the cleaning of the interior components of the apparatus 10.

Although not shown in FIG. 12, the rinsing assembly 34 may further include water sensors for monitoring the incoming water flow and pressure into the manifolds 64 and chemical sensors for monitoring the amount of PAA, ascorbic acid, and other chemicals supplied through the manifolds 64. If the incoming water pressure or flow is too low to effectively spray and clean the fruit 8 and the apparatus 10, the controller 50 will prevent the apparatus 10 from running and an appropriate error signal will be provided to the operator (such as by a blinking LED visible from the front of the apparatus 10, in one example). Similarly, if the amount of any chemical is too low to be mixed with the incoming water flow at adequate levels for cleaning and disinfecting the fruit 8 and the apparatus 10, the controller 50 will prevent the apparatus 10 from running and an appropriate error signal will be provided to the operator.

Also not shown in FIG. 12, the rinsing assembly 34 may further include a manual rinsing wand configured for use between operational cycles of the apparatus 10. In one example, the rinsing wand may be stored alongside the outer housing 12 when not in use or may be stored within the rear housing portion 14 when not in use. The rinsing wand is operatively coupled to the manifolds 64 of the rinsing assembly 34 such that the rinsing wand is supplied with the same cleaning mixtures as the plurality of spray nozzles 36, 68 throughout the apparatus 10. With the cup assembly 26 removed from the cup receptacle 18, an operator may insert the rinsing wand into the cutting area 20 and position the rinsing wand to spray a directed stream of cleaning fluid to any blades or locations with pieces of fruit or other items lodged into place, thereby removing the waste material from the cutting area 20 more thoroughly. The rinsing wand may be used as necessary between cutting operation, or may be used at the end of a day to further ensure the cleanliness and sterilization of the apparatus 10.

It will be understood that the apparatus 10 may include a pair of buttons on opposing sides of the lower housing portion 22. When both of the pair of buttons is actuated, the controller 50 may send the drive assembly 28 and the cutting assembly 30 back to their initial or home positions and deactivate these assemblies until the pair of buttons is pressed again. Providing a pair of buttons ensures that the apparatus 10 does not actuate movement of sharp elements while the operator has hands or the manual rinsing wand inserted into the cutting area 20 to dislodge waste material and pieces of fruit from the cutting area 20. Consequently, the apparatus 10 ensures the safety of the operator as the apparatus 10 is manually cleaned.

Figure 13A:
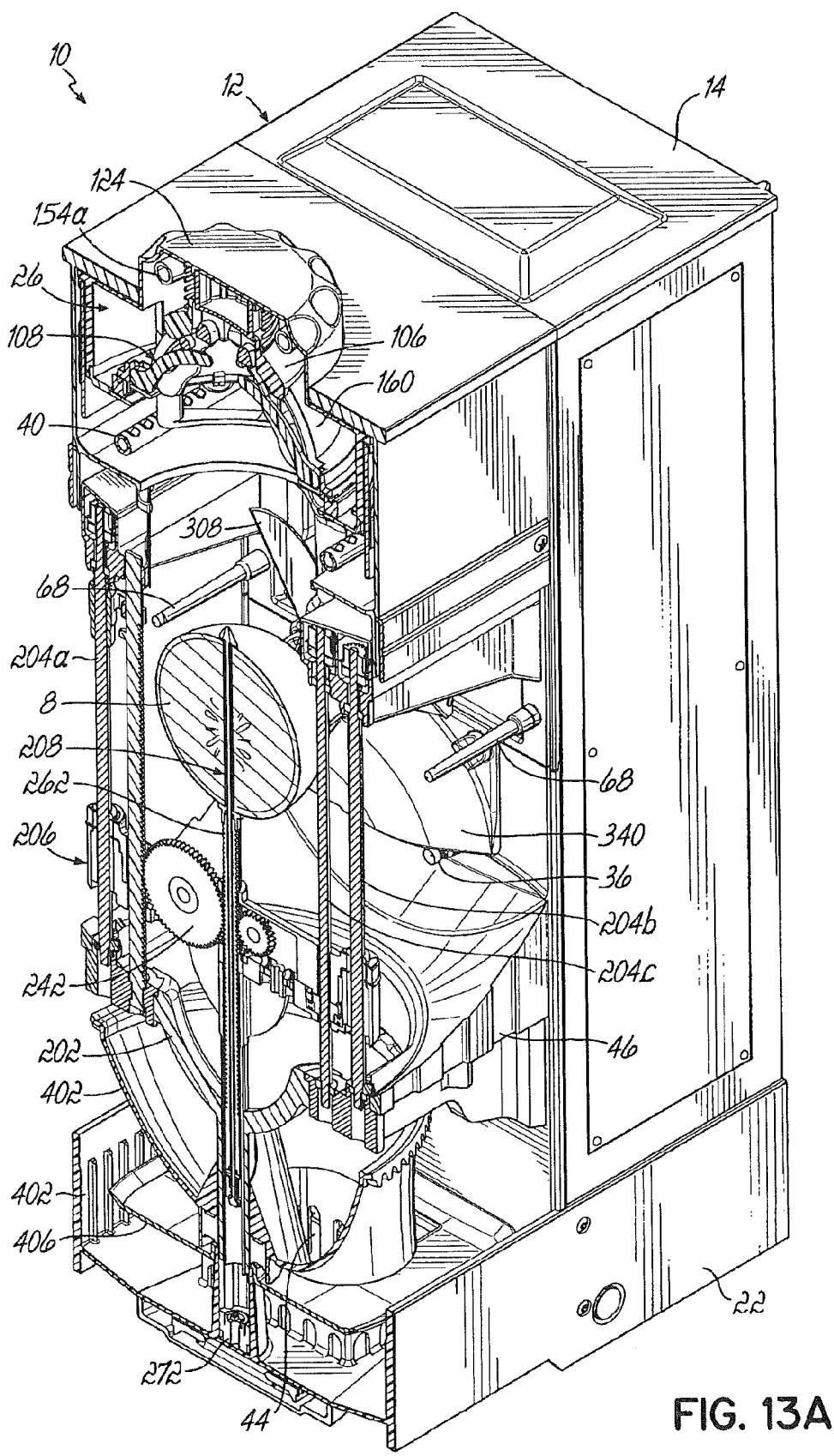
FIG. 13A is a perspective cross-sectional view of the apparatus shown in FIG. 1, showing interior details.
Figure 13C:
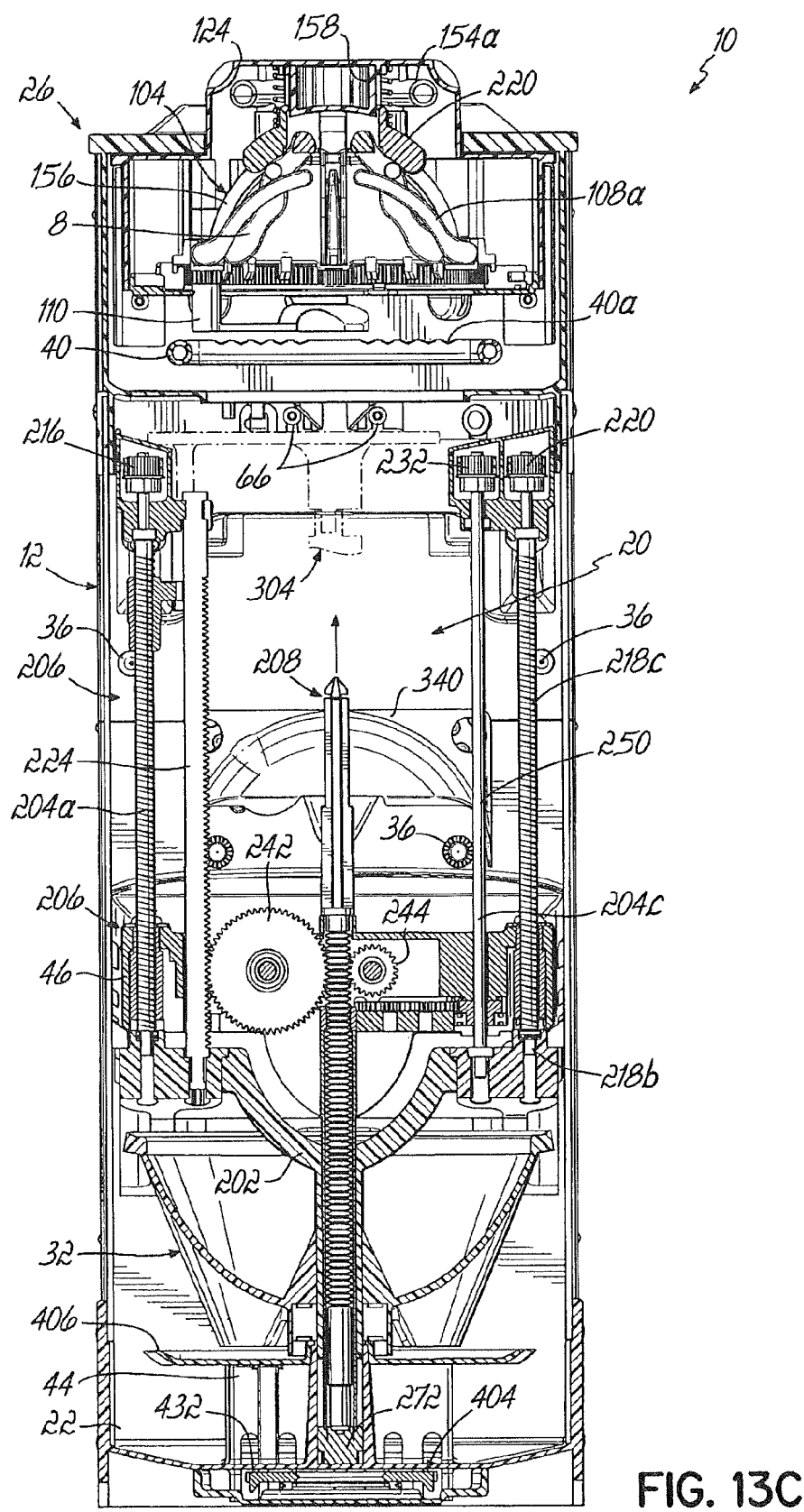
FIG. 13C is a front cross-sectional view of the apparatus shown in FIG. 13A, with the drive assembly in a lowered position.
Figure 13D:
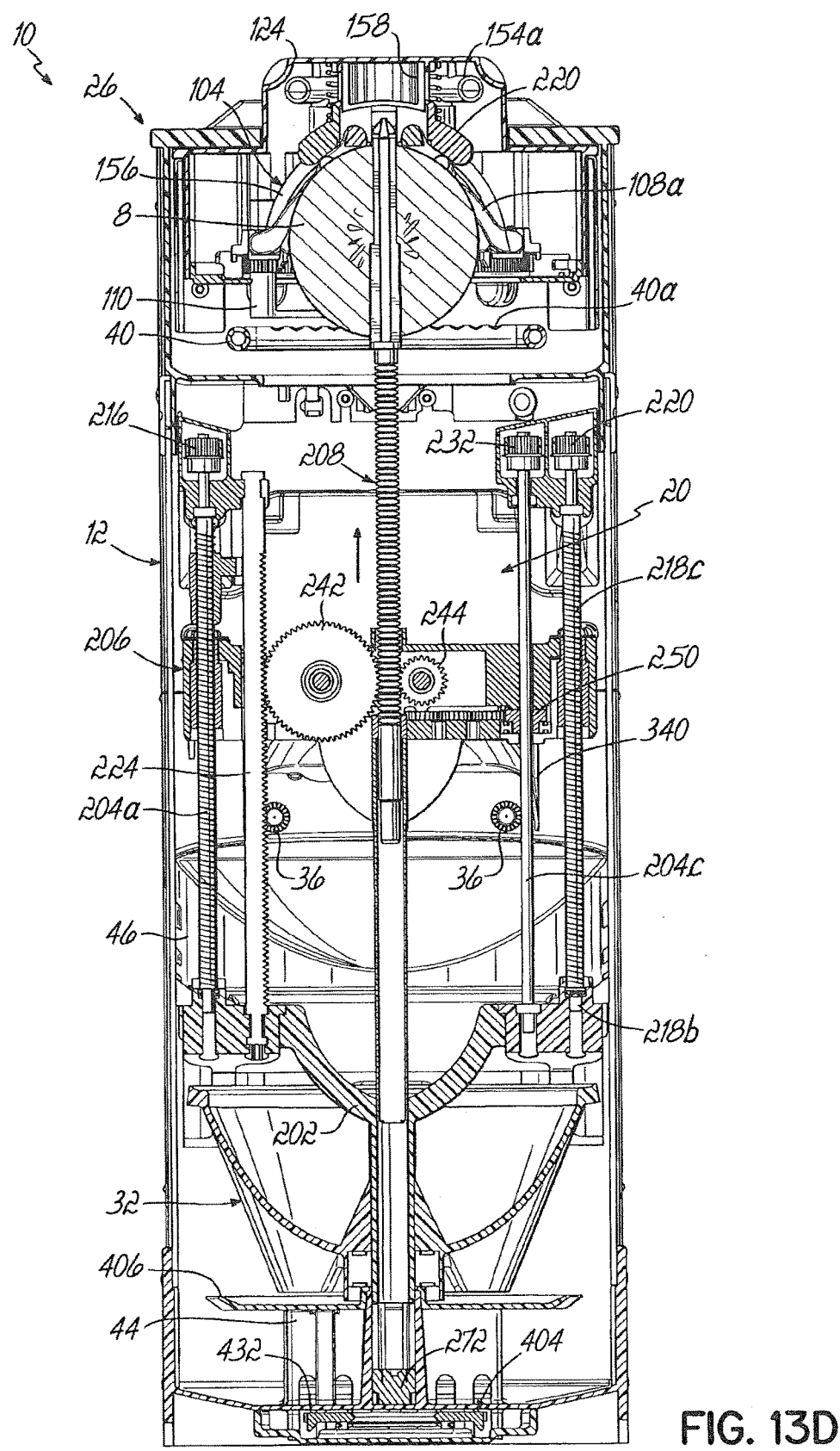
FIG. 13D is a front cross-sectional view of the apparatus shown in FIG. 13C, with the drive assembly in a top position during impaling of the unit of fruit.

FIGS. 13A-13D illustrate various cross-sectional views of the apparatus 10 including each of the sub-assemblies described in full detail above. More particularly, FIG. 13A shows the lance 208 with the unit of fruit 8 impaled and in the home position described with reference to FIG. 8F. FIG. 13B shows the lance 208 prior to movement upwardly to impale the unit of fruit 8 in the cup assembly 26. FIG. 13C also shows the lance 208 prior to movement upwardly to impale the unit of fruit 8. FIG. 13D shows the lance 208 in the top position wherein the tip 260 and holder spike 258 impale the unit of fruit 8 at the same time the unit of fruit 8 is released by the cup assembly 26. FIGS. 13C and 13D also illustrate a fruit size sensor 66 disposed right below the cup receptacle 18. The fruit size sensor 66 detects the presence of the unit of fruit 8 as it passes from the cup assembly 26 to the cutting area 20 and transmits this information to the controller 50, which converts the signal into a size in millimeters. Depending on the detected size of the unit of fruit 8, the controller 50 determines whether the unit of fruit 8 is to undergo a peeling and cutting operation to produce consumable cubes of fruit, or whether the unit of fruit 8 is to undergo a wedging operation to produce consumable wedges of fruit. Each of these procedures is explained in further detail below with reference to FIGS. 14A-14C.

Figure 14A:
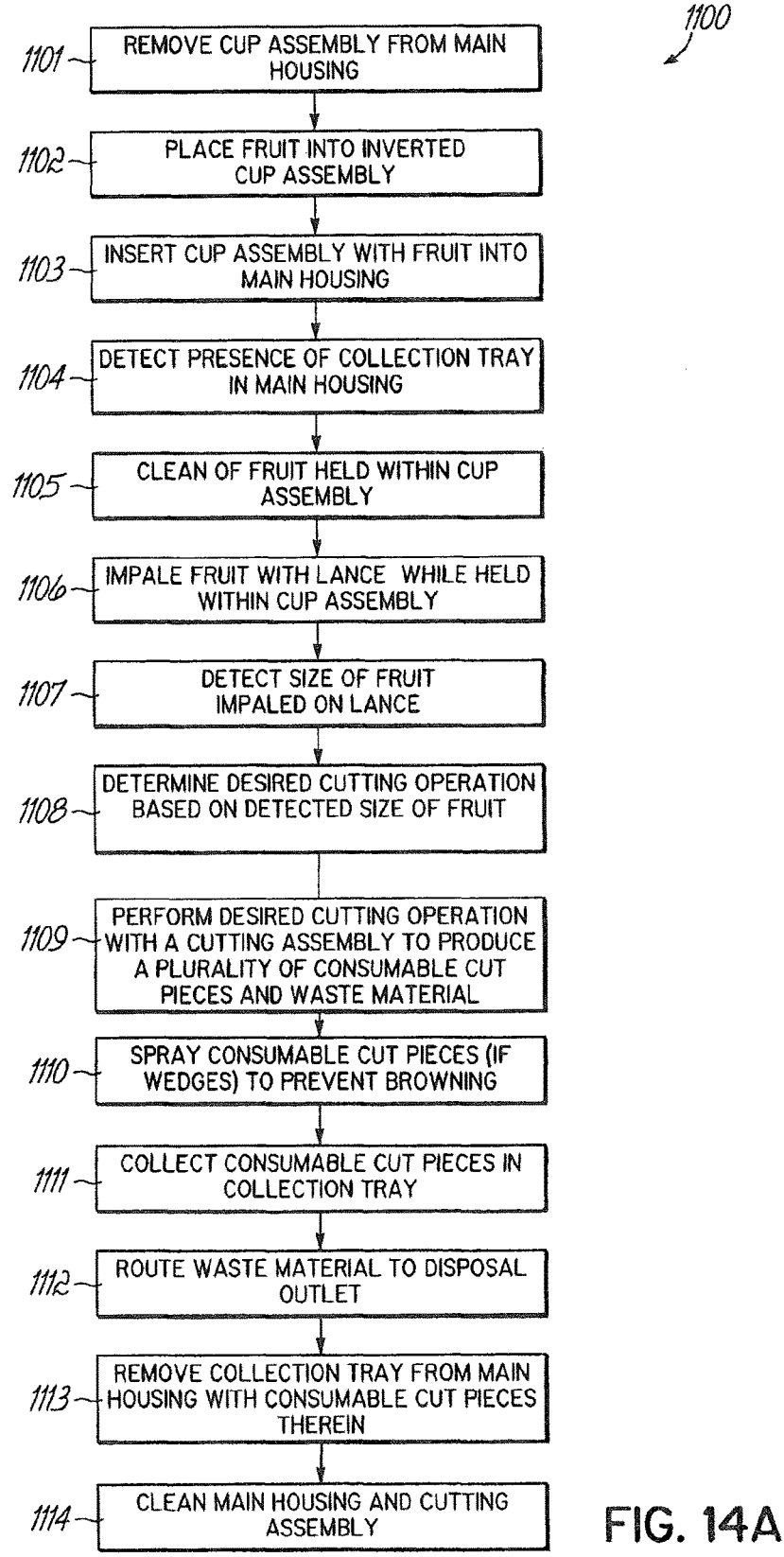
FIG. 14A is an operational flowchart that schematically shows a first cutting operation performed by the apparatus shown in FIG. 1.

In operation, the apparatus 10 is configured to receive a unit of fruit 8 of varying types (including but not limited to: apple, lemon, pear, lime, orange, and grapefruit) and prepare the unit of fruit 8 by cutting it into consumable cut pieces. FIG. 14A schematically shows a series of operational steps that the apparatus 10 of the embodiment performs to prepare the unit of fruit 8. These operational steps may be envisioned as an embodiment of a method 1100 of preparing a unit of fruit 8 for consumption.

First, the user will remove the cup assembly 26 from the main housing 12 such as by sliding the cup assembly 26 out of the cup receptacle 18 (step 1101). The unit of fruit 8 will then be placed into the cup assembly 26 and locked into position with the first gripping arms 108 and the second gripping arms 110 (step 1102). With the unit of fruit 8 secured, the cup assembly 26 is then inserted back into the cup receptacle 18 of the main housing 12 (step 1103). The controller 50 then looks for a signal from the tray detection sensor 54 to determine whether a tray 24 is properly positioned in the lower housing portion 22 (step 1104). If no tray 24 is detected, the apparatus 10 does not proceed until a tray 24 is detected by the tray detection sensor 54. A warning LED (not shown) may be provided near the front of the outer housing 12 to indicate to an operator that the tray 24 is missing.

Next, the unit of fruit 8 is cleaned within the cup assembly 26 by spraying the water/PAA mixture on all sides of the unit of fruit 8 (step 1105). Note that the deflector assembly 32 is positioned to direct the used cleaning fluid into the disposal outlet 44 rather than the tray 24. The drive assembly 28 then actuates and moves the lance 208 through the center of the unit of fruit 8 in the cup assembly 26 to thereby impale the unit of fruit 8 (step 1106). The cup assembly 26 then releases the unit of fruit 8 so that the lance 208 may move downwardly into the cutting area 20. As the unit of fruit 8 passes from the cup assembly 26 into the cutting area 20, the fruit size sensor 66 detects the size of the unit of fruit 8 and provides this information to the controller 50 which converts this size into at least one dimension in millimeters (step 1107). The controller 50 then determines a desired cutting operation to be performed on the unit of fruit 8 based on the detected size of the unit of fruit 8 (step 1108).

Then, the cutting assembly 30 and the drive assembly 28 cooperate to perform the desired cutting operation to produce consumable cut pieces of fruit and waste material (step 1109). As discussed in more detail with reference to FIGS. 14B-16J below, the desired cutting operation may be a peeling and cutting operation in one embodiment, and may be a wedging operation in another embodiment. The rinsing assembly 34 sprays the consumable cut pieces to prevent browning in the wedging operation (step 1110). The consumable cut pieces are routed by the deflector assembly 32 so as to be collected by the tray 24 (step 1111). Meanwhile, any waste material remaining from the unit of fruit 8 is routed by the deflector assembly 32 into the disposal outlet 44 (step 1112).

With the consumable cut pieces fully prepared, the user then removes the tray 24 with the consumable cut pieces from the lower housing portion 22 (step 1113). The tray 24 may then be immediately presented to a consumer for sale and consumption, after a lid is positioned on the tray 24. Finally, the rinsing assembly 34 cleans the main housing 12 at the cup receptacle 18 and the cutting area 20 by spraying these areas with the water/PAA mixture (step 1114). It will be understood that the deflector assembly 32 continues to route this used cleaning mixture into the disposal outlet 44. Therefore, a unit of fruit 8 of various types may be immediately prepared for consumption when it is ordered, such as in a quick service restaurant setting.

Figure 14B:
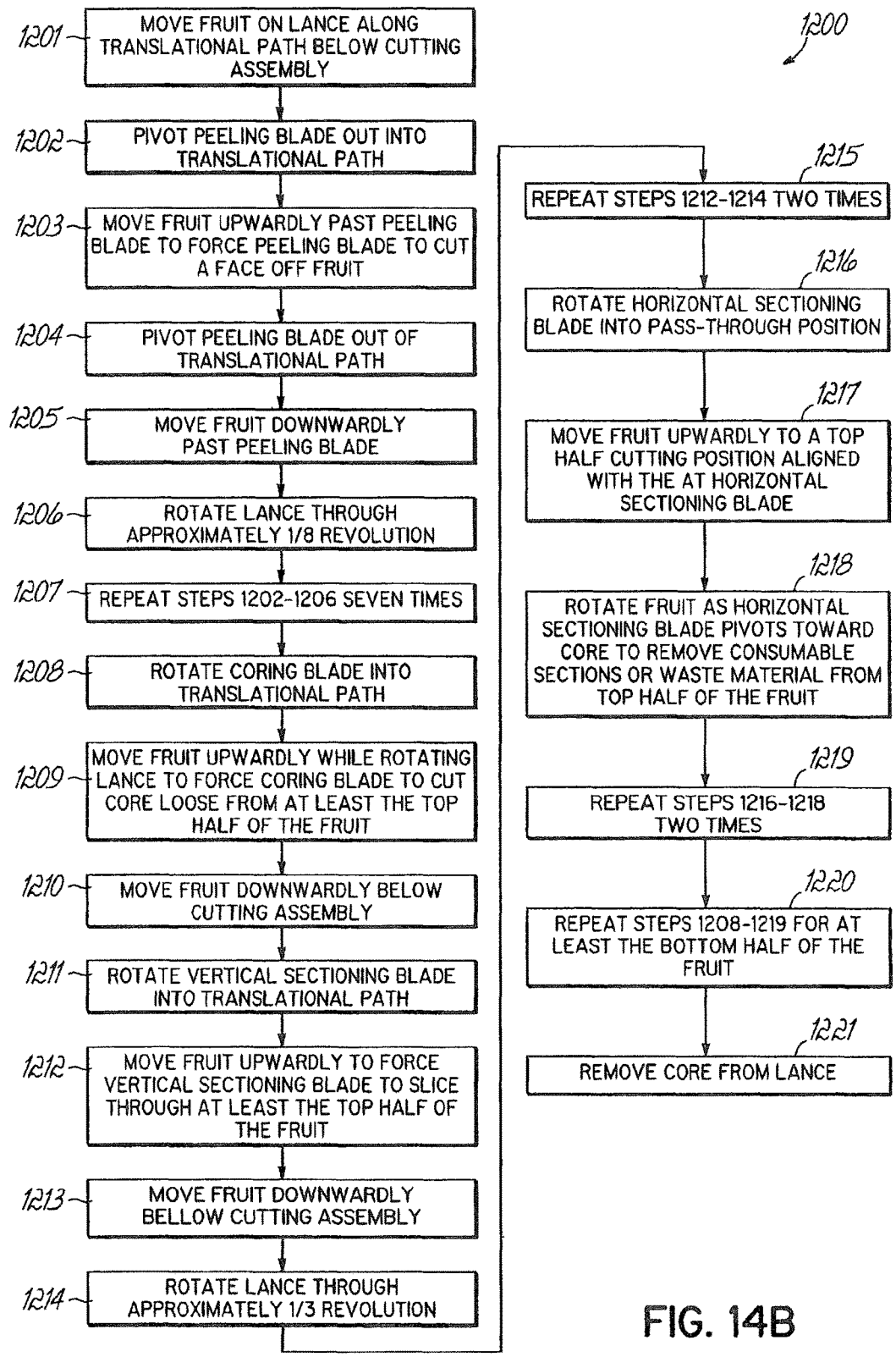
FIG. 14B is an operational flowchart that schematically shows a peeling and cutting operation performed by the apparatus shown in FIG. 1, for a first type of fruit.

In one embodiment, the desired cutting operation performed by the drive assembly 28 and the cutting assembly 30 is a peeling and cutting operation shown schematically by the method 1200 of FIG. 14B. The peeling and cutting operation is configured to create consumable pieces of citrus fruits such as oranges and grapefruits. The peeling and cutting operation may be accomplished in about 100 seconds or less with the apparatus 10. It will be understood that the steps disclosed are merely an example and may be reordered or modified within the scope of the present invention. Reference is also made to FIGS. 15A-15M, which show the unit of fruit 8 actually undergoing the aforementioned steps in FIG. 14B.

Figure 15A:
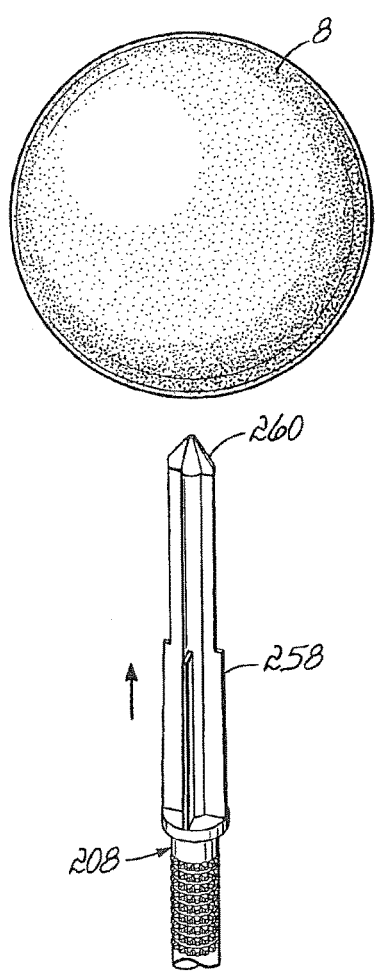
FIG. 15A is a perspective view of a unit of fruit prior to being impaled by the drive assembly of the apparatus of FIG. 1.
Figure 15B:
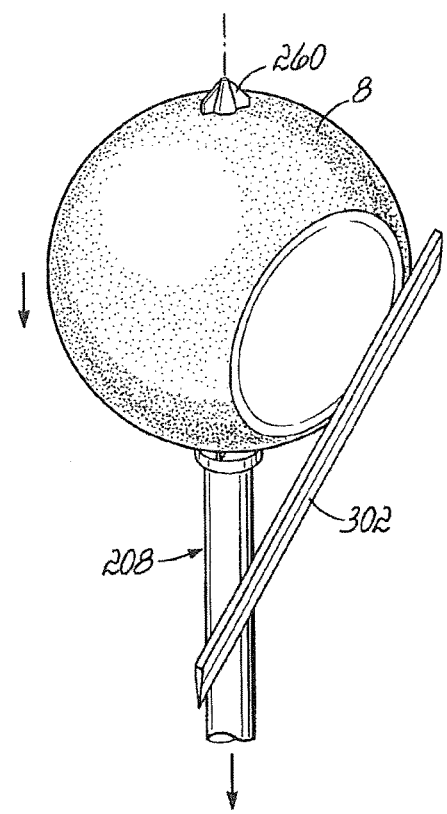
FIG. 15B is a perspective view of the unit of fruit of FIG. 15A undergoing peeling as an initial part of the peeling and cutting operation shown in FIG. 14B.

As shown in FIG. 15A, the unit of fruit 8 is first impaled by the lance 208 of the drive assembly 28. As described in further detail above, the tip 260 of the lance 208 may rotate after re-emergence from the other side of the unit of fruit 8 to securely lock the position of the unit of fruit 8 on the lance 208. The lance 208 then moves the unit of fruit 8 along a translational path defined by the drive assembly 28 into the cutting area 20 and below the cutting assembly 30 (step 1201). The bridge member 206 of the drive assembly 28 then actuates the peeling blade 302 to pivot into the translational path (step 1202). The lance 208 then moves the unit of fruit 8 upwardly past the peeling blade 302 to force the peeling blade 302 to cut a face off of the unit of fruit 8, as shown in FIG. 15B (step 1203). The bridge member 206 then actuates the peeling blade 302 to pivot out of the translational path (step 1204). The lance 208 then moves the unit of fruit 8 downwardly past the peeling blade 302 (step 1205). The drive assembly 28 then rotates the lance 208 and the unit of fruit 8 through approximately a ⅛ revolution (step 1206). More faces are removed from the unit of fruit 8 by repeating these steps 1302-1306 seven times (step 1207), thereby resulting in the multi-faceted unit of fruit 8 shown in FIG. 15C.

Figure 15C:
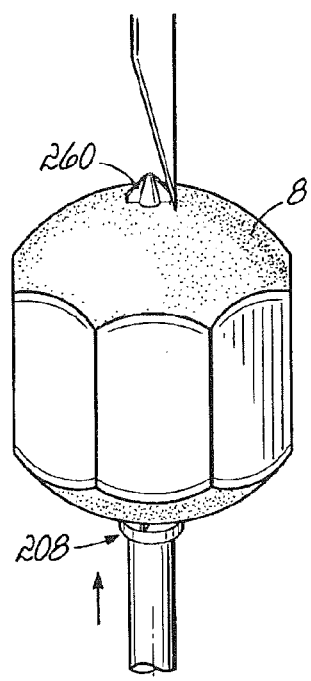
FIG. 15C is a perspective view of the unit of fruit of FIG. 15B undergoing initial coring as part of the peeling and cutting operation shown in FIG. 14B.
Figure 15D:
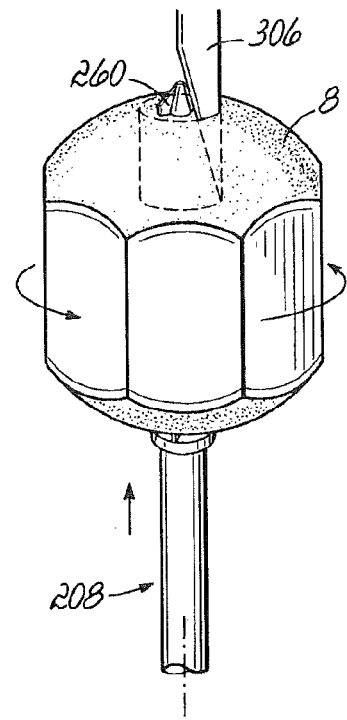
FIG. 15D is a perspective view of the unit of fruit of FIG. 15C undergoing further coring as part of the peeling and cutting operation shown in FIG. 14B.

The core is then substantially separated from at least the top half of the unit of fruit 8. As shown in FIG. 15C, the coring blade 306 is rotated into the translational path (step 1208). The drive assembly 28 then causes the lance 208 to rotate rapidly while moving upwardly towards the coring blade 306, thereby forcing the coring blade 306 to cut loose the core of the unit of fruit 8 from at least the top half of the unit of fruit 8 as shown in FIG. 15D (step 1209). It will be understood that the coring blade 306 may only cut halfway down the length of the unit of fruit 8 (as shown in these figures) or any length up to about 80-90% through the length of the fruit so that the core is still connected to the remainder of the unit of fruit 8 at the bottom.

Figure 15E:
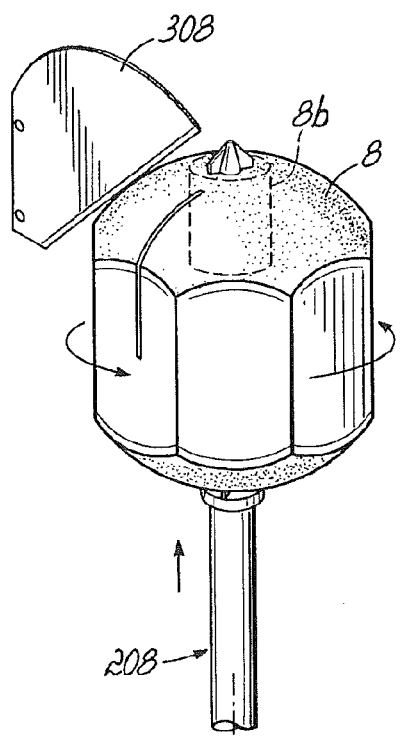
FIG. 15E is a perspective view of the unit of fruit of FIG. 15D undergoing vertical cutting as part of the peeling and cutting operation shown in FIG. 14B.

The unit of fruit 8 is then vertically sectioned. As shown in FIG. 15E, the unit of fruit 8 is moved by the lance 208 downwardly below the cutting assembly 30 (step 1210), and the vertical sectioning blade 308 is rotated into the translational path (step 1211). The lance 208 then moves the unit of fruit 8 upwardly to force the vertical sectioning blade 308 to slice through at least the top half of the unit of fruit 8 (step 1212). The lance 208 then moves the unit of fruit 8 back below the cutting assembly 30 (step 1213). The lance 208 next rotates the unit of fruit 8 through approximately ⅓ revolution (step 1214). The vertical sectioning continues by repeating steps 1212-1214 two times (step 1215). It will be appreciated that the vertical sectioning blade 308 may cut through the entire length of the unit of fruit 8 on each pass, or may only cut through a portion of the unit of fruit 8 as shown in FIG. 15E. Additionally, it will be understood that the vertical sectioning blade 308 may cut through the unit of fruit 8 more than three times in alternative embodiments to form smaller consumable cut pieces of fruit.

Figure 15F:
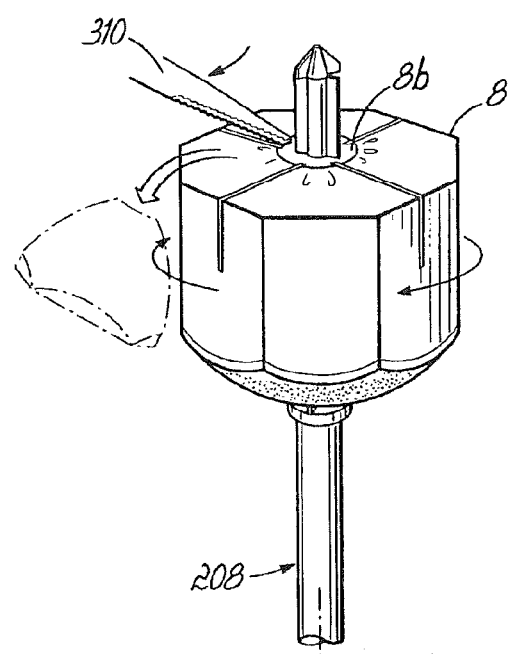
FIG. 15F is a perspective view of the unit of fruit of FIG. 15E undergoing horizontal cutting as part of the peeling and cutting operation shown in FIG. 14B.

The unit of fruit 8 is then horizontally sectioned. The horizontal sectioning blade 310 is rotated into a pass-through position adjacent to the translational path of the unit of fruit 8 (step 1216). The lance 208 moves the unit of fruit 8 upwardly to a top half cutting position aligned with the horizontal sectioning blade 310 (step 1217). It will be appreciated that the top half cutting position is predetermined by the controller 50 based on the total length of the unit of fruit 8. The lance 208 then rotates the unit of fruit 8 rapidly as the horizontal sectioning blade 310 pivots towards the core of the fruit to remove waste material from the top of the unit of fruit 8 as shown in FIG. 15F (step 1218). The horizontal sectioning continues by repeating steps 1216-1218 two more times (step 1219), with each successive cut removing consumable cubes 8c from the unit of fruit 8 as shown in FIG. 15G. Steps 1208-1219 may then be repeated for at least the bottom half of the unit of fruit 8 as shown in FIGS. 15H-15J (step 1220).

While the unit of fruit 8 is horizontally sectioned, the deflector assembly 32 routes the first horizontal cut of waste material to the disposal outlet 44 and the remaining horizontal cuts of consumable cubes 8c into the tray 24. It will also be understood that more or fewer vertical cuts and horizontal cuts may be made to modify the size of the consumable cubes 8c in alternative embodiments.

Figures 15K, 15L:
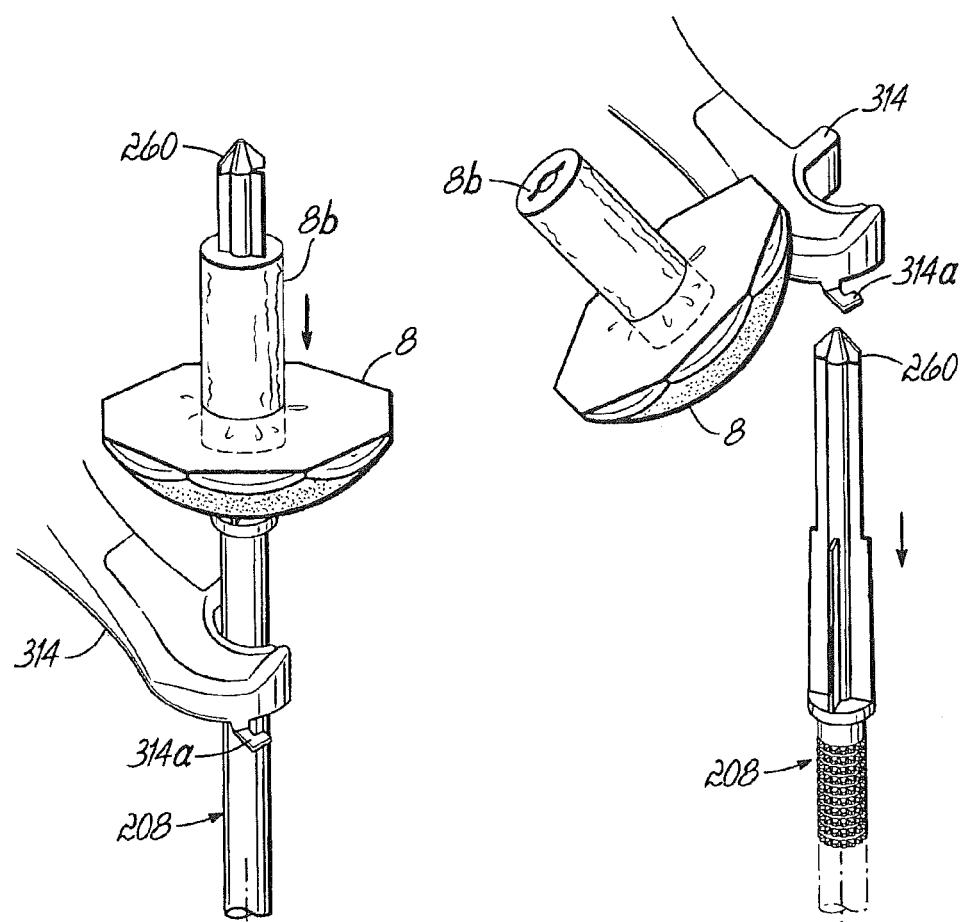
FIG. 15K is a perspective view of the unit of fruit of FIG. 15J, but after the consumable pieces have been cut therefrom, with the remaining core residing on the drive assembly, as part of the peeling and cutting operation shown in FIG. 14B.
FIG. 15L is a perspective view of the remaining core of the unit of fruit of FIG. 15K, as it is removed from the drive assembly, as part of the peeling and cutting operation shown in FIG. 14B.
Figure 15M:
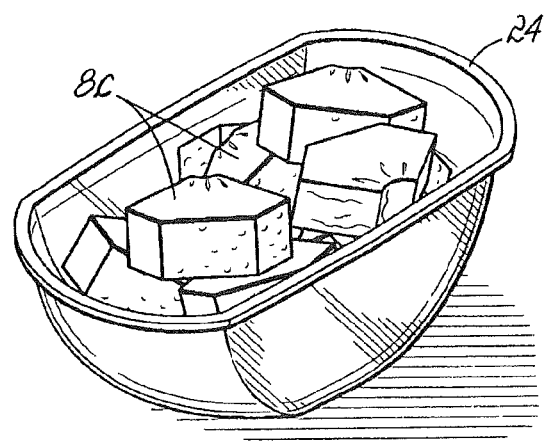
FIG. 15M is a perspective view of a tray containing cut pieces of fruit after the peeling and cutting operation shown in FIGS. 14B and 15B-15L.

The core and remaining waste material impaled on the lance 208 is then removed from the lance 208 (step 1221). To this end, the de-coring member 314 of the cutting assembly 30 moves into position directly adjacent to the lance 208 and below the unit of fruit 8 as shown in FIG. 15K. The lance 208 is then driven downwardly such that the de-coring member 314 forces the remainder of the unit of fruit 8 over the tip 260 of the lance 208 and off the lance 208 as shown in FIG. 15L. It will be understood that the tip 260 may be rotated to a position aligned with the holding spike 258 prior to de-coring. This waste material is routed to the disposal outlet 44 by the deflector assembly 32. The tray 24 filled with consumable cubes of fruit as shown in FIG. 15M is then ready for removal from the apparatus 10 and delivery to a consumer, after a lid is coupled to the tray 24.

Figure 14C:
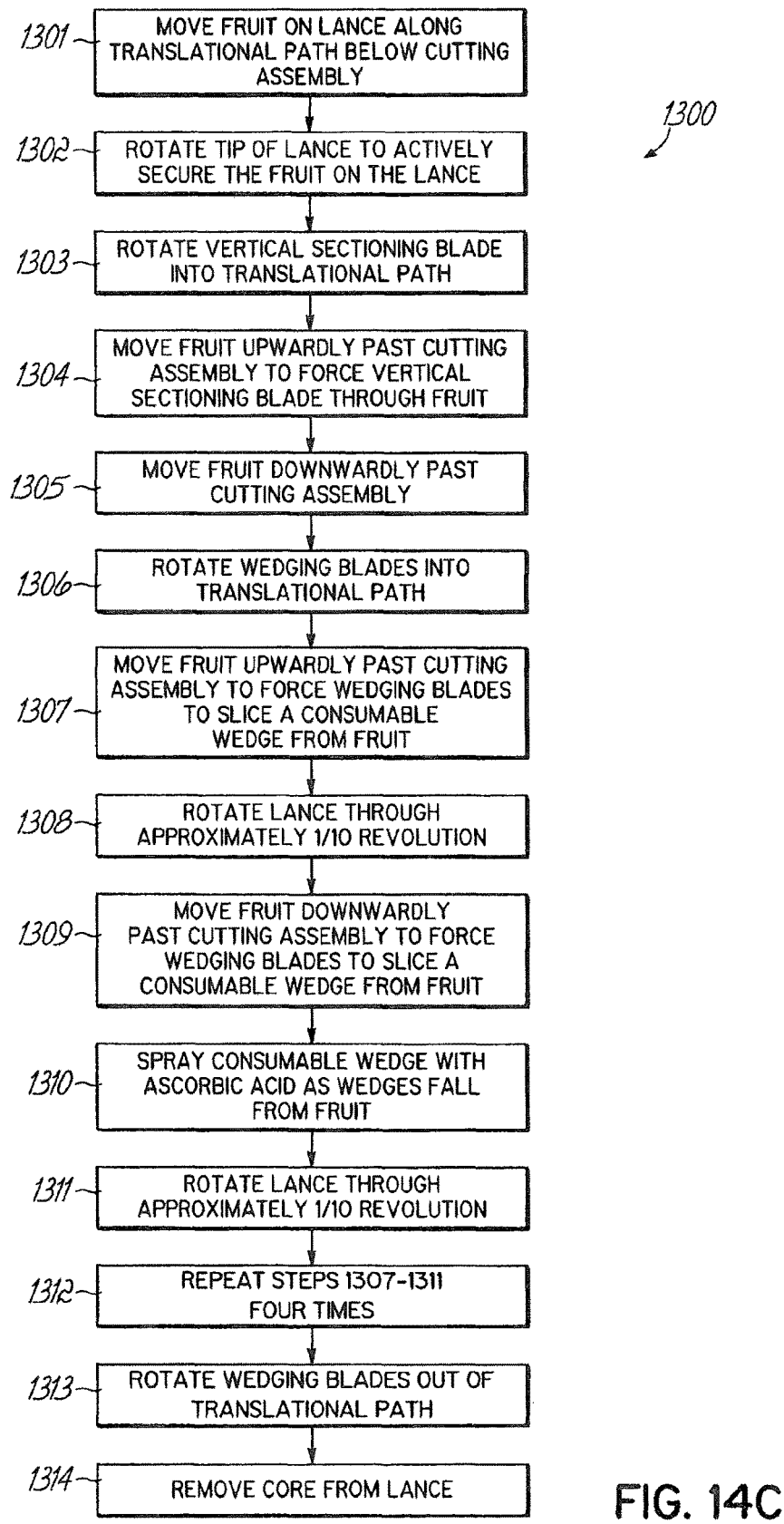
FIG. 14C is an operational flowchart that schematically shows a wedging operation performed by the apparatus shown in FIG. 1, for a second type of fruit.

In another embodiment, the desired cutting operation performed by the drive assembly 28 and the cutting assembly 30 is a wedging operation shown schematically by the method 1300 of FIG. 14C. The wedging operation is configured to create consumable wedges of fruits such as apples, lemons, limes, and pears. The wedging operation may be accomplished in about 30 seconds or less with the apparatus 10. It will be understood that the steps disclosed are merely an example and may be reordered or modified within the scope of the present invention. Reference is also made to FIGS. 16A-16I, which show the unit of fruit 8 actually undergoing the aforementioned steps in FIG. 14C.

Figure 16A:
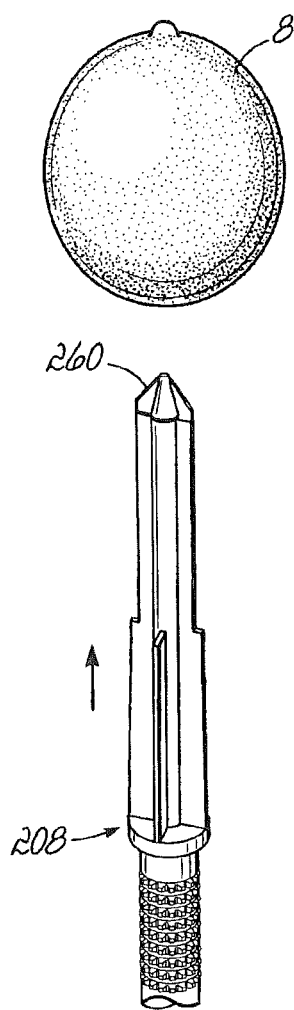
FIG. 16A is a perspective view of a unit of fruit prior to being impaled by the drive assembly of the apparatus of FIG. 1.
Figure 16B:
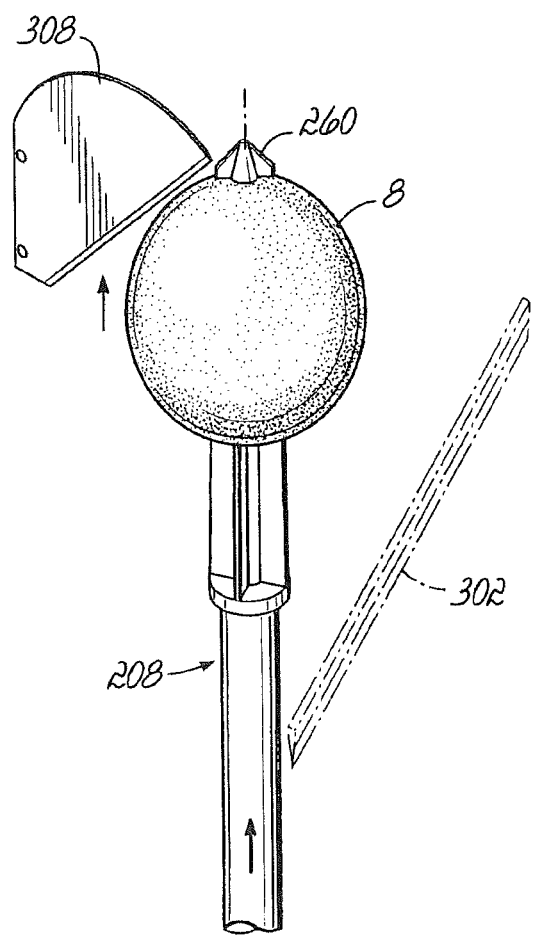
FIG. 16B is a perspective view of the unit of fruit of FIG. 16A undergoing an initial vertical cutting with one blade, as part of the wedging operation shown in FIG. 14C.

As shown in FIG. 16A, the unit of fruit 8 is first impaled by the lance 208 of the drive assembly 28. The lance 208 then moves the unit of fruit 8 along a translational path defined by the drive assembly 28 into the cutting area 20 and below the cutting assembly 30 (step 1301). As described in further detail above, the tip 260 of the lance 208 may rotate to securely lock the position of the unit of fruit 8 on the lance 208 (step 1302). The cutting assembly 30 then rotates the vertical sectioning blade 308 into the translational path (step 1303). The lance 208 drives the unit of fruit 8 upwardly pas the cutting assembly 30 to force the vertical sectioning blade 308 through the unit of fruit 8, as shown in FIG. 16B (step 1304). The unit of fruit 8 may then be driven downwardly back below the cutting assembly 30 (step 1305).

Figure 16C:
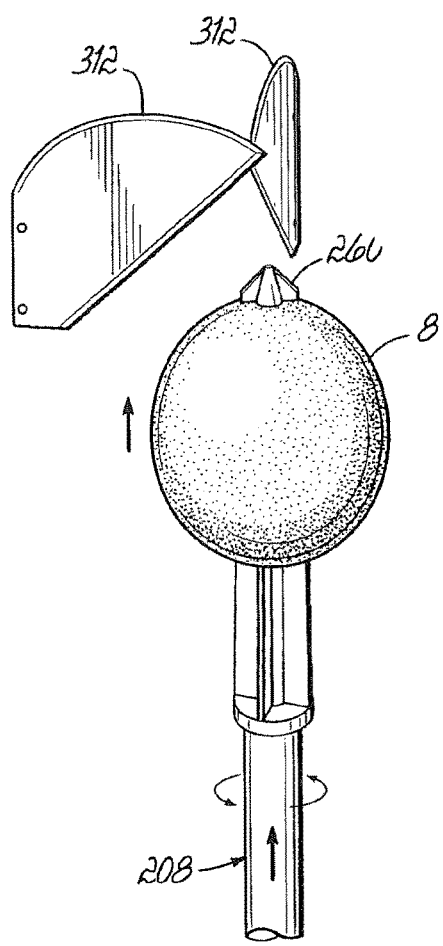
FIG. 16C is a perspective view of the unit of fruit of FIG. 16B undergoing subsequent vertical cutting with two blades, as part of the wedging operation shown in FIG. 14C.
Figure 16D:
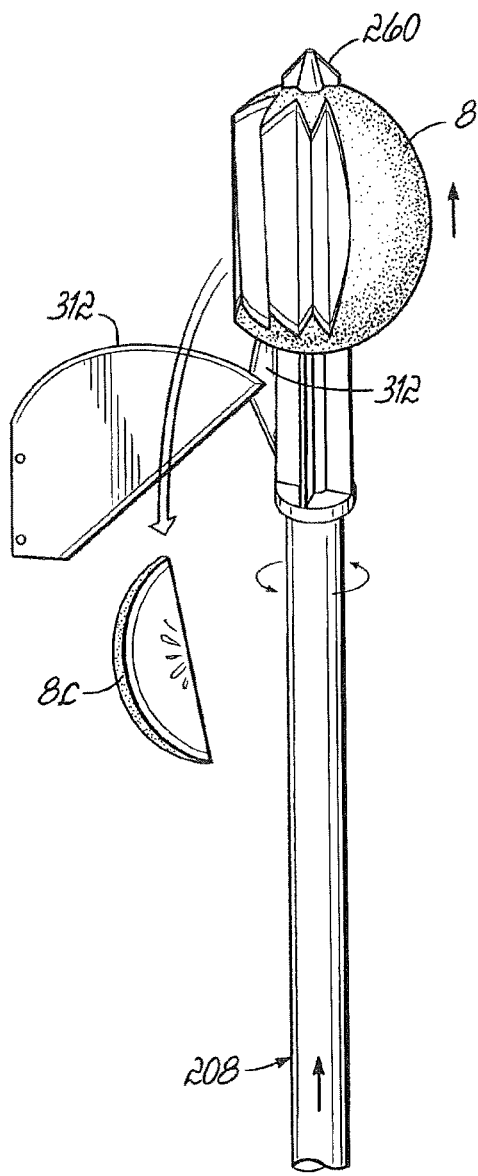
FIG. 16D is a perspective view of the unit of fruit of FIG. 16C undergoing additional vertical cutting with two blades, as part of the wedging operation shown in FIG. 14C.
Figure 16E:
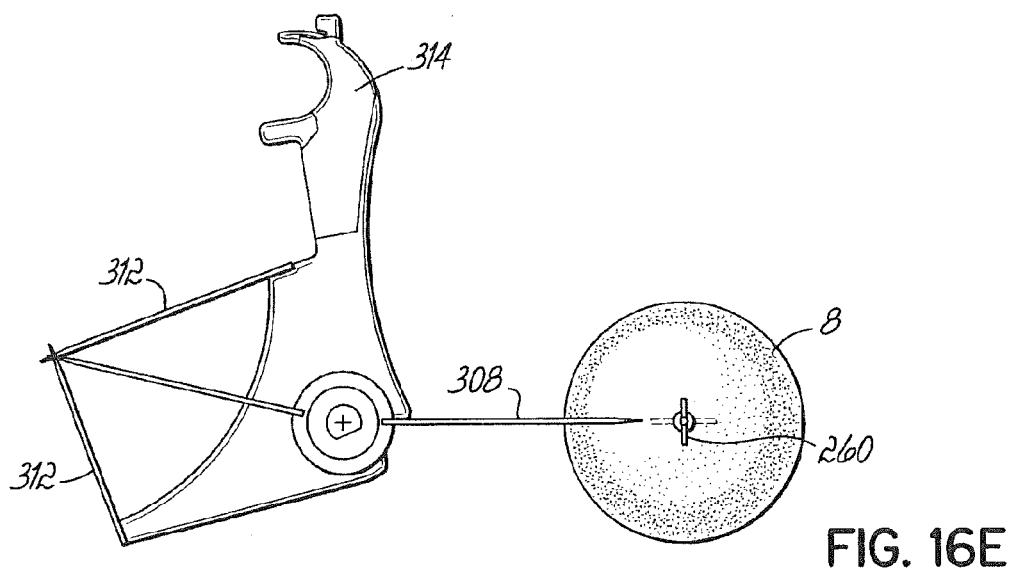
FIG. 16E is a top view of the unit of fruit of FIG. 16A, showing the initial vertical cutting with one blade that is also shown in FIG. 16B, as part of the wedging operation shown in FIG. 14C.
Figure 16F:
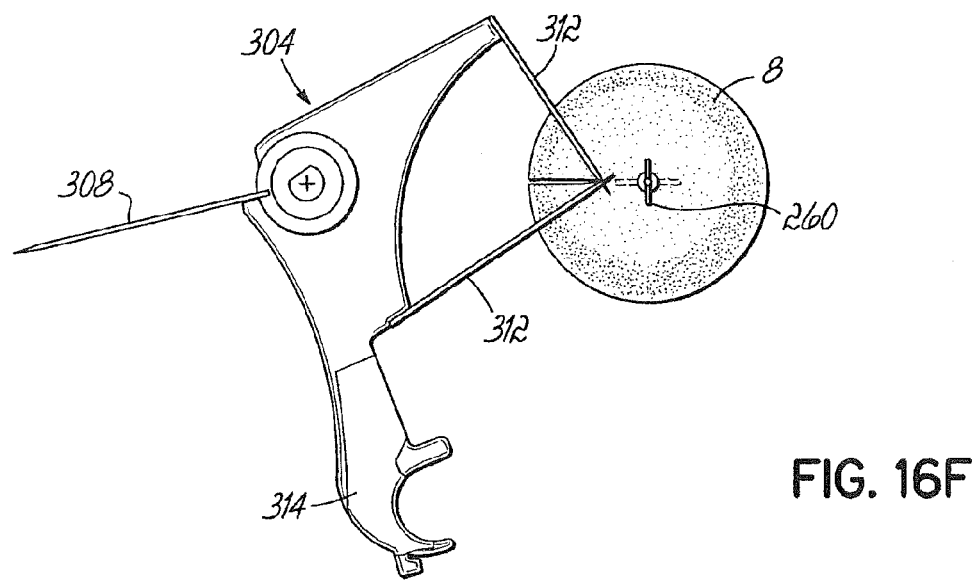
FIG. 16F is a top view of the unit of fruit of FIG. 16E, showing the subsequent vertical cutting with two blades that is also shown in FIG. 16C, as part of the wedging operation shown in FIG. 14C.

As shown in FIG. 16C, the wedging blades 312 of the cutting assembly 30 are then rotated into the translational path (step 1306). The lance 208 then moves the unit of fruit 8 upwardly past the cutting assembly 30 to force the wedging blades 312 through the unit of fruit 8, thereby slicing a consumable wedge 8c from the unit of fruit 8 as shown in FIG. 16D (step 1307). The lance 208 rotates the unit of fruit 8 through approximately a 1/10 or similar revolution (step 1308). Then the lance 208 moves the unit of fruit 8 downwardly past the cutting assembly 30, again thereby forcing the wedging blades 312 through the unit of fruit 8 to remove another consumable wedge 8c from the unit of fruit 8 (step 1309). The rinsing assembly 34 may actuate the ascorbic acid spray nozzles 68 as previously-described to spray the consumable wedges 8c as they fall from the unit of fruit 8 (step 1310). The lance 208 rotates the unit of fruit 8 again through approximately a 1/10 or similar revolution (step 1311). The wedging of the entire unit of fruit 8 continues by repeating steps 1307-1311 four times (step 1312). This step creates a set number of wedges of fruit, for example, 10 wedges of fruit. It will be understood that the rotation of the unit of fruit 8 may be modified so that more or fewer wedges 8c are cut from the unit of fruit 8.

Figure 16G:
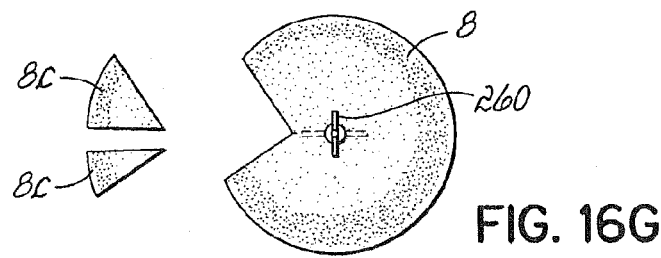
FIG. 16G is a top view of the unit of fruit after the vertical cutting shown in FIG. 16F.
Figure 16H:
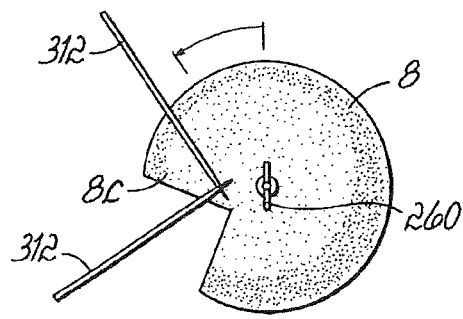
FIG. 16H is a top view of the unit of fruit of FIG. 16G, showing the additional vertical cutting with two blades that is also shown in FIG. 16D, as part of the wedging operation shown in FIG. 14C.
Figure 16I:
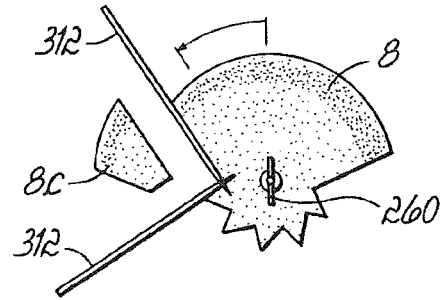
FIG. 16I is a top view of the unit of fruit of FIG. 16H after still further additional vertical cutting with two blades, as part of the wedging operation shown in FIG. 14C.

FIGS. 16E-16I show the previously-described sectioning and wedging steps from a top view. Therefore, the vertical sectioning blade 308 passes through the unit of fruit 8 in FIG. 16E, the wedging blade 312 passes through the unit of fruit 8 in FIG. 16F, and consumable wedges of fruit 8c are removed from the unit of fruit 8 as shown in FIG. 16G. This process continues as shown in FIGS. 16H and 16I until all consumable wedges 8c have been removed from the unit of fruit 8. As described above, these wedges may be sprayed by one of the ascorbic acid spray nozzles 68 of the rinsing system 34 with Ascorbic Acid to prevent or delay browning of the consumable wedges. It will be understood that the wedging blades 312 may pass through a unit of fruit 8 a different number of times in alternative embodiments.

Figure 16J:
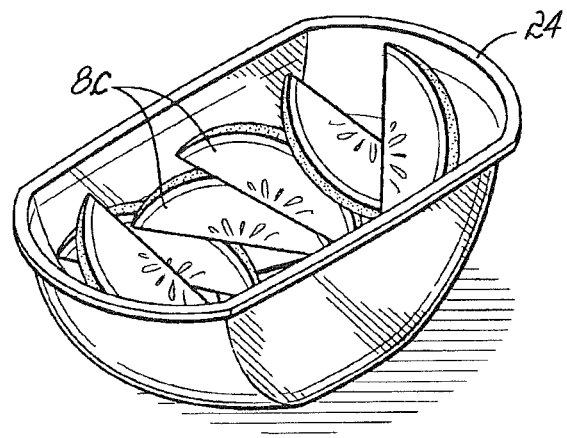
FIG. 16J is a perspective view of a tray containing cut pieces of fruit after the wedging operation shown in FIGS. 14C and 16B-16I.

Once the final consumable wedge 8c has been removed from the unit of fruit 8, the cutting assembly 30 rotates the wedging blades 312 out of the translational path (step 1313). The waste material including the core remaining on the lance 208 is then removed by the de-coring member 314 of the cutting assembly as described in detail above (step 1314). Note that the tip 260 of the lance 208 is typically rotated back to the original position prior to de-coring to reduce the forces necessary to de-core the unit of fruit 8 from the lance 208. The waste material and core are routed to the disposal outlet 44 by the deflector assembly 32, while the consumable wedges are routed to the tray 24. The tray 24 as filled with the consumable wedges is shown in FIG. 16J, which is then ready for sale and delivery to a consumer, after a lid is coupled to the tray 24.

While the specification shows and describes an apparatus constructed in accordance with a first preferred embodiment of the present invention, those skilled in the art will appreciate that various aspects of this preferred embodiment are susceptible to reasonable modification. Accordingly, the appended claims should not be considered as limited to the specific structure that this specification shows and describes. Also, those skilled in the art will understand that the mere recitation of multiple objects of the present invention does not require or even imply that every one of the claims must achieve every one of the above-stated objects. To the contrary, different claims emphasize different aspects of the invention. And this initial disclosure includes multiple sets of claims in order to more fully encompass the broad scope of the novel and unobvious concepts related to this project.

We claim:

1. An apparatus for preparing a unit of fruit, comprising:
   a housing including a cup receptacle;
   a cup assembly received in the cup receptacle and adapted to support the unit of fruit after the unit of fruit is placed therein in substantial alignment along a first axis;
   a drive assembly including a lance located within the housing and aligned with the first axis, the lance being rotatable about the first axis and reciprocally movable along the first axis relative to the cup assembly such that the lance is operable to impale the unit of fruit and retain the unit of fruit while in the housing;
   a first sensor located in the housing and adapted to sense a dimension of the unit of fruit as the lance moves the unit of fruit along the first axis;
   a controller operatively connected to the first sensor and adapted to determine a cutting operation for the unit of fruit, based on the sensed dimension;
   a cutting assembly located in the housing and operatively connected to the controller, the cutting assembly adapted to perform the determined cutting operation on the unit of fruit while the lance retains the unit of fruit, thereby to create consumable cut pieces of fruit; and
   an opening formed in the housing where the consumable cut pieces of the unit of fruit are retrievable by a user.

2. The apparatus of claim 1, wherein a portion of the housing is transparent, so that the performing of the cutting operation is viewable from outside the housing.

3. The apparatus of claim 1, wherein the cup assembly further comprises:
   at least one gripping arm moveable between a first position configured to permit insertion or removal of the unit of fruit from the cup assembly and a second position configured to engage the unit of fruit to retain the unit of fruit within the cup assembly.

4. The apparatus of claim 3, wherein the cup assembly further comprises:
   a clutch mechanism configured to retain the at least one gripping arm in the second position until the lance of the drive assembly impales the unit of fruit.

5. The apparatus of claim 1, wherein the cup assembly further comprises:
   a plurality of spray nozzles directed at the unit of fruit supported in the cup assembly.

6. The apparatus of claim 5, wherein the cup receptacle further comprises:
   a U-shaped pipe including a plurality of flow outlets directed at the unit of fruit supported in the cup assembly.

7. The apparatus of claim 6, further comprising:
a rinsing assembly configured to receive water and mix the water with peracetic acid to form a cleaning fluid, the cleaning fluid being directed to the plurality of spray nozzles and the plurality of flow outlets.

8. The apparatus of claim 7, wherein the rinsing assembly includes at least one venturi for mixing the peracetic acid into the water.

9. The apparatus of claim 1, wherein the cup assembly is removable from the cup receptacle to enable a user to place the unit of fruit therein, in alignment along the first axis.

10. The apparatus of claim 1, wherein the first axis is vertical and the consumable cut pieces of fruit fall by gravity toward the opening.

11. The apparatus of claim 1, wherein the drive assembly further includes a bridge member including a first set of drive gears configured to actuate translation of the lance along the first axis and a second set of drive gears configured to actuate rotation of the lance around the first axis.

12. The apparatus of claim 11, wherein the first set of drive gears is configured to translate the lance with respect to the bridge member as the bridge member translates such that the lance translates twice as far as the bridge member within the housing.

13. The apparatus of claim 11, wherein the lance further comprises a plurality of spaced toothed pinions configured to engage the first set of drive gears and the second set of drives gears, the spaced toothed pinions configured to enable independent or simultaneous rotation and translation of the lance.

14. The apparatus of claim 11, wherein the lance of the drive assembly further comprises:
a holding spike including at least two prongs extending away from the first axis; and
a tip having at least two prongs configured to rotate into alignment with the prongs of the holding spike during impaling of the unit of fruit, and rotate out of alignment with the prongs of the holding spike after the unit of fruit has been impaled to securely hold the unit of fruit on the lance.

15. The apparatus of claim 14, wherein the lance further comprises a locking base coupled to the tip and the housing further comprises a locking receptacle configured to receive the locking base so that the second set of drive gears can rotate the lance with respect to the tip.

16. The apparatus of claim 15, further comprising:
a second sensor located adjacent the bridge member and operatively connected to the controller, the second sensor adapted to sense when the bridge member is in a position where the locking base is received in the locking receptacle.

17. The apparatus of claim 1, wherein the cutting assembly further comprises a peeling blade for cutting faces from the unit of fruit, a coring blade for removing the core of the unit of fruit, a vertical segmenting blade for making vertical cuts through the unit of fruit, and a horizontal segmenting blade for making horizontal cuts through the unit of fruit.

18. The apparatus of claim 17, further comprising:
a third sensor located adjacent the cutting assembly and operatively connected to the controller, the third sensor adapted to sense when the cutting assembly is in a pass through position configured to permit free passage of the unit of fruit past the cutting assembly along the first axis.

19. The apparatus of claim 1, wherein the cutting device further comprises a wedging blade configured to cut consumable wedges from the unit of fruit.

20. The apparatus of claim 19, further comprising:
a third sensor located adjacent the cutting assembly and operatively connected to the controller, the third sensor adapted to sense when the cutting assembly is in a pass through position configured to permit free passage of the unit of fruit past the cutting assembly along the first axis.

21. The apparatus of claim 1, further comprising:
a drawer located adjacent the opening and adapted to hold a tray for collecting the consumable cut pieces of fruit.

22. The apparatus of claim 21, further comprising:
a fourth sensor located adjacent the drawer and operatively connected to the controller, the fourth sensor adapted to sense the presence of a tray in the drawer prior to the cutting operation.

23. The apparatus of claim 21, further comprising:
a deflector assembly configured to route the consumable cut pieces of fruit to the tray and also configured to route waste material to a disposal outlet.

24. The apparatus of claim 23, wherein the deflector assembly further comprises:
a deflector including a funnel-shaped body and an opening, the opening configured to rotate about a deflector axis between communication with the tray and communication with the disposal outlet.

25. The apparatus of claim 24, further comprising:
a fifth sensor located adjacent the deflector and operatively connected to the controller, the fifth sensor adapted to sense the location of the deflector to determine whether the opening of the deflector is in communication with the tray or the disposal outlet.

26. The apparatus of claim 1, further comprising:
a rinsing assembly including a plurality of spray nozzles disposed throughout the housing and configured to deliver various fluids to the unit of fruit or an interior of the housing.

27. The apparatus of claim 26, wherein the rinsing assembly further comprises:
a primary water supply and a plurality of venturi configured to mix one or more of the various fluids: peracetic acid with water to form a cleaning liquid for cleaning the unit of fruit or the interior of the housing, and ascorbic acid with water to form a liquid configured to prevent browning of consumable wedges of fruit.

28. The apparatus of claim 27, further comprising:
a sixth sensor located adjacent the rinsing assembly and operatively connected to the controller, the sixth sensor adapted to sense whether adequate water pressure is being supplied to the rinsing assembly to spray the various fluids through the spray nozzles.

29. The apparatus of claim 26, wherein the rinsing assembly further comprises:
a manual rinsing wand coupled to the housing and configured to be inserted into the interior of the housing through the cup receptacle when the cup assembly is removed, the manual rinsing wand operable to spray a directed flow of various fluids into the housing to remove stuck waste materials in the housing.

30. The apparatus of claim 29, further comprising:
a pair of buttons operatively coupled to the controller and configured to stop all movement of the cutting assembly and the drive assembly when actuated to permit the manual rinsing wand to be used without interference from the apparatus.

31. The apparatus of claim 1, wherein the opening defines a position within the housing adapted to hold a tray, the tray sized and shaped to collect the consumable cut pieces of fruit while in the position, the position and the tray being complementary in shape so as to accurately locate the tray in the position.

32. The apparatus of claim 31 further comprising:
a fourth sensor associated with the opening and operatively connected to the controller, the fourth sensor adapted to sense the presence of the tray at the position and to relay a corresponding signal to the controller, to assure that the tray is in the position prior to initiation of the cutting operation.

* * * * *